(12) United States Patent
Minotani et al.

(10) Patent No.: US 7,583,930 B2
(45) Date of Patent: Sep. 1, 2009

(54) TRANSMISSION DEVICE, ELECTRIC FIELD COMMUNICATION TRANSCEIVER, AND ELECTRIC FIELD COMMUNICATION SYSTEM

(75) Inventors: Tadashi Minotani, Sagamihara (JP); Nobutarou Shibata, Zama (JP); Mitsuru Shinagawa, Isehara (JP)

(73) Assignee: Nippon Telegraph and Telephone Corporation (JP)

( * ) Notice: Subject to any disclaimer, the term of this patent is extended or adjusted under 35 U.S.C. 154(b) by 374 days.

(21) Appl. No.: 10/591,389

(22) PCT Filed: Dec. 1, 2005

(86) PCT No.: PCT/JP2005/022085

§ 371 (c)(1),
(2), (4) Date: Aug. 31, 2006

(87) PCT Pub. No.: WO2006/059684

PCT Pub. Date: Jun. 8, 2006

(65) Prior Publication Data

US 2007/0184788 A1    Aug. 9, 2007

(30) Foreign Application Priority Data

| Dec. 2, 2004 | (JP) | ............................. 2004-350264 |
| Dec. 2, 2004 | (JP) | ............................. 2004-350267 |
| Dec. 21, 2004 | (JP) | ............................. 2004-369722 |
| Jan. 24, 2005 | (JP) | ............................. 2005-015742 |

(51) Int. Cl.
*H04B 5/00* (2006.01)
*H01Q 11/12* (2006.01)
*G08B 1/08* (2006.01)

(52) U.S. Cl. .................... 455/41.1; 455/63.1; 455/117; 455/125; 340/539.11

(58) Field of Classification Search ................ 455/41.1, 455/41.2, 42, 114.1, 117, 63.1, 68, 120–126; 340/539.1, 539.11, 10.1, 10.3, 10.34
See application file for complete search history.

(56) References Cited

U.S. PATENT DOCUMENTS 6,223,018 B1 *   4/2001   Fukumoto et al. .......... 455/41.1

(Continued)

FOREIGN PATENT DOCUMENTS

JP        2003-188835        7/2003

(Continued)

*Primary Examiner*—Duc M Nguyen
(74) *Attorney, Agent, or Firm*—Kilpatrick Stockton LLP

(57) ABSTRACT

There is provided a transmission means (3) configured to transmit a modulated signal obtained by modulating data, a transmission electrode (8) that induces an electric field based on the modulated signal in an electric field transmission medium (20), a first reactance means (2) that is provided between the electric field transmission medium (20) and an earth ground (14) and configured to cause resonance with parasitic capacitance produced between a ground (6) the transmission means (3) and the earth ground (14), parasitic capacitance produced between the electric field transmission medium (20) and the ground (6) of the transmission means (3) and parasitic capacitance produced between the electric field transmission medium (20) and the earth ground (14), and a second reactance means (1) provided between an output of the transmission means (3) and the ground (6) of the transmission means (3) or between the transmission electrode (8) and the ground (6) of the transmission means (3).

37 Claims, 40 Drawing Sheets

U.S. PATENT DOCUMENTS

| | | | |
|---|---|---|---|
| 6,477,360 B1 * | 11/2002 | Watanabe et al. | 455/318 |
| 6,856,788 B2 * | 2/2005 | Chang et al. | 455/41.1 |
| 6,864,780 B2 * | 3/2005 | Doi et al. | 340/5.64 |
| 6,879,809 B1 * | 4/2005 | Vega et al. | 455/41.1 |
| 7,069,062 B2 * | 6/2006 | Minotani et al. | 455/575.6 |
| 7,088,267 B2 * | 8/2006 | Tajima | 341/33 |
| 7,171,177 B2 * | 1/2007 | Park et al. | 455/188.1 |
| 7,263,295 B2 * | 8/2007 | Shinagawa et al. | 398/135 |
| 7,443,290 B2 * | 10/2008 | Takiguchi | 340/539.1 |
| 2004/0009226 A1 | 1/2004 | McHugh et al. | |
| 2006/0052074 A1 * | 3/2006 | Minotani et al. | 455/276.1 |
| 2007/0190940 A1 * | 8/2007 | Lee et al. | 455/41.2 |
| 2008/0261523 A1 * | 10/2008 | Kubono et al. | 455/41.1 |

FOREIGN PATENT DOCUMENTS

| | | |
|---|---|---|
| JP | 2004-153708 | 5/2004 |

\* cited by examiner

PRIOR ART

TRANSMISSION DEVICE, ELECTRIC FIELD COMMUNICATION TRANSCEIVER, AND ELECTRIC FIELD COMMUNICATION SYSTEM

TECHNICAL FIELD

The present invention relates to an electric field communication system, an electric field communication transceiver and an electric field communication transmission device that induce electric field in an electric field transmission medium and carry out data communications by use of the induced electric field.

BACKGROUND ART

A wearable computer that can be worn on a human body has attracted much attention, due to downsizing and sophisticating of mobile terminals. There has since been proposed a method as an example of data communications between such wearable computers, in which an electric field communication transceiver is integrally connected to a computer and allows the electric field that has been induced by the transceiver to transmit through a living body as an electric field transmission medium so as to carry out transmission/reception of data (for example, Japanese Patent Application Laid-open Publication No. 2004-153708 and United States Patent Application Publication 2004/009226).

FIG. 1 illustrates a circuit model including a living body, a transmission device (transmitting section) and a transceiver according to related art. A transmission circuit 105 modulates data to be transmitted that is outputted from an I/O circuit 102 by a prescribed frequency f in a modulation circuit 115 and thereby outputs the data. The transmission circuit 105 is off an earth ground 116 and parasitic capacitance 109 is caused between a ground 108 of the transmission circuit and the earth ground 116. By the way, $R_s$ 113 is an output resistor of the transmission circuit 105.

In addition, there are caused parasitic capacitance 107 between a ground 108 of the transmission circuit 105 and a living body 104 and parasitic capacitance 110 between the living body 104 and the earth ground 116. The living body 104 and a mobile terminal 100 are connected with each other via a transmission electrode 111 and an insulator 112. In order to increase a voltage to be applied to the living body by causing resonance with the parasitic capacitances, a reactance section 106 is inserted between the transmission circuit and a transmission/reception electrode. In an electric field communication transceiver for use in electric field communication that is floating from the earth ground, there is known reactance adjustment that adjusts reactance of a variable reactance that has been inserted between the transmission/reception electrode and the transmission circuit by means of an amplitude monitor and a control signal generator in order to efficiently induce an electric field in a living body even when the parasitic capacitances are fluctuated (See the above-mentioned patent documents).

When such a circuit illustrated in FIG. 1 is used, a voltage amplitude $|V_b|$ to be applied to the living body at the time of resonance is expressed by the following equation:

$$|V_b| = \frac{1}{2\Pi R_s\{C_b + C_{sb}(1 + C_b/C_g)\}}|V_s| \quad (14)$$

where $R_s$ represents an output resistance of the transmission circuit and $|V_s|$ represents an amplitude of an output signal from the transmission circuit. In addition, the parasitic capacitances 107, 109, 110 are designated by $C_{sb}$, $C_g$, and $C_b$, respectively.

When the transceiver 101 or the transmission device is thinned in order to down-size the mobile terminal 100, $C_{sb}$ is increased, thereby reducing the voltage amplitude $|V_b|$ that can be to be applied to the living body in accordance with the equation (14). Therefore, sufficient voltage cannot be obtained in a down-sized transceiver or transmission device, which makes it difficult to carry out communications.

FIG. 2 is a schematic diagram where a variable reactance is employed. FIG. 2 illustrates an insulator 133 that comes in contact with a living body 131 such as a human body, a transmission/reception electrode 132 insulated by the insulator 133, and an I/O circuit 30 that exchanges data with an external information processing apparatus (not shown).

In addition, FIG. 2 illustrates a transmission circuit 134, a switch 135, a variable reactance section 136, an electric field detection optical section 137, a signal processing section 138, a switch 139, a demodulation circuit 140, a wave forming section 141, an amplitude monitor section 142, and a control signal generation section 143 as a configuration for transmitting and receiving data.

FIG. 3 illustrates a configuration of a variable capacitance reactance as an example of a variable reactance.

In FIG. 3, a variable capacitance reactance section 601 is provided with alternating signal terminals 609, 610, an inductor 687, a buffer amplifier 686, a variable capacitance diode 671 such as a varicap diode or the like, capacitors 685, 690, resistors 688, 691. The variable capacitance diode 671 and the inductor 687 compose a resonance circuit and electrostatic capacitance of the variable capacitance diode 671 is varied by a control signal 611 inputted from the control signal generation section 143, thereby enabling adjustment of a resonance frequency. By the way, since there is a limit to a voltage applicable (withstand voltage), the variable capacitance diode 671 has to be used in a voltage range not exceeding the withstand voltage.

In addition, in an electric field communication transceiver employing a variable reactance, it is difficult to adjust a reactance value to a best-suited or substantially best-suited value unless the amplitude monitor section and the control signal generator are used. When accompanying the amplitude monitor section and the control signal generator, a circuit dimension of the electric field communication transceiver becomes larger, which is inconvenient in terms of integration into a wearable computer. Additionally, it is also inconvenient because power consumption may be increased.

Regarding power consumption, the following problem may arise. For example, an electric field communication transceiver may be applicable to entering/leaving management in a certain building or room. In this case, when the mobile terminal operates on a battery, such a mobile terminal is inconvenient and less secured because a person carrying such a mobile terminal cannot come out of the room if the battery becomes dead after he or she has entered the room.

In order to circumvent such inconveniency, there is required a mechanism in which electric power is provided to the mobile terminal (electric field communication transceiver) in a designated place to activate the mobile terminal and transmit data. If this is implemented in electric field communication, users can open a gate only by touching a part of the gate without taking the mobile terminal such as an ID card or the like out of their pocket, which can improve convenience.

FIG. 5 illustrates a system in which the transceiver illustrated in FIG. 4 is used as an installed terminal side transceiver to which electric power is supplied. In a transceiver 701 as illustrated in FIG. 4, a ground 711 of a transmission circuit 703 that modulates data to be transmitted by a predetermined frequency f and outputs the modulated data is apart away from an earth ground 702, thereby causing parasitic capacitance $C_g$ 704 therebetween.

In addition, there is caused parasitic capacitance $C_{sb}$ 704 between the ground 711 of the transmission circuit 703 and a living body 700 and parasitic capacitance $C_b$ 705 between the living body 700 and the earth ground 702. In order to increase a voltage applied to the living body by causing resonance with these parasitic capacitances, a reactance section 710 is inserted between the transmission circuit 703 and a transmission/reception electrode 713.

FIG. 5 is a schematic view of a system enabling an electric power transmission employing the transceiver 701 of FIG. 4. In FIG. 5, $C_{gs}$ 726 represents parasitic capacitance between the transmission/reception electrode 727 and an earth ground 730; $C_b$ 723 represents parasitic capacitance between the living body and the earth ground; $C_g$ 722 represents parasitic capacitance between a ground 725 of the mobile terminal side transceiver 716 and the earth ground 730; and $Z_L$ 718 ($Z_L=R_L+X_L$) represents impedance of the mobile terminal side transceiver 716.

When $C_{sg}$ 724 and $C_b$ 723 are so small as to be neglected, series resonance is caused by a reactance $X_v$ 719, $C_g$ 722, and $Z_L$ 718, thereby applying a higher voltage to a resistance component Re $[Z_L]=R_L$ of $Z_L$ 718 to which electric power is supplied. However, $C_{sg}$ 724 and $C_b$ 723 are rather large in fact and not neglected, it is difficult to apply a higher voltage to $R_L$.

The present invention has been made in view of the above disadvantages and the objective thereof is, first of all, a provision of a transmission device and a transceiver that are capable of preventing a reduction in amplitude of transmission voltage due to an increase in parasitic capacitance between the transmission/reception electrode and the living body that is prompted by down-sizing the transceiver or transmission device, preventing a reduction in voltage to be applied to an electric field transmission medium, and improving electric communication quality.

In addition, another objective of the present invention is a provision of an electric field transceiver that is capable of improving a withstand voltage characteristic of a variable capacitance diode, thereby preventing resonance suppression arising from an electric characteristic of a variable capacitance diode, and realizing an electric field communication with sufficient intensity.

Moreover, yet another objective of the present invention is a provision of an electric field communication transceiver in which there is realized a variable reactance means capable of self-compensating without any compensation circuit for a reactance value, thereby realizing improved communication at a lower consumption of electric power with a compact circuit.

Furthermore, the objective of the present invention is a provision of an electric field communication transceiver and an electric field communication system that are capable of applying a higher voltage from an installation terminal side transceiver to a mobile terminal side transceiver, thereby supplying electric power to the mobile terminal side transceiver.

DISCLOSURE OF INVENTION

In order to achieve the objective, a first aspect of the present invention provides a transmission device that induces an electric field based on data to be transmitted and transmits the data to be transmitted via the induced electric field. The transmission device comprises a transmission means configured to transmit a modulated signal obtained by modulating the data to be transmitted with an alternating signal having a predetermined frequency, a transmission electrode configured to induce an electric field based on the modulated signal in the electric field transmission medium, a first reactance means provided between an output of the transmission means and the transmission electrode so as to cause resonance with each of parasitic capacitance produced between a ground of the transmission means and an earth ground, parasitic capacitance produced between the electric field transmission medium and the ground of the transmission means, and parasitic capacitance produced between the electric field transmission medium and the earth ground, and a second reactance means provided between the output of the transmission means and the ground of the transmission means or between the transmission electrode and the ground of the transmission means so as to cause resonance with each of the parasitic capacitances.

A second aspect of the present invention provides a transmission device according to the first aspect, wherein either one of the first reactance means and the second reactance means is a variable reactance means of which reactance value is adjustable, and wherein there is provided a reactance control means configured to control the reactance value of the variable reactance means so that a voltage which the transmission means applies to the electric field transmission medium becomes peaked.

A third aspect of the present invention provides a transmission device according to the first aspect, wherein the first reactance means and the second reactance means are both a variable reactance means of which reactance value is adjustable, and wherein there is provided a reactance control means configured to control each reactance value of the first reactance means and the second reactance means so that a voltage which the transmission means applies to the electric field transmission medium becomes peaked.

A fourth aspect of the present invention provides a transmission device according to the third aspect, wherein the reactance control means includes an adjustment signal generation means configured to generate an adjustment signal for use in adjustment of the reactance value, an amplitude detection means configured to use the adjustment signal outputted from the adjustment signal generation means so as to detect an amplitude of the voltage, a first control signal generation means configured to output a control signal that controls a reactance value of the first variable reactance means in accordance with the amplitude detected by the amplitude detection means, a second control signal generation means configured to output a control signal that controls a reactance value of the second variable reactance means in accordance with the amplitude detected by the amplitude detection means, a connection means configured to connect the amplitude detection means with the first control signal generation means in controlling of the reactance value of the first variable reactance means and to connect the amplitude detection means with the second control signal generation means in controlling of the reactance value of the second variable reactance means.

A fifth aspect of the present invention provides a transmission according to the fifth aspect, wherein the second variable reactance means is provided between the transmission electrode and the ground of the transmission means, wherein the reactance control means controls to adjust each reactance value of the first variable reactance means and the second variable reactance means so that a voltage of the transmission applied to the electric field transmission medium becomes peaked and, after the reactance value of the second reactance means has been adjusted, the reactance control means varies minutely the reactance value, wherein there is provided a resistor to be connected in series with the second variable reactance means and the transmission means at the time of adjusting a reactance value of the second variable reactance means, and wherein there is provided a connection means configured to connect the resistor with the transmission means at the time of adjusting a reactance value of the second variable reactance means, and to connect the transmission means with the first variable reactance means and the resistor with the ground of the transmission means at the time of adjusting a reactance value of the first variable reactance means.

A sixth aspect of the present invention provides a transmission device according to the third aspect, wherein the second variable reactance means is provided between the output of the transmission means and the ground of the transmission means, wherein the reactance control means controls to adjust each reactance value of the first variable reactance means and the second variable reactance means so that a voltage of the transmission applied to the electric field transmission medium becomes peaked and, after the reactance value of the first reactance means has been adjusted, the reactance control means varies minutely the reactance value, and wherein there is provided a connection means configured to disconnect the second variable reactance means from the ground of the transmission means at the time of adjusting a reactance value of the first variable reactance means and to connect the second variable reactance means with the ground of the transmission means at the time of adjusting a reactance value of the second variable reactance means.

A seventh aspect of the present invention provides a transmission device according to the third aspect, wherein there is provided a self-adjusting variable reactance means in either the first variable reactance means or the second variable reactance means. The self-adjusting variable reactance means includes a resonance circuit for causing resonance with the parasitic capacitances, the resonance circuit being provided with an inductor and a variable capacitance diode of which electrostatic capacitance varies in accordance with a voltage applied thereto, and a resistor for applying a voltage across the anode and the cathode of the variable capacitance diode, the voltage being in accordance with a direct current obtained by rectifying with the variable capacitance diode a transmission signal inputted to the resonance circuit, and wherein a reactance value of either one of the first variable reactance means and the second variable reactance means is controlled by the reactance control means so that a voltage of the transmission applied to the electric field transmission medium becomes peaked, the either one of the variable reactance means being except for the self-adjusting variable reactance means.

An eighth aspect of the present invention provides an electric field communication transceiver that induces an electric field based on data to be transmitted in an electric field transmission medium to transmit the data to be transmitted via the induced electric field and receives data to be received via an electric field based on the data to be received that is induced in the electric field transmission medium. The transceiver comprises a transmission means configured to transmit a modulated signal obtained by modulating the data to be transmitted with an alternating signal having a predetermined frequency, a transmission reception electrode configured to induce an electric field based on the modulated signal in the electric field transmission medium and receive electric field based on data to be received, a first reactance means provided between the output of an transmission means and the transmission reception electrode so as to cause resonance with each of parasitic capacitance produced between a ground of the transmission means and an earth ground, parasitic capacitance produced between the electric field transmission medium and the ground of the transmission means, and parasitic capacitance produced between the electric field transmission medium and the earth ground, a second reactance means provided between the output of the transmission means and the ground of the transmission means or between the transmission reception electrode and the ground of the transmission means so as to cause resonance with each of the parasitic capacitances, a reception means configured to detect an electric field based on the data to be received, to convert the electric field into an electric signal, and to demodulate the signal so as to receive the data, a first connection means configured to disconnect a signal path from the output of the transmission means through the transmission reception electrode so as to prevent leakage of a reception signal to the transmission means at the time of receiving and to connect the signal path from the output of the transmission means through the transmission reception electrode so as to output a transmission signal to the transmission reception electrode at the time of transmitting, and a second connection means configured to disconnect the second reactance means from the ground of the transmission means so as to prevent leakage of the reception signal to the ground of the transmission means at the time of receiving, and to connect the second reactance means with the ground of the transmission means so as to allow the second reactance means to cause resonance at the time of transmitting.

A ninth aspect of the present invention provides a electric field communication transceiver according to the eighth aspect, wherein either one of the first reactance means and the second reactance means is a variable reactance means of which capacitance value is variable, and wherein there is provided a reactance means configured to control a reactance value of the variable reactance means so that a voltage of the transmission which the transmission means applies to the electric field transmission medium becomes peaked.

A tenth aspect of the present invention provides an electric field communication transceiver according to the eighth aspect, wherein the first reactance means and the second reactance means are a variable reactance means of which capacitance value are both a variable reactance means of which capacitance value is variable, and wherein there is provided a reactance control means configured to control each reactance value of the first reactance means and the second reactance means so that a voltage of the transmission that the transmission means applies to the electric field transmission medium becomes peaked.

An eleventh aspect of the present invention provides an electric field communication transceiver according to the tenth aspect, wherein the reactance control means includes an adjustment signal generation means configured to generate an adjustment signal for use in adjusting the reactance value, an amplitude detection means configured to use the adjustment signal outputted from the adjustment signal generation means so as to detect an amplitude of a voltage of the transmission, a first control signal generation means configured to output based on the amplitude detected by the amplitude detection means a control signal to control a reactance value of the first variable reactance means, a second control signal generation means configured to output based on the amplitude detected by the amplitude detection means a control signal to control a reactance value of the second variable reactance means, and a connection means configured to connect the amplitude detection means with the first control signal generation means in controlling of the reactance value of the first variable reactance means and to connect the amplitude detection means with the second control signal generation means in controlling of the reactance value of the second variable reactance means.

A twelfth aspect of the present invention provides an electric field communication transceiver according to the tenth aspect, wherein the second variable reactance means is provided between the transmission electrode and the ground of the transmission means, wherein the reactance control means controls to adjust each reactance value of the first variable reactance means and the second variable reactance means so that a voltage of the transmission applied to the electric field transmission medium becomes peaked and, after the reactance value of the second reactance means has been adjusted, the reactance control means varies minutely the reactance value, and wherein there are provided a resistor to be connected in series with the second reactance means and the transmission means at the time of adjusting a reactance value of the second variable reactance means, and a connection means configured to connect the resistor with the transmission means at the time of adjusting a reactance value of the second variable reactance means and to connect the transmission means with the first variable reactance means and the resistor with the ground of the transmission means at the time of adjusting a reactance value of the first variable reactance means.

A thirteenth aspect of the present invention provides an electric field communication transceiver according to the tenth aspect, wherein the second variable reactance means is provided between the output of the transmission means and the ground of the transmission means, wherein the reactance control means controls to adjust each reactance value of the first variable reactance means and the second variable reactance means so that a voltage of the transmission applied to the electric field transmission medium becomes peaked and, after the reactance value of the first reactance means has been adjusted, the reactance control means varies minutely the reactance value, and wherein there is provided a connection means configured to disconnect the second variable reactance means from the ground of the transmission means at the time of adjusting a reactance value of the first variable reactance means and to connect the second variable reactance means and the ground of the transmission means at the time of adjusting a reactance value of the second variable reactance means.

A fourteenth aspect of the present invention provides an electric field communication transceiver according to the tenth aspect, wherein there is provided a self-reactance means in either the first variable reactance means or the second variable reactance means. The self-reactance means includes a resonance circuit for causing resonance with the parasitic capacitances, the resonance circuit being provided with an inductor and a variable capacitance diode of which electrostatic capacitance varies in accordance with a voltage applied thereto, and a resistor for applying a voltage across the anode and the cathode of the variable capacitance diode, the voltage being in accordance with a direct current obtained by rectifying with the variable capacitance diode a transmission signal inputted to the resonance circuit, and wherein a reactance value of either one of the first variable reactance means and the second variable reactance means is controlled by the reactance control means so that a voltage of the transmission applied to the electric field transmission medium becomes peaked, the either one of the variable reactance means being except for the self-adjusting variable reactance means.

A fifteenth aspect of the present invention provides an electric field communication transceiver according to the tenth aspect, wherein the second variable reactance means is provided between the transmission reception electrode and the ground of the transmission means, wherein the reactance control means controls to adjust each reactance value of the first variable reactance means and the second variable reactance means so that a voltage of the transmission applied to the electric field transmission medium becomes peaked, and, after the reactance value of the second reactance means has been adjusted, the reactance control means varies minutely the reactance value, and wherein the first connect means (31) connects the resistor with the transmission means at the time of adjusting a reactance value of the second variable reactance means; connects the transmission means with the first variable reactance means and the resistor with the ground of the transmission means at the time of adjusting a reactance value of the first variable reactance means; and disconnects the first variable reactance means from the transmission means at the time of reception.

A sixteenth aspect of the present invention provides an electric field communication transceiver according to the tenth aspect, wherein the second reactance means is provided between the output of the transmission means and the ground of the transmission means, wherein the reactance control means controls to adjust each reactance value of the first variable reactance means and the second variable reactance means so that a voltage of the transmission applied to the electric field transmission medium becomes peaked, and, after the reactance value of the first reactance means has been adjusted, the reactance control means varies minutely the reactance value, and wherein the second connection means disconnects the second variable reactance means from the ground of the transmission means at the time of adjusting a reactance value of the first variable reactance means, and connects the second variable reactance means with the ground of the transmission means at the time of adjusting a reactance value of the second variable reactance means.

A seventeenth aspect of the present invention provides an electric field communication transceiver according to any one of the eighth through the sixteenth aspect, wherein an input to the reception means is connected to the first connection means, and wherein the first connection means disconnects a signal path from the transmission reception electrode to the input of the reception means at the time of transmission, and connects the signal path from the transmission reception electrode to the input of the reception means.

According to the first through the seventeenth aspect of the present invention, there can be provided a transmission device or a transceiver that is capable of preventing a reduction in the amplitude of the transmission voltage the reduction resulting from an increase due to downsizing of the transceiver or the transmission device in parasitic capacitance between the transmission electrode and the living body, and thus preventing a reduction in voltage applied to the electric field transmission medium, thereby improving a quality of electric field communications.

An eighteenth aspect of the present invention provides an electric field communication transceiver that carries out data communication via an electric field induced in an electric field transmission medium. The transceiver comprises a resonance circuit that is provided with an inductor for causing resonance in a transmission signal for the communication and a variable capacitance diode of which electrostatic capacitance varies in accordance with a voltage applied thereto, and a resistor that generates a voltage in accordance with a direct current obtained by rectifying with the variable capacitance diode the transmission signal inputted to the resonance circuit and applies the voltage across the anode and the cathode of the variable capacitance diode.

A nineteenth aspect of the present invention provides an electric field communication transceiver according to the eighteenth aspect, wherein the resonance circuit causes resonance with parasitic capacitance between a ground of the electric field communication transceiver and an earth ground and parasitic capacitance between the electric field transmission medium and the earth ground.

A twentieth aspect of the present invention provides an electric field communication transceiver according to the eighteenth or the nineteenth aspect, wherein the inductor, the variable capacitance diode, and the resistor are connected in series in the resonance circuit.

A twenty-first aspect of the present invention provides an electric field communication transceiver according to the eighteenth or the nineteenth aspect, wherein in the resonance circuit, the inductor is connected in series with a circuit in which the variable capacitance diode and the resistor are connected.

A twenty-second aspect of the present invention provides an electric field communication transceiver according to any one of the eighteenth through the twenty-first aspect, wherein the inductor arranges at one terminal or both terminals thereof a capacitor for blocking an input of a direct current thereto.

According to the eighteenth through the twenty-second aspect of the present invention, there can be provided an electric field transceiver that is realized of a variable reactance means that enables self-adjustment of the reactance value thereof by omitting a reactance compensation circuit, thereby carrying out low electricity consumption and excellent communications with a smaller circuit size.

A twenty-seventh aspect of the present invention provides an electric field communication transceiver that induces an electric field based on data to be transmitted in an electric field transmission medium to carry out data communication by use of the electric field and carries out data reception via an electric field based on data to be received that is induced in the electric field transmission medium, an alternating signal output means configured to output an alternating signal having a first frequency, a transmission reception electrode configured to induce an electric field based on data to be transmitted so as to transmit the data, and to detect an electric field based on data to be received so as to receive the data, a first reactance means provided between an output of the alternating signal output means and the transmission reception electrode, the first reactance means causing resonance between parasitic capacitance between the transmission reception electrode and an earth ground and impedance that the electric field transmission medium close to the transmission reception electrode shares with the earth ground, a second reactance means provided between the output of the alternating signal output means and the earth ground or between the transmission reception electrode and the earth ground, the second reactance means causing resonance between parasitic capacitance between the transmission reception electrode and the earth ground and impedance that the electric field transmission medium close to the transmission reception electrode shares with the earth ground, a reception means configured to detect an electric field of an alternating signal having a second frequency different from the first frequency, a first filter means configured to allow passage of the alternating signal having the first frequency and to block the alternating signal having the second frequency, and a second filter means configured to allow passage of the alternating signal having the second frequency and to block the alternating signal having the first frequency.

A twenty-eighth aspect of the present invention provides an electric communication transceiver according to the twenty-seventh aspect, wherein either the first reactance means or the second reactance means is a variable reactance means of which reactance value is variable, and wherein there is provided a reactance control means configured to control a reactance value of the variable reactance means so that a voltage of the transmission applied to the electric field transmission medium becomes peaked.

A twenty-ninth aspect of the present invention provides an electric field communication transceiver according to the twenty-seventh aspect, wherein the first reactance means and the second reactance means are a first variable reactance means and a second variable reactance means so that both of the reactance values thereof are variable, and wherein there is provided a reactance control means configured to control each reactance value of the first variable reactance means and the second variable reactance means so that a voltage of the transmission applied to the electric field transmission medium becomes peaked.

A thirtieth aspect of the present invention provides an electric field communication transceiver according to the twenty-eighth or the twenty-ninth aspect, wherein the reactance control means includes a calculation control memory section configured to store an amplitude of a transmission voltage applied to the electric field transmission medium for each reactance value of the first variable reactance means and the second variable reactance means and to extract a peak value of the amplitude, thereby to set each reactance value of the first variable reactance means and the second variable reactance means, and an amplitude detection means configured to detect amplitude of the transmission voltage.

A thirty-first aspect of the present invention provides an electric field communication transceiver according to the twenty-eighth or the twenty-ninth aspect, wherein the reactance control means includes an adjustment signal generation means configured to adjust each reactance value of the first variable reactance means and the second variable reactance means, an amplitude detection means configured to detect an amplitude of a transmission voltage by use of the adjustment signal outputted from the adjustment signal generation means, a first control signal generation means configured to output a signal to control a reactance value of the first variable reactance means in accordance with the amplitude detected by the amplitude detection means, a second control signal generation means configured to output a signal to control a reactance value of the second variable reactance means in accordance with the amplitude detected by the amplitude detection means, and a third connection means configured to connect at least the amplitude detection means with the first control signal generation means when a reactance value of the first variable reactance means is controlled, and to connect at least the amplitude detection means with the second control signal generation means when a reactance value of the second variable reactance means is controlled.

A thirty-second aspect of the present invention provides an electric field communication transceiver according to the twenty-seventh aspect, wherein there are employed a self-adjusting variable reactance means in either the first reactance means or the second reactance means, the self-adjusting variable reactance means including a resonance circuit that is provided with an inductor and a variable capacitance diode of which electrostatic capacitance varies in accordance with a voltage applied thereto and configured to cause resonance with the parasitic capacitances, and a resistor configured to apply a voltage across the anode and the cathode of the variable capacitance diode, the voltage being generated by rectifying with the variable capacitance diode a transmission signal inputted to the resonance circuit, wherein the reactance control means controls one of the variable reactance means so that a voltage of the transmission applied to the electric field transmission medium becomes peaked, the one of the variable reactance means being not the self-adjusting variable reactance means.

A thirty-third aspect of the present invention provides an electric field communication transceiver according to any one of the twenty-ninth through the thirty-first aspect, wherein both the first reactance means and the second reactance means employ a self-adjusting variable reactance means including a resonance circuit that is provided with an inductor and a variable capacitance diode of which electrostatic capacitance varies in accordance with a voltage applied thereto and configured to cause resonance with the parasitic capacitances, and a resistor applying a voltage across the anode and the cathode of the variable capacitance diode, the voltage being generated in accordance with a direct current obtained by rectifying the transmission signal inputted to the resonance circuit, and wherein the reactance control means controls one of the variable reactance means so that a voltage of the transmission applied to the electric field transmission medium becomes peaked, the one of the variable reactance means being not the self-adjusting variable reactance means.

A thirty-fourth aspect of the present invention provides an electric field communication system composed by combining the electric field communication transceiver according to any one of the twenty-seventh through the thirty-second with a second electric field communication transceiver, the second electric field communication transceiver comprising a transmission reception electrode configured to carry out induction of electric field based on data to be transmitted and reception of electric field based on data to be received, a rectifying electric power storage means configured to rectify an alternating signal having a first frequency, the signal being transmitted from the electric field communication transceiver, so as to generate a direct electric power and to output the electric power, a transmission means configured to modulate data to be transmitted with an alternating signal having a second frequency different from the first frequency so as to generate and transmit the modulated signal, a control data storage means configured to carry out storage of the data to be transmitted, output of the data to be transmitted to the transmission means, and control of the electric field communication transceiver, a first filter means configured to allow passage of an alternating signal having the first frequency and to block an alternating signal having the second frequency, and a second filter means configured to allow passage of an alternating signal having the second frequency and to block an alternating signal having the first frequency.

A thirty-fifth aspect of the present invention provides an electric field communication system according to the thirty-fourth aspect, wherein an alternating signal output means of the electric field communication transceiver is comprised of a transmission means configured to modulate the data to be transmitted with an alternating signal having the first frequency so as to generate and transmit the modulated signal, and wherein the second electric field communication transceiver is provided with a reception means configured to detect an alternating field having the second frequency in accordance with the data to be received so as to convert the detected electric field into an electric signal and demodulate the electric signal.

According to the twenty-seventh through the thirty-fifth aspect, there can be provided an electric field communication transceiver and an electric field communication system that is capable of applying a larger voltage to the mobile terminal side transceiver from the installed terminal side transceiver, thereby transmitting electric power to the mobile terminal side transceiver.

BEST MODE FOR CARRYING OUT THE INVENTION

Figure 1:
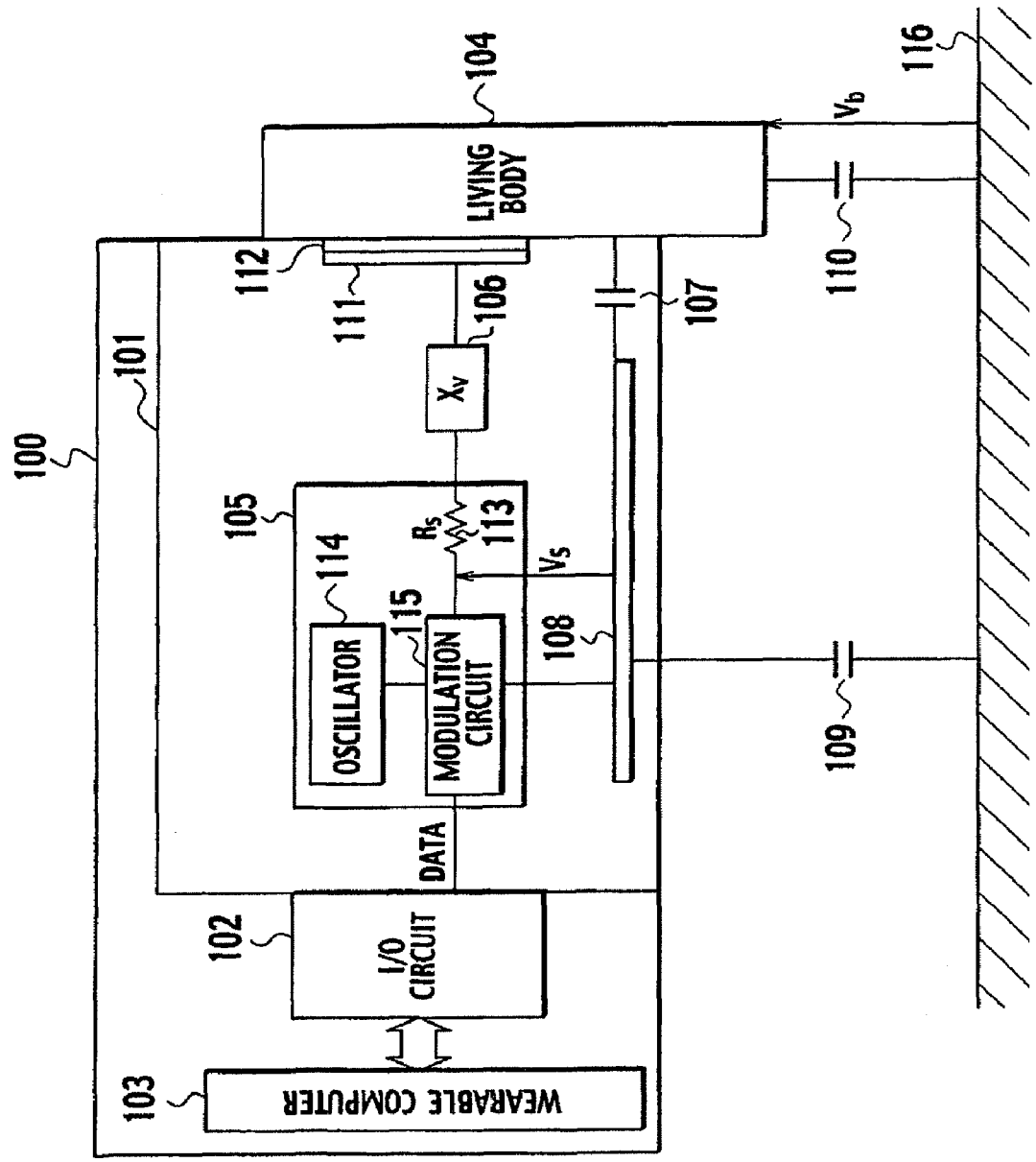
FIG. 1 is an explanatory view of a transceiver according to related art.
Figure 2:
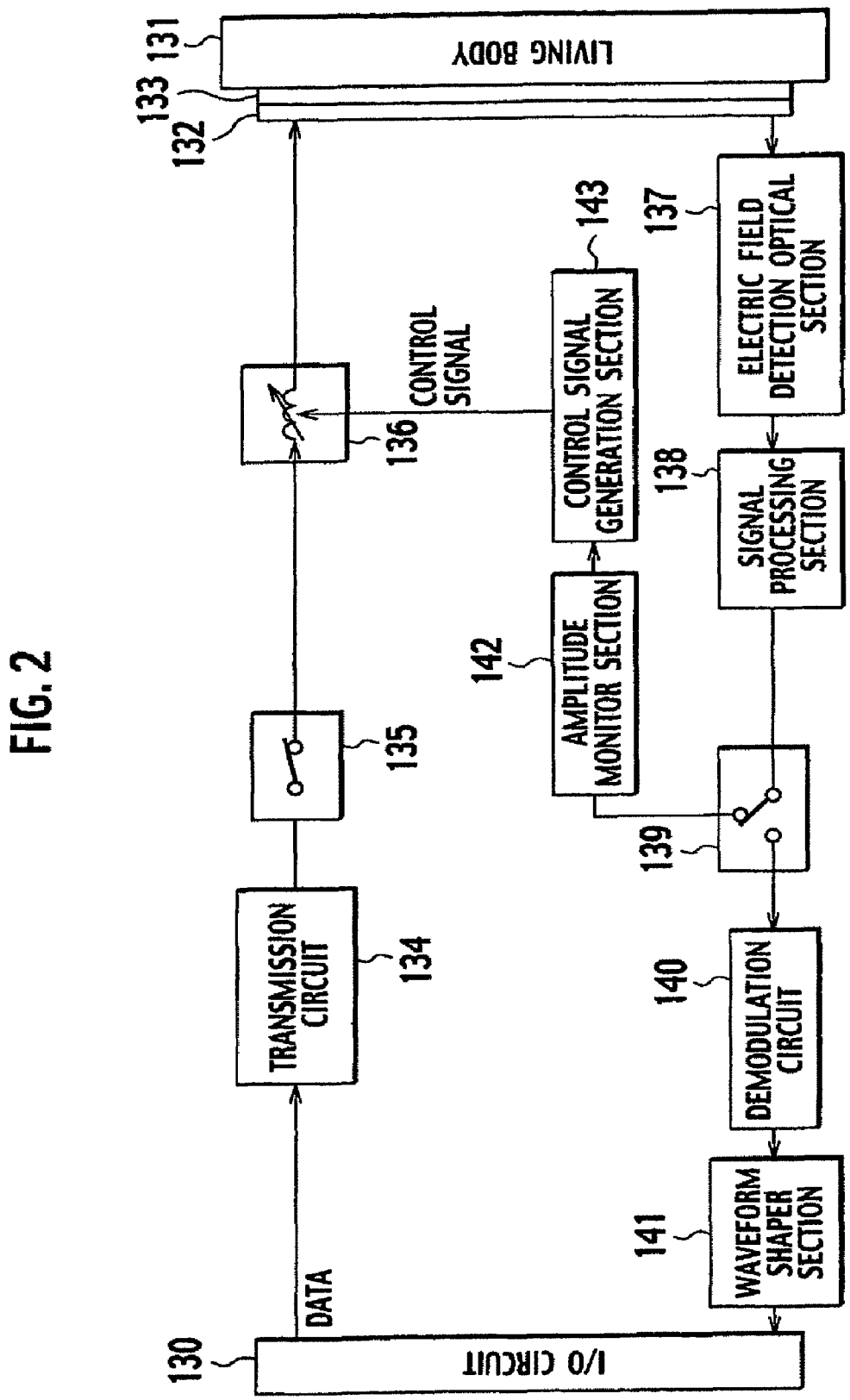
FIG. 2 is a schematic diagram of an electric field communication transceiver employing a variable reactance section according to related art.
Figure 3:
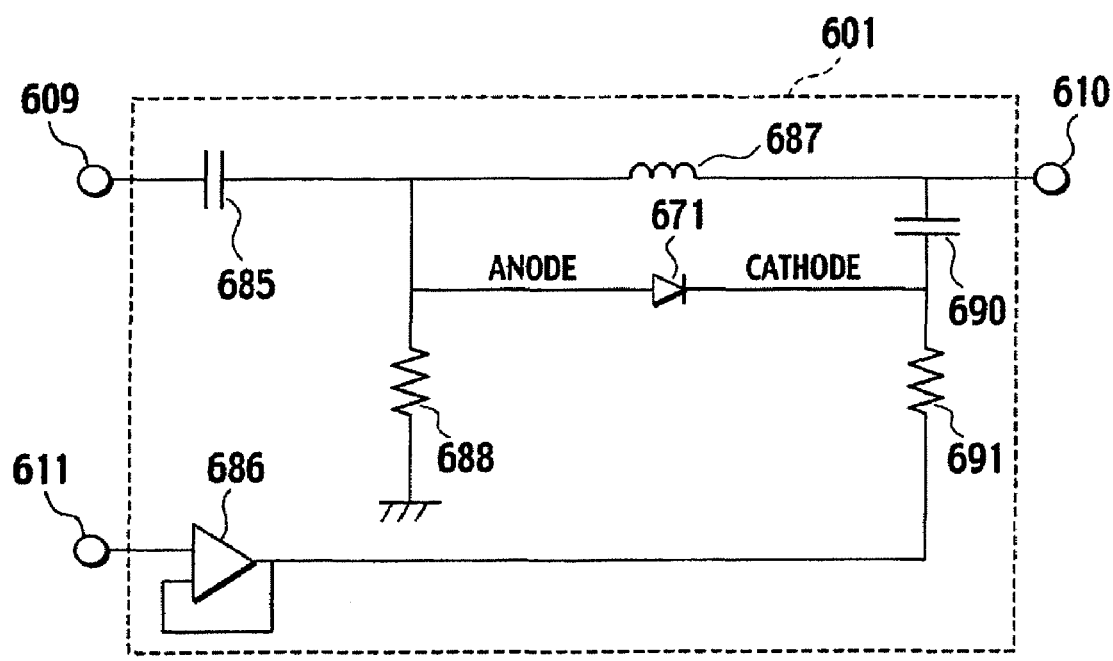
FIG. 3 is a schematic diagram for explaining a variable reactance section according to related art.
Figure 4:
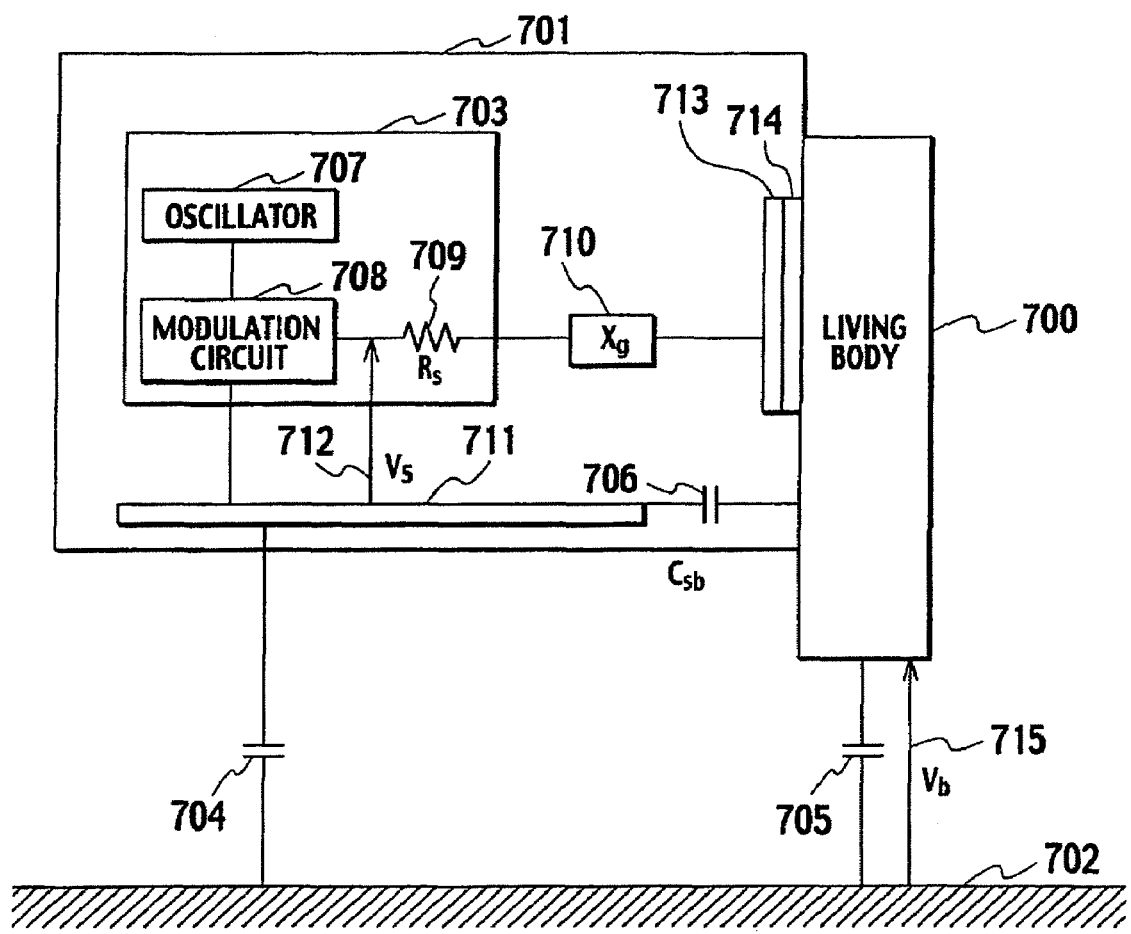
FIG. 4 is an explanatory view illustrating a configuration of another related-art electric field communication transceiver.
Figure 5:
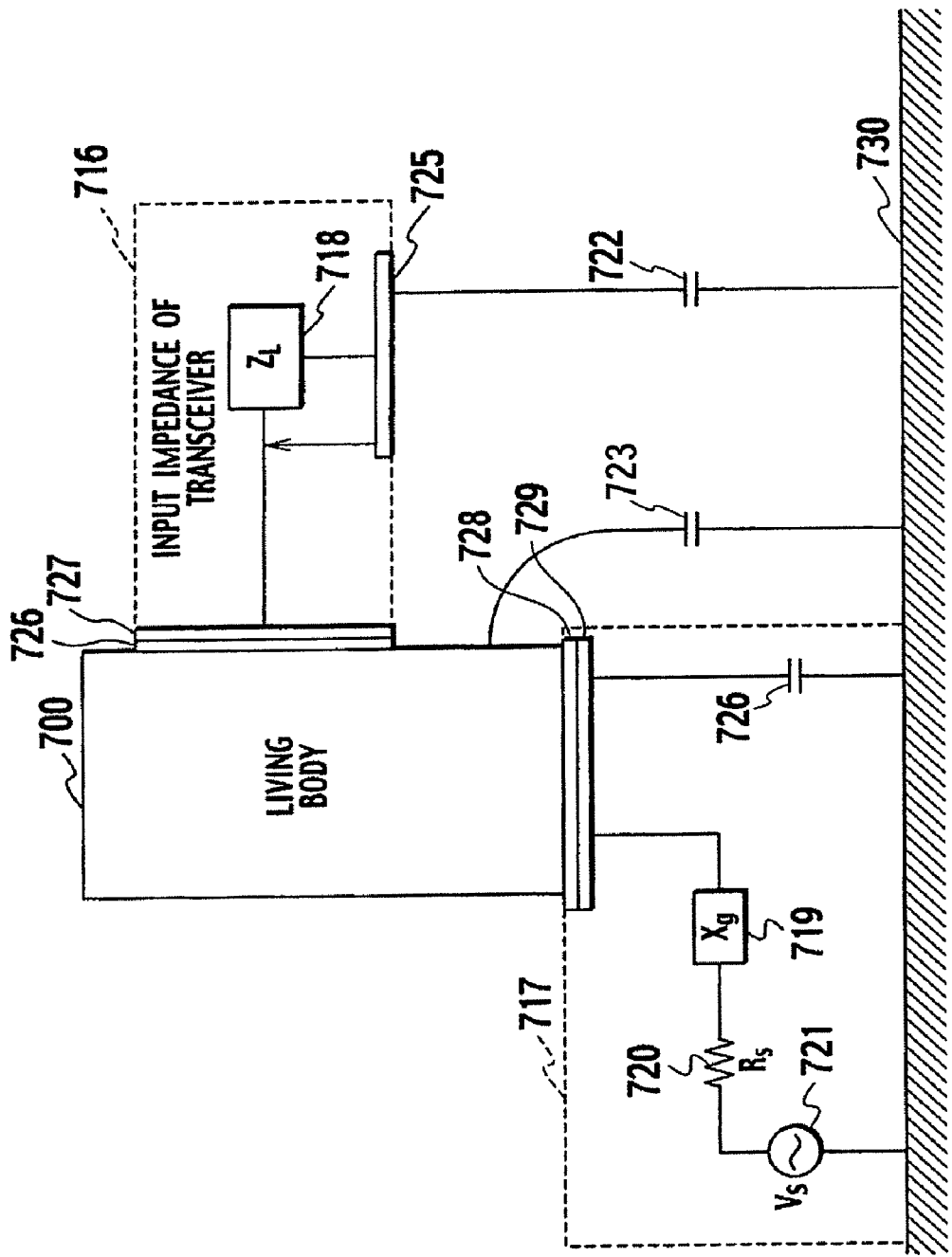
FIG. 5 is an explanatory view illustrating a configuration of an electric field communication system employing the electric field communication transceiver illustrated in FIG. 4.
Figure 6:
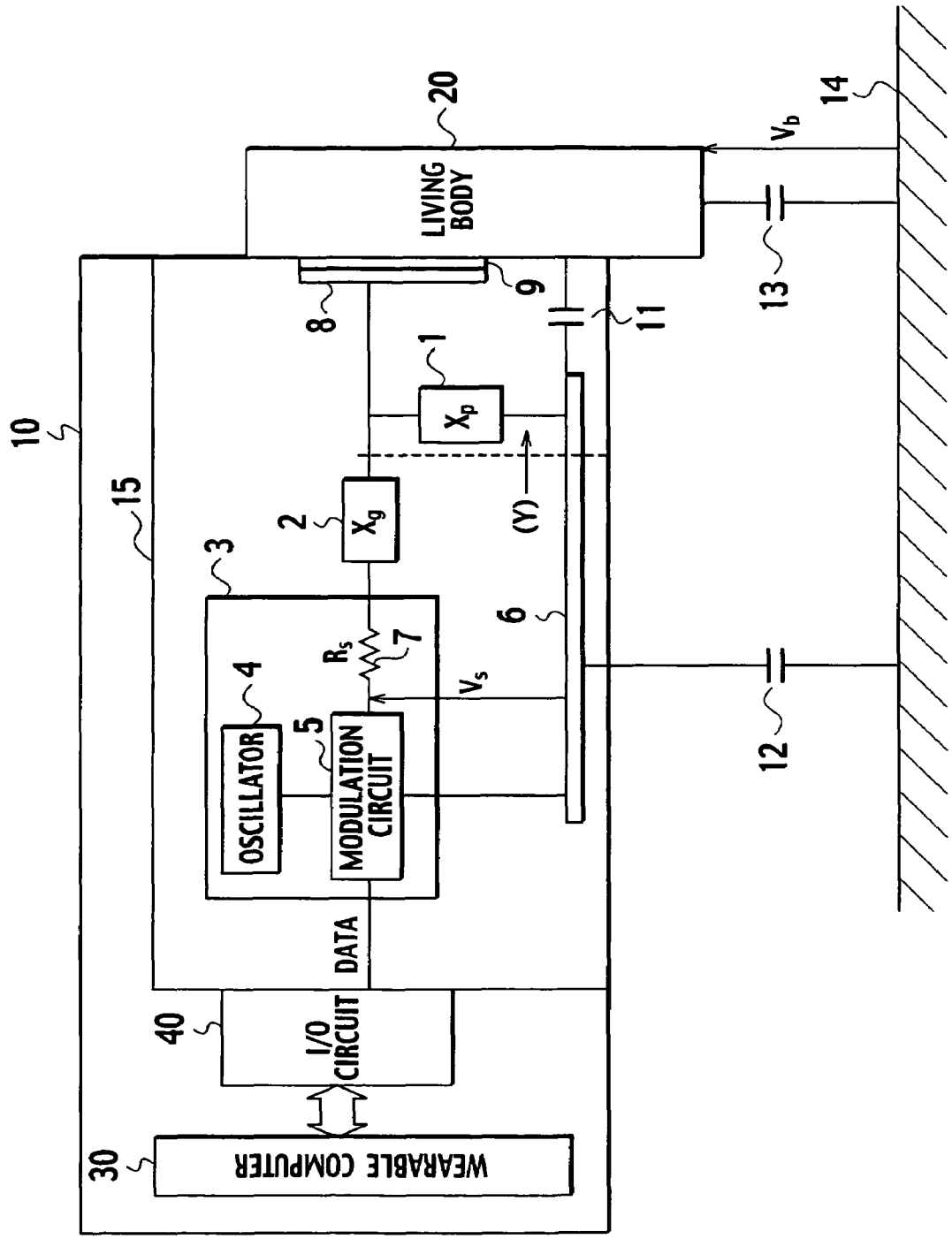
FIG. 6 is an explanatory view of a basic configuration of a transmission section of an electric field communication transceiver according to embodiments of the present invention.

FIG. 6 illustrates a circuit model of a transmission section and a living body in order to explain a basic configuration of embodiments of the present invention.

In FIG. 6, a mobile terminal 10, a transceiver 15, an I/O circuit 40, and a wearable computer 30 are illustrated. The mobile terminal 10 meets a living body 20 such as a human body by use of a transmission electrode 8 having an insulator 9 therebetween. Between the living body and an earth ground 14 such as a floor and an earth surface, there exists parasitic capacitance $C_b$ 13 between the living body 20 and the earth ground 14 and furthermore between the transceiver 15 and the earth ground 14, there exists parasitic capacitance $C_g$ 12 between a ground of the transceiver 15 and the earth ground 14.

The transceiver 15 provided in the mobile terminal 10 includes a transmission circuit 3, an oscillator 4 provided in the transmission circuit 3, and a modulation circuit 5. Transmission output of the transmission circuit 3 is transmitted to the living body 20 through the transmission electrode 8.

The transmission circuit 3 includes a transmission resistor $R_s$ 7 thereinside. Between the transmission circuit 3 and the transmission electrode 8, there exists a reactance $X_g$ 2 in series, and between the transmission electrode 8 and a circuit ground 6, there exists a reactance $X_p$ 1. In addition, between the circuit ground 6 and the living body 20, there exists parasitic capacitance $C_{sb}$ 11.

In a first embodiment of the present invention, a voltage $V_b$ applied to the living body 20 is raised by utilizing resonance employing two reactances (the reactance $X_g$ 2 and the reactance $X_p$ 1).

Reactance values of the reactance $X_g$ 2 and the reactance $X_p$ 1 in FIG. 6 are designated as $X_g$ and $X_p$, respectively. Admittance (Y) in the left hand side with respect to a broken line in FIG. 6 is expressed as follows:

$$Y = (1/jX_p) + j\omega C_b + j\omega((C_b^{-1} + C_g^{-1})^{-1}) \quad (1)$$

Using this equation, $V_b$ is expressed as:

$$V_b = \frac{C_b}{C_g + C_b} \frac{Y^{-1}}{R_s + jX_g + Y^{-1}} V_s \quad (2)$$

$$= \frac{C_b}{C_g + C_b} \frac{1}{1 + (R_s + jX_g)Y} V_s$$

By substituting the equation (1) into the equation (2), the following equation will be obtained:

$$V_b = V_s / \quad (3)$$
$$(1 + (C_b/C_g) - X_g(\omega(C_b + C_{sb}(1 + C_b/C_g)) - (1 + C_b/C_g)/X_p) +$$
$$jR_s(\omega[C_b + C_{sb}(1 + C_b/C_g)] - (1 + C_b/C_g)/X_p))$$

When $X_g$ is considered as a variable, the amplitude $|V_b|$ becomes peaked at $$X_g = (1 + C_b/C_g)/\{\omega[C_b + C_{sb}(C_b/C_g)] - (1 + C_b/C/X_p\} \quad (4)$$

and, the value thereof becomes:

$$|V_b| = \frac{1}{R_s\{\omega[C_b + C_{sb}(1 + C_b/C_g)] - (1 + C_b/C_g)/X_p\}} |V_s| \quad (5)$$

In the equation (5), the amplitude can be increased by the reactance $X_p$ 1. Therefore, a signal having a larger amplitude can be applied to the living body 20 by the configuration according to the present invention.

Figure 7:
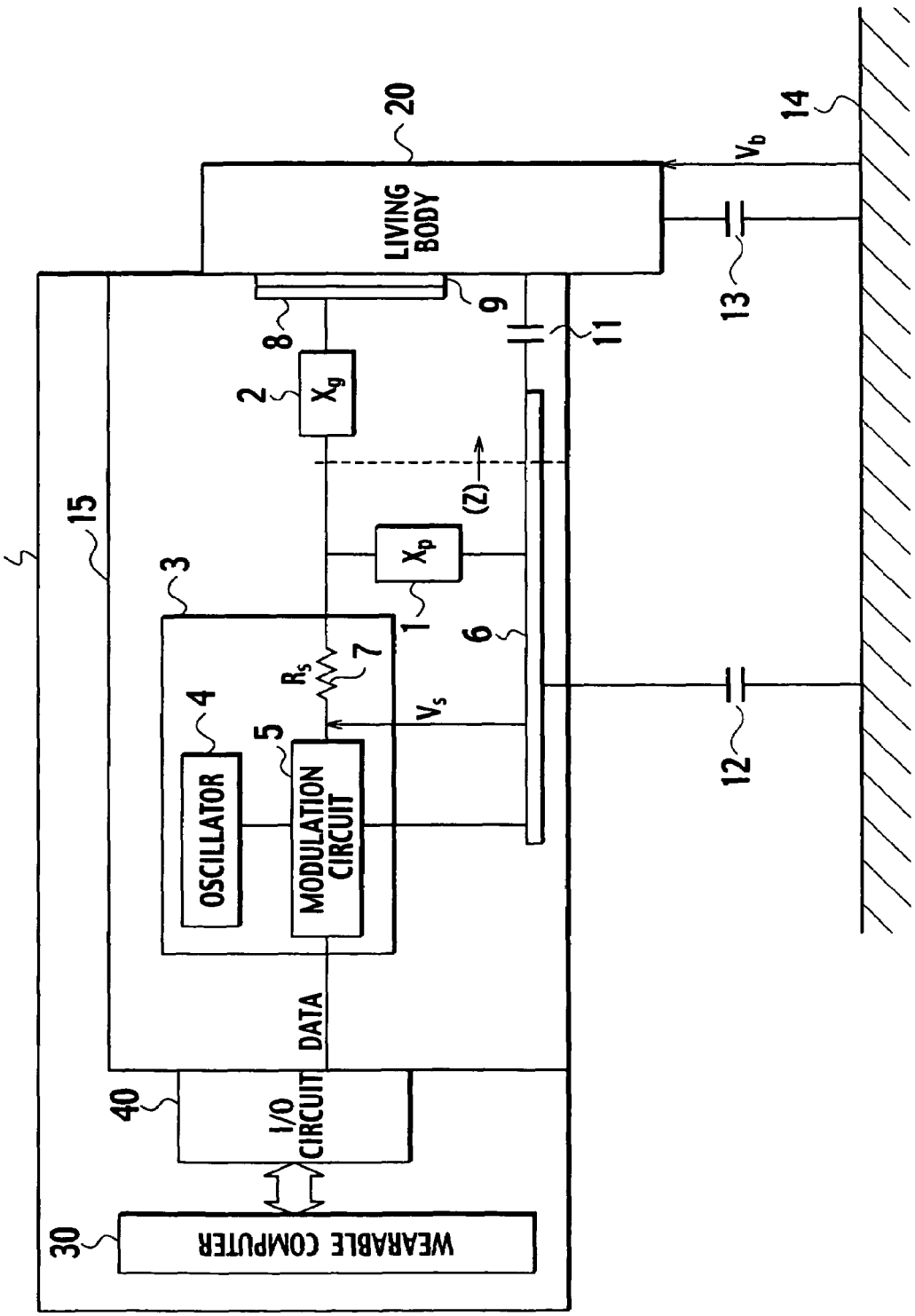
FIG. 7 is an explanatory view of a second basic configuration of a transmission section of an electric field communication transceiver according to embodiments of the present invention.

FIG. 7 illustrates a circuit model in which the reactance $X_p$ 1 is connected between a transmission output of the transmission circuit 3 and the circuit ground 6 of the transmission circuit 3. Impedance (Z) in the left hand side with respect to a broken line in FIG. 7 is expressed as follows:

$$Z = jX_g + \frac{1}{j\omega\{C_{sb} + (C_b^{-1} + C_g^{-1})^{-1}\}} \quad (6)$$

Using this equation, $V_b$ is expressed as:

$$V_b = \frac{C_b}{C_g + C_b} \frac{\frac{1}{j\omega\{C_{sb} + (C_b^{-1} + C_g^{-1})^{-1}\}}}{Z} \quad (7)$$
$$\frac{\frac{jX_pZ}{Z + jX_p}}{R_s + \frac{jX_pZ}{Z + jX_p}} V_s$$

-continued
$$= \frac{C_b}{C_g + C_b} \frac{1}{j\omega\{C_{sb} + (C_b^{-1} + C_g^{-1})^{-1}\}}$$
$$\frac{jX_p}{R_s(Z + jX_p) + jX_pZ} V_s$$

By substituting the equation (6) into the equation (5), the following equation will be obtained:

$$V_b = V_s / \left\{ \begin{array}{l} 1 + (C_b/C_g) - \omega X_g[C_b + C_{sb}(1 + C_b/C_g)] + \\ jR_s \left\{ \begin{array}{l} \omega[C_b + C_{sb}(1 + C_b/C_g)] - \\ \left[ \begin{array}{l} (1 + C_b/C_g) - \omega X_g \\ [C_b + C_g(1 + C_b/C_g)] \end{array} \right] / X_p \end{array} \right\} \end{array} \right\} \quad (8)$$

When $X_p$ is considered as a variable, the amplitude $|V_b|$ becomes peaked at $$X_p = \frac{1 + C_b/C_g}{\omega\{C_b + C_{sb}(1 + C_b/C_g)\}} - X_g \quad (8)$$

and the value thereof is expressed as:

$$|V_b| = \frac{1}{1 + (C_b/C_g) - \omega X_g[C_b + C_{sb}(1 + C_b/C_g)]} |V_s| \quad (9)$$

In the equation (9), the amplitude can be increased by the reactance $X_g$ 2. Therefore, a signal having a larger amplitude can be applied to the living body 20 by this configuration.

A First Embodiment

Figure 8:
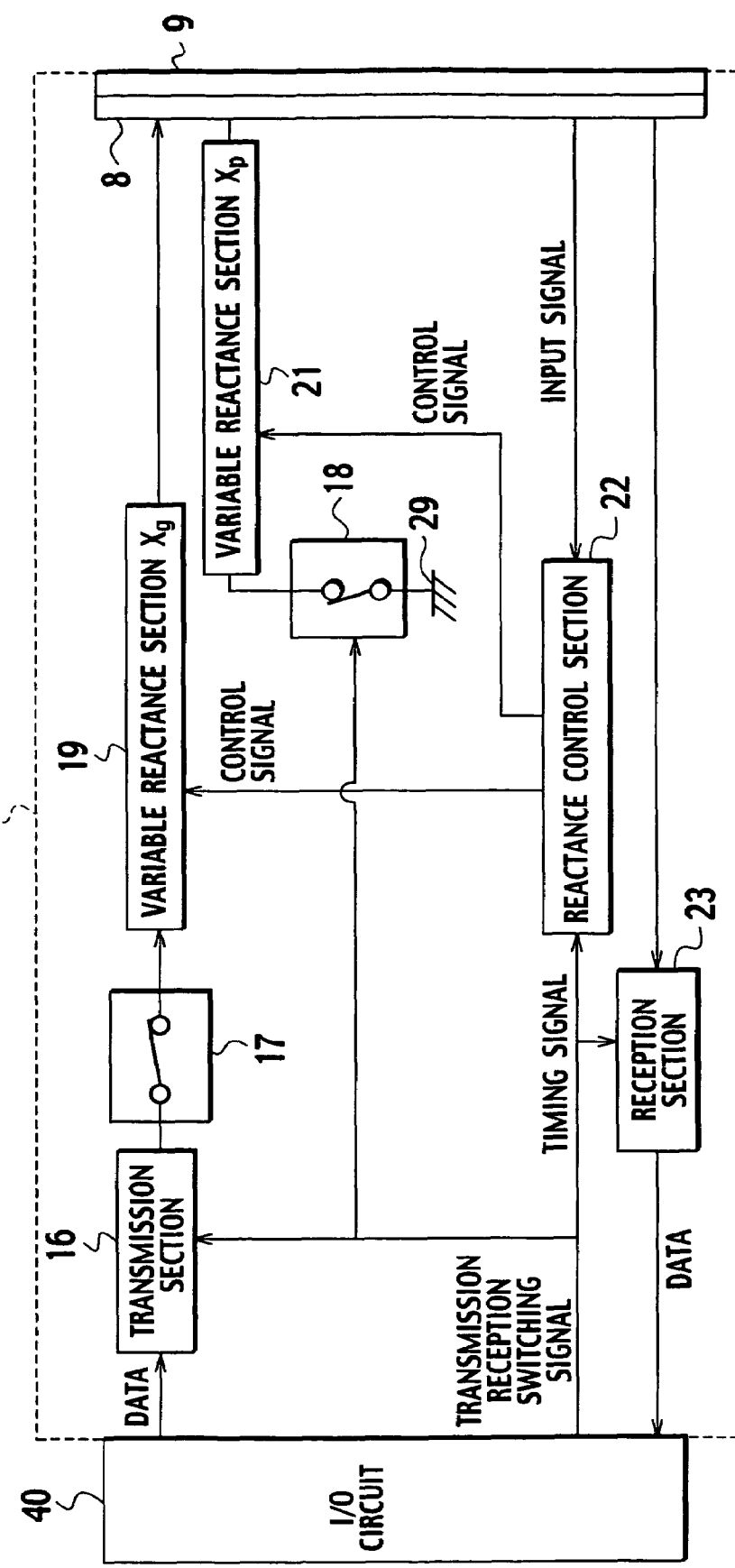
FIG. 8 is a block diagram for explaining an electric field communication transceiver according to a first embodiment of the present invention.

FIG. 8 illustrates a block diagram of a transceiver 15 according to a first embodiment of the present invention.

In FIG. 8, the transceiver 15 indicated by a broken line, an I/O circuit 40 connected to the transceiver 15, an insulator 9 that contacts to the living body 20 (not shown, but referable to in FIG. 6), and a transmission/reception electrode 8 disposed beneath the insulator 9.

In addition, the transceiver 15 is provided with a reception section 23, a transmission section 16, a switch 17, a switch 18, a variable reactance section $X_g$ 19, a variable reactance section $X_p$ 21, and a reactance control section 22. One end of the switch 18 is connected to a circuit ground 29.

The transceiver 15 having such a configuration supports half-duplex transmission in which the switches 17, 18 turn on at the state of transmission and off at the state of reception. In addition, the transceiver 15 is provided with the variable reactance $X_g$ 19 and a reactance controller 22 for controlling the reactance $X_p$ 21, in order to retain resonance in accordance with changing parasitic capacitance.

Figure 9:
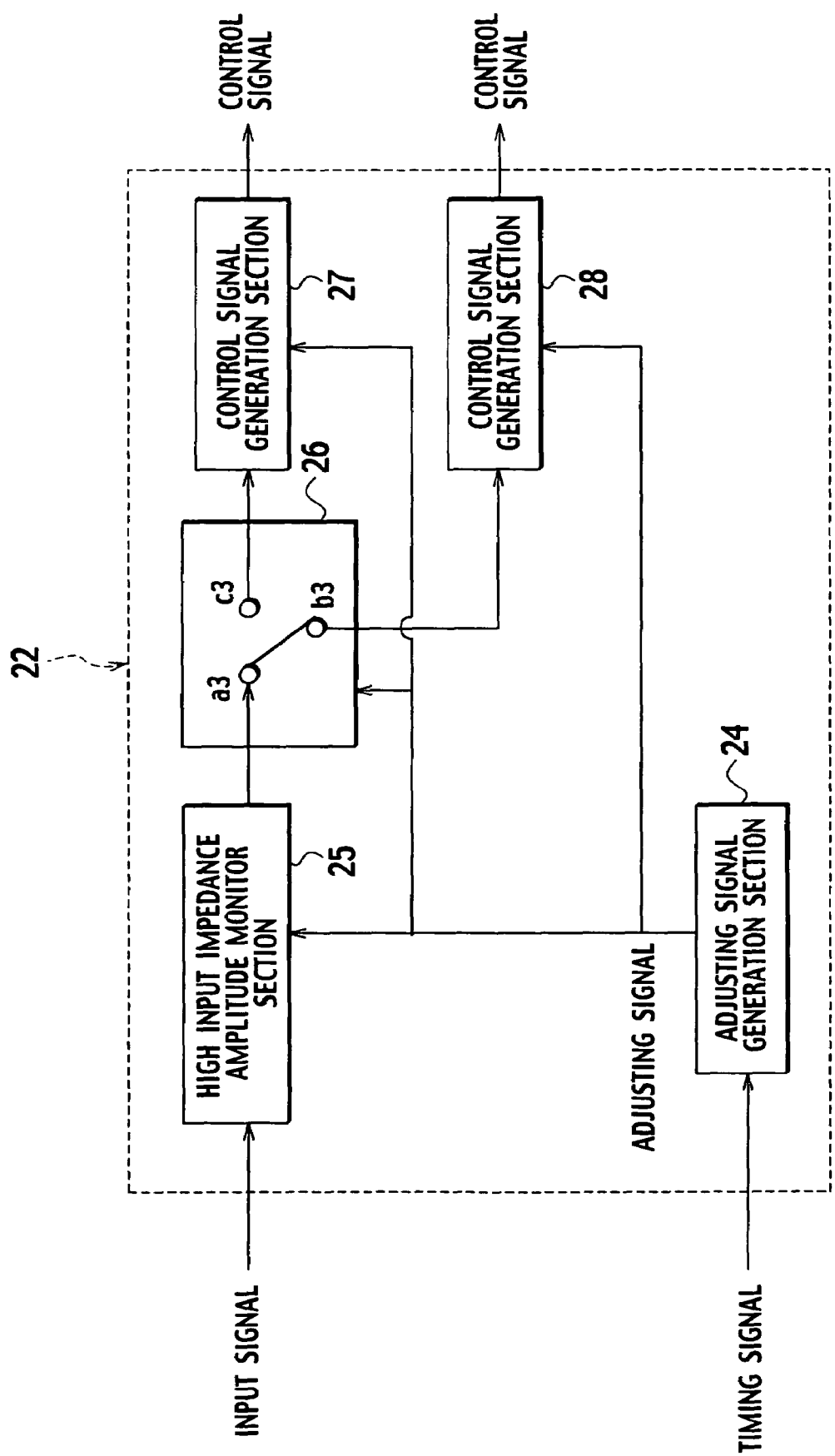
FIG. 9 is a block diagram of a reactance control section of the electric field communication transceiver according to the first embodiment.

FIG. 9 illustrates an internal block diagram of the reactance controller 22. The reactance controller 22 as illustrated in FIG. 9 includes thereinside an adjustment signal generation section 24 that generates an adjustment signal, a high input impedance amplitude monitor section 25 that monitors the amplitude of an input signal, a switch 26 that switches an output from the high input impedance amplitude monitor section 25, a control signal generation section 27 that is controlled by the adjustment signal to output a control signal to the variable reactance section $X_g$ 21, and a control signal generation section 28 that similarly outputs a control signal to the variable reactance section $X_g$ 19.

In the first embodiment, there is adopted a method in which the reactance $X_g$ 19 and the reactance $X_p$ 21 are alternatively changed so as to be adjusted. First of all, while keeping constant the reactance $X_p$ 21 by keeping constant the control signal of the control signal generation section 27 and a3 is connected with b3 in the switch 26, the reactance $X_g$ 19 is adjusted so that the amplitude $|V_b|$ of the voltage between the earth ground 14 and the living body 20 as referred to in FIG. 9 becomes peaked. The input impedance of the high input impedance amplitude monitor section 25 is raised in order to prevent the amplitude monitor section that monitors the amplitude from influencing resonance. In addition, the high input impedance amplitude monitor section 25 outputs a signal based on the change of $|V_b|$ when changing minutely the reactance being adjusted into the control signal generation section 27. The control signal generation section 27 determines a subsequent control signal from the inputted signal and outputs the signal determined.

Then, a3 is connected with c3 in the switch 26 thereby to allow the reactance $X_g$ 19 to remain unchanged, and the reactance $X_p$ 21 is adjusted so that $|V_b|$ becomes peaked. Subsequently, these procedures are repeated to obtain the most-preferable reactance value. The adjustment signal generation section 24 outputs a signal to control a switching of the switch 26 when adjusting and an operation of the control signal generation sections 27, 28 and the high input impedance amplitude monitor 25 as explained above. With this configuration, a voltage can be efficiently applied to the living body 20 even when the transceiver 15 is downsized, thereby realizing a transceiver that enables to keep an excellent communication condition.

Figure 42:
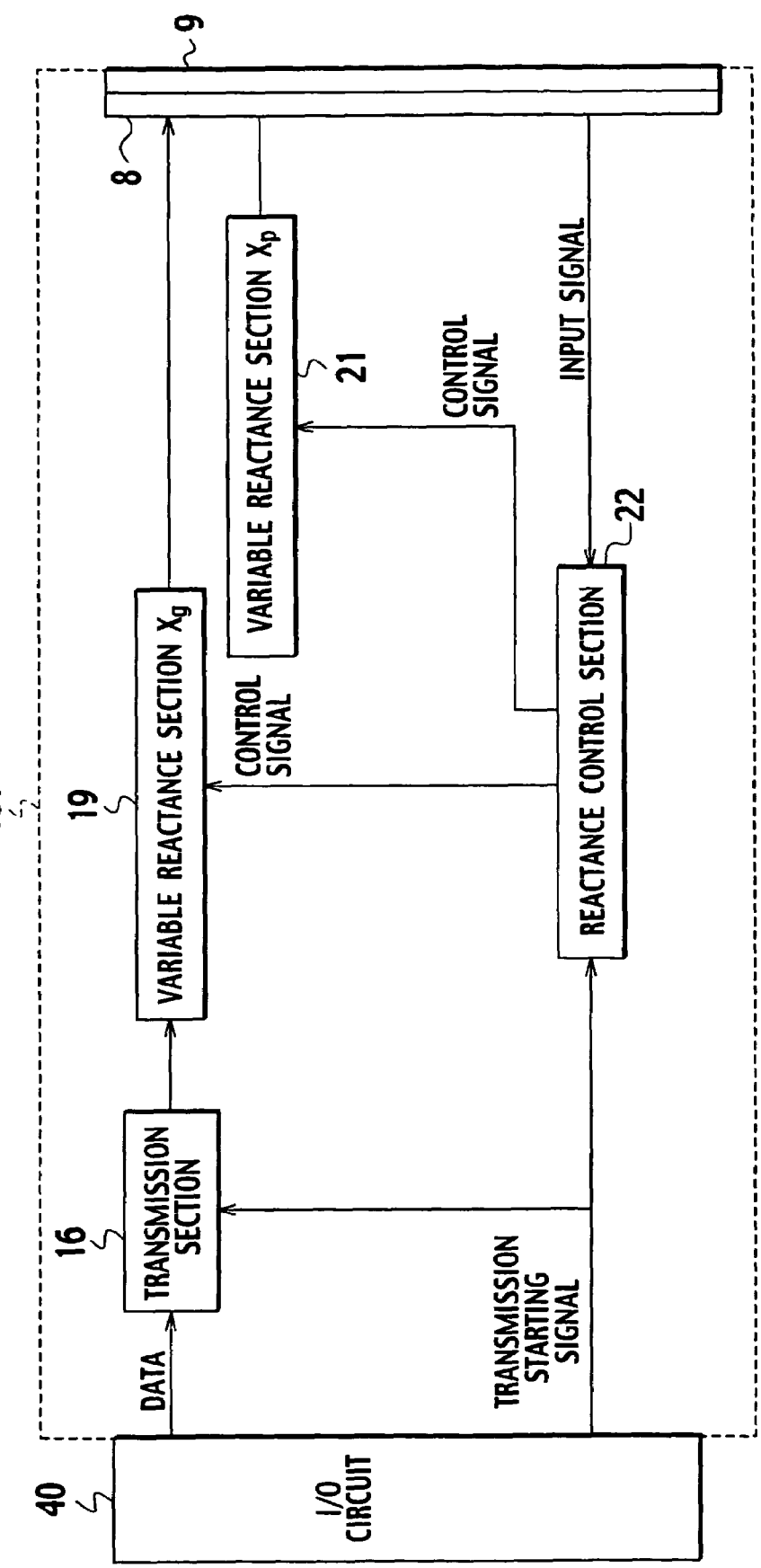
FIG. 42 is a block diagram illustrating a transmission device according to a first embodiment of the present invention.

By the way, although the variable reactance section $X_p$ is connected between the transmission/reception electrode and the circuit ground in FIG. 8, the same effect is exhibited even when the variable reactance section $X_p$ is connected between the transmission circuit output and the circuit ground, as described with reference to FIG. 7. In addition, although both reactance sections (the reactance $X_g$ 19 and the reactance $X_p$ 21) are configured as a variable reactance section in FIG. 8, either one of them can be a variable reactance section. By the way, a transmission device (transmission device 150), which only carries out transmission in contrast to the transceiver 15, has a configuration realized by omitting the reception section 23, the switch 17, and the switch 18 from the transceiver 15, as shown in FIG. 42.

Next, a modified example of the first embodiment according to the present invention will be described with reference to FIG. 10.

Figure 10:
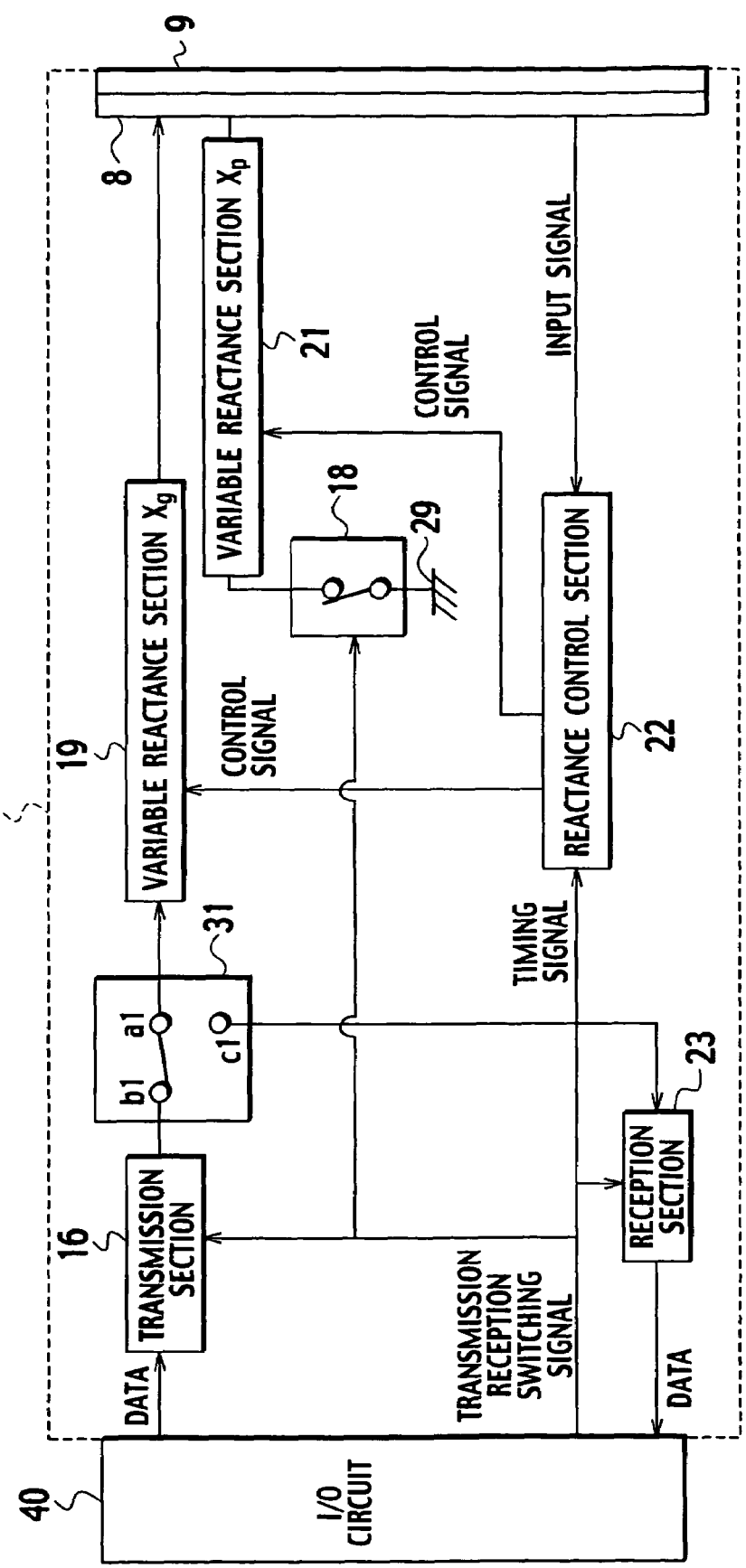
FIG. 10 is a block diagram of one modified example of the electric field communication transceiver according to the first embodiment of the present invention.

In a configuration illustrated in FIG. 10, the transmission section 16 and the reception section 23 are isolated by a switch 31 in order to prevent a transmission signal from leaking to the reception section 23 via the transmission/reception electrode 8. At the time of transmission and reactance adjustment, a1 and b1 are connected in the switch 31, whereas at the time of reception, a1 and c1 are connected. In addition, at the time of receiving, a control signal outputted from the reactance control section 22 is inputted into the reactance $X_g$ 19 and the reactance $X_p$ 21 so that the reactance value of the variable reactance (the reactance $X_g$ 19 and the reactance $X_p$ 21) is reduced.

With such a configuration, an electric circuit that constitutes an input stage of the reception section 23 is protected even when the transmission signal becomes larger due to resonance than a withstand voltage of the electric circuit. Therefore, this configuration allows for an electric field detector having a lower withstand voltage as an input stage of the reception section 23.

A Second Embodiment

Figure 11:
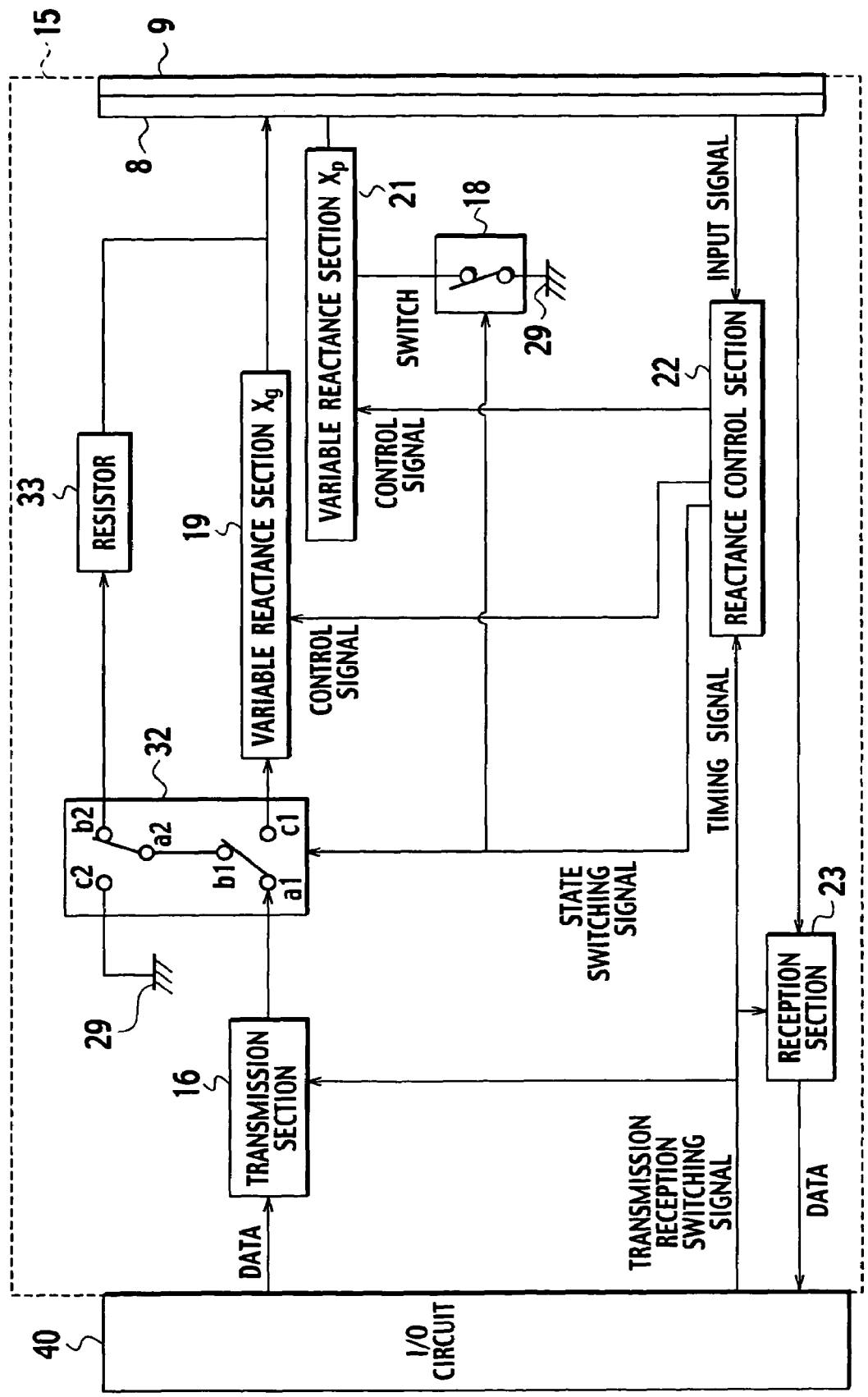
FIG. 11 is a block diagram of an electric field communication transceiver according to a second embodiment of the present invention.

FIG. 11 illustrates a block diagram of a transceiver according to a second embodiment of the present invention. This transceiver adjusts each variable reactance at one time of adjustment, respectively. To this end, a switch 32, a switch 18 and a resistor 33 as a load resistance are provided. First of all, in order to adjust the variable reactance section $X_p$ 21, a1 contacts with b1 in the switch 32; a2 contacts with b2 in the switch 32; and the switch 18 turns on.

Figure 12:
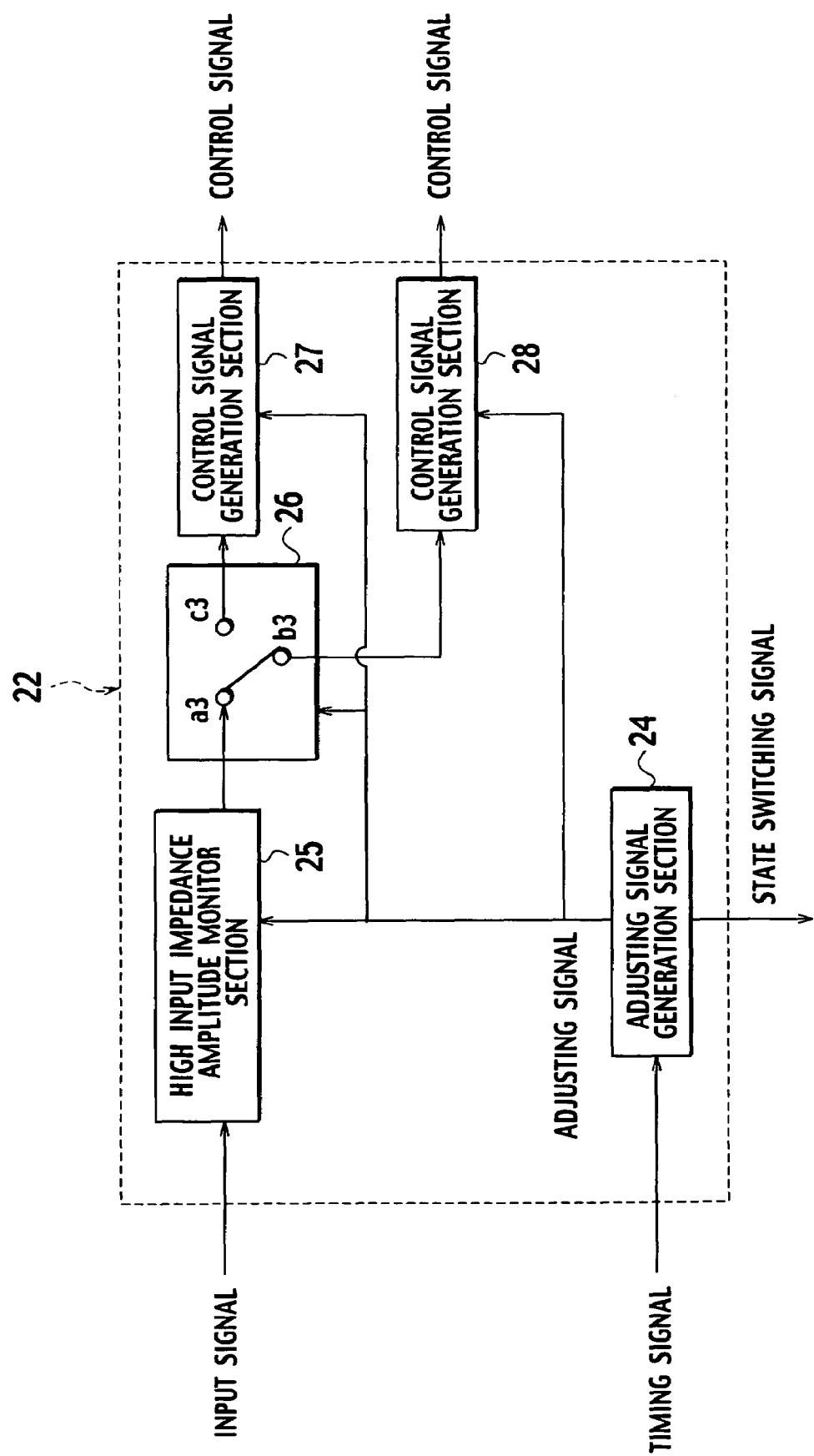
FIG. 12 is a block diagram of a reactance control section of the electric field communication transceiver according to the second embodiment of the present invention.

FIG. 12 illustrates a block diagram in order to describe an inner configuration of the reactance control section 22. This configuration as illustrated in FIG. 12 is substantially the same as that already illustrated in FIG. 9 but different in that a condition switching signal is outputted from an adjustment signal generation section 24.

Figure 13:
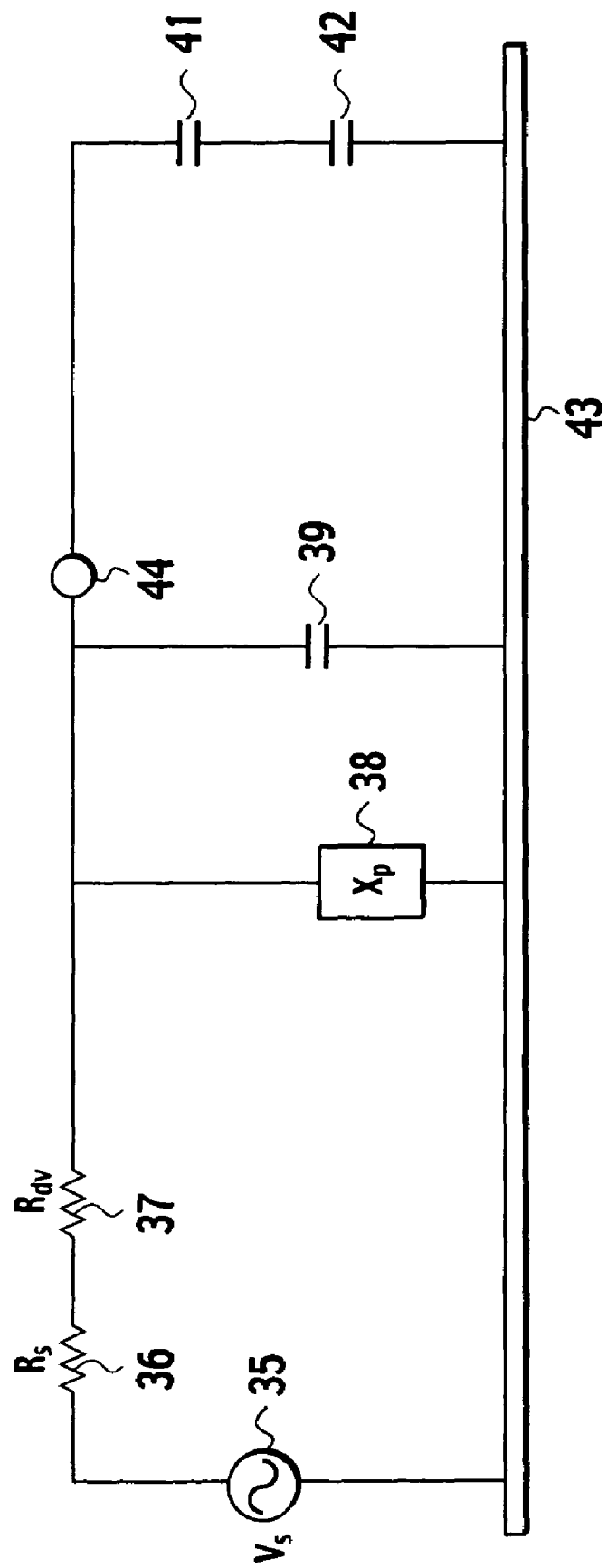
FIG. 13 is an equivalent circuit of the electric field communication transceiver according to the second embodiment of the present invention when adjusting a variable reactance $X_p$.

FIG. 13 illustrates an equivalent circuit according to the second embodiment of the present invention. In this equivalent circuit, there are shown a signal source $V_s$ 35, a resistor $R_s$ 36, a resistor $R_{dv}$ 37, a reactance $X_p$ 38, and parasitic capacitance $C_{sb}$ 39 between a transmission electrode and an earth ground, a transmission/reception electrode 44, parasitic capacitance $C_b$ 41 between a living body and the earth ground, and parasitic capacitance $C_g$ 42 between a ground of a mobile terminal side transceiver and the earth ground.

As understood from the equivalent circuit illustrated in FIG. 13, the reactance $X_p$ 38 and each parasitic capacitance constitute a series resonance circuit. When this circuit is adjusted so that an electric potential of the transmission/reception electrode becomes peaked, the reactance $X_p$ 38 becomes as expressed by the following equation:

$$X_p = \frac{1}{\omega\{C_{sb} + (C_b^{-1} + C_g^{-1})^{-1}\}} \qquad (10)$$

Then, the variable reactance section $X_g$ 19 will be adjusted. When the variable reactance section $X_p$ 21 remains as expressed by the equation (6), $V_b$ is equal to $V_s/\{1+(C/C_g)\}$ according to the equation (3), thereby making it impossible to increase the signal to be applied to the living body.

Figure 14:
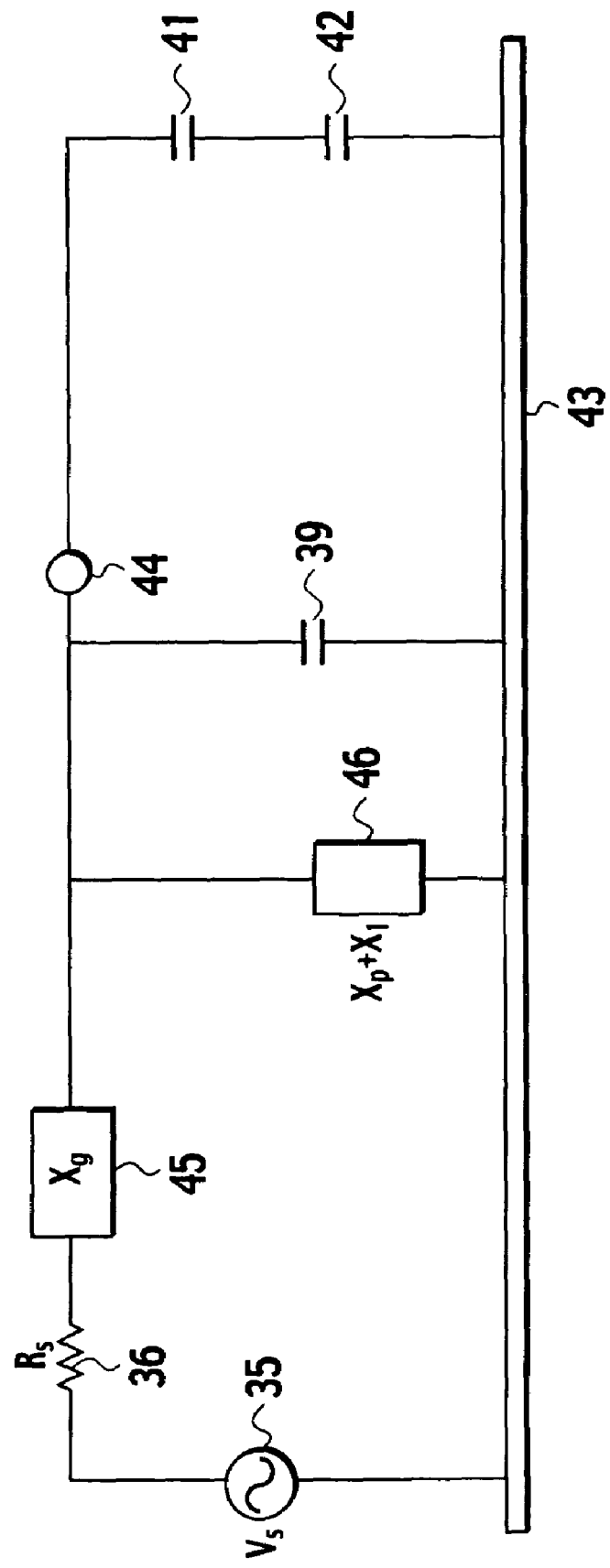
FIG. 14 is an equivalent circuit of a variable reactance section of the electric field communication transceiver according to the second embodiment of the present invention when adjusting a variable reactance $X_g$.

In order to solve this problem, the reactance value $X_p$ is minutely changed to $X_p+X1$. At the same time, a1 is connected with c1 in the switch 1 and a2 is connected with c2, of which equivalent circuit at this time is illustrated in FIG. 14. Assuming $X_p \gg X_1$, $|V_b|$ is expressed as follows:

$$V_b = V_s/\{1 + (C_b/C_g) - X_g\{\omega[C_b + C_{sb}(1 + C_b/C_g)] - \qquad (11)$$
$$(1 + C_b/C_g)/(X_p + X_1)\} +$$
$$jR_s\{\omega[C_b + C_{sb}(1 + C_b/C_g)] + (1 + C_b/C_g)/(X_p + X_1)\}\}$$
$$= V_s/\{1 + (C_b/C_g) - X_g(1 + C_b/C_g)X_1/X_p^2 +$$
$$jR_s(1 + C_b/C_g)X_1/X_p^2\}$$

The peak amplitude is obtained from the equation (11) as:

$$|V_b| = \frac{1}{R_s(1 + C_b/C_g)X_1/X_p^2}|V_s| \quad (12)$$

As understood, a larger amplitude is obtained.

As described, when adjusting the variable reactance section $X_g$ 19, the variable reactance section $X_p$ 21 is minutely varied, thereby applying a larger signal to the living body. The variable reactance section $X_g$ 19 is adjusted while monitoring the voltage applied thereto, as is the case with the variable reactance section $X_p$ 21.

Figure 43:
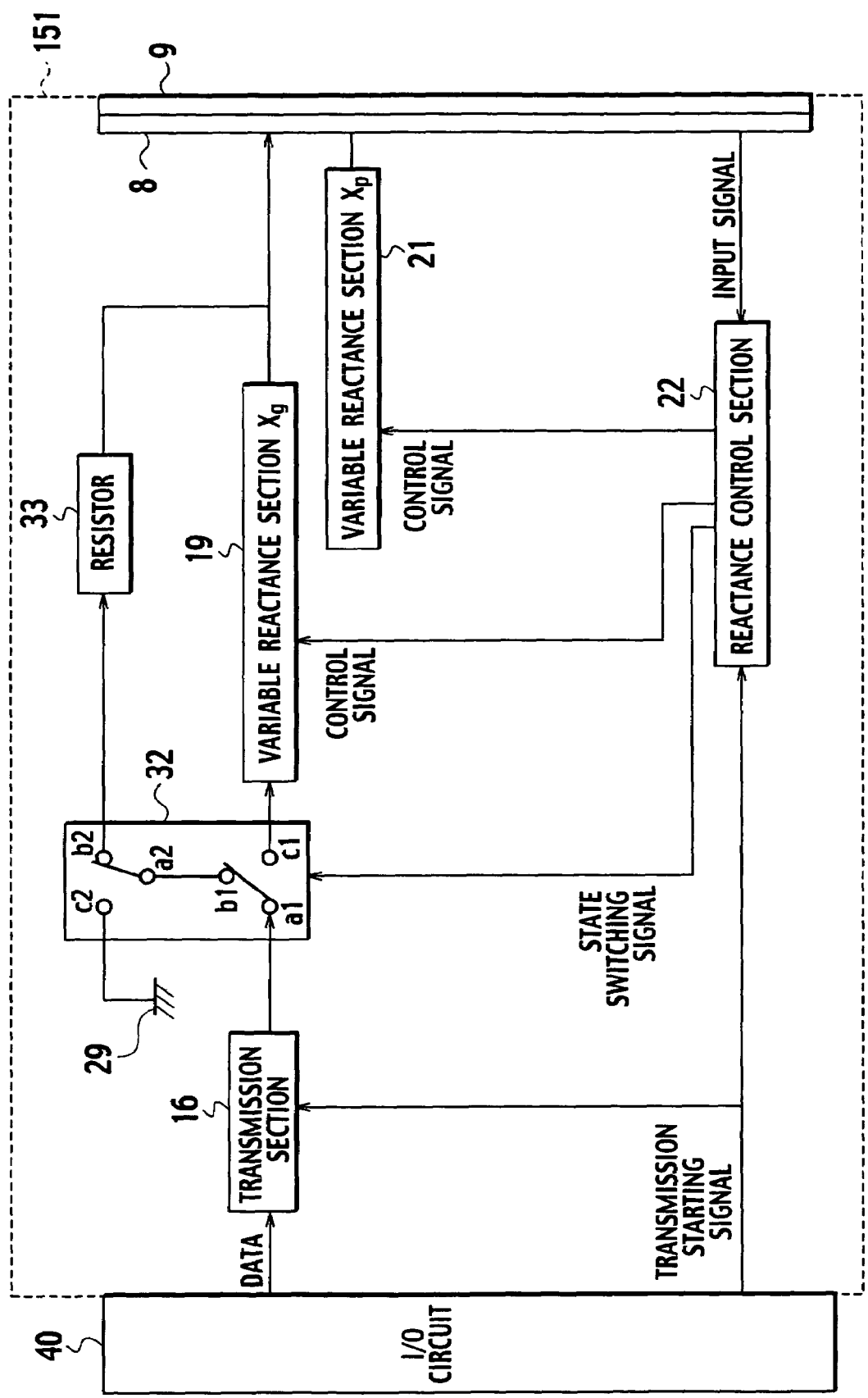
FIG. 43 is a block diagram illustrating a transmission device according to a second embodiment of the present invention.

At the time of reception, the switch 18 is turned off to break a connection between a1 and c1. With this configuration and adjustment method, a voltage can be efficiently applied to the living body 20 even when the transceiver 15 is down-sized, thereby realizing a transceiver that enables to maintain an excellent communication condition. By the way, as shown in FIG. 43, a transmission device (transmission device 150), which only carries out transmission in contrast to the transceiver 15, has a configuration realized by omitting the reception section 23, the switch 17, and the switch 18 from the transceiver 15 according to the second embodiment shown in FIG. 11.

Although the variable reactance section $X_p$ 21 is connected between the transmission/reception electrode 8 and the circuit ground 29 in FIG. 11, the same effect is exhibited even when the variable reactance section $X_p$ 21 is connected between the circuit ground 29 and the transmission circuit output from the transmission section 16.

Figure 15:
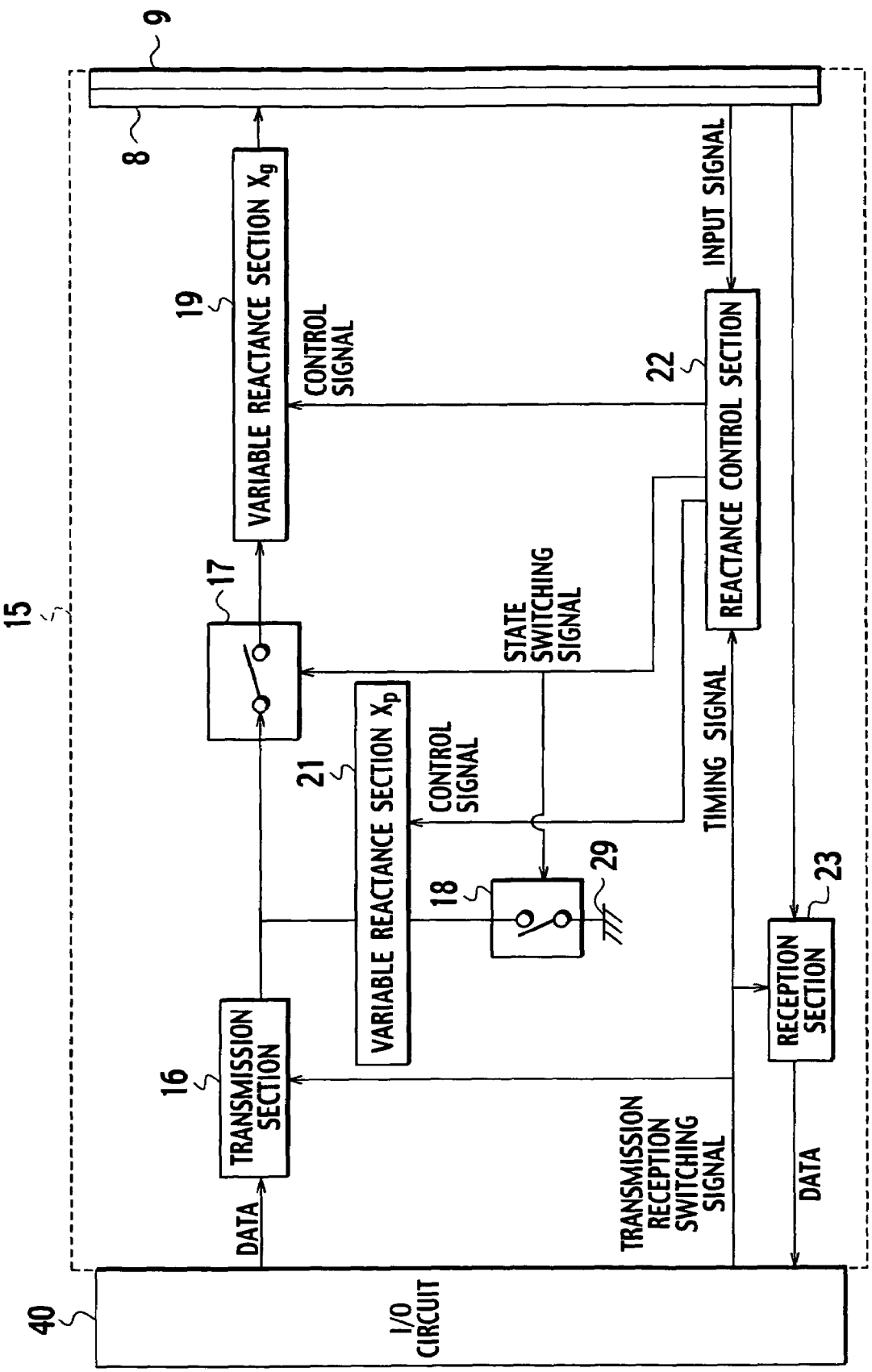
FIG. 15 is a block diagram of one modified example of the electric field communication transceiver according to the second embodiment of the present invention.

In this case, the resistor 33 as a load resistance as shown in the block diagram of FIG. 15 is not necessary. Firstly, the switch 17 is turned on and the switch 18 is turned off in order to adjust the variable reactance section $X_g$ 19. Then, when the voltage outputted to the transmission/reception electrode 8 is adjusted to become peaked, the variable reactance section $X_g$ 19 will have a value represented by the following equation:

$$X_g = \frac{1}{\omega\{C_{sb} + (C_b^{-1} + C_g^{-1})^{-1}\}} \quad (13)$$

Next, the variable reactance section $X_g$ 19 is slightly changed to make its reactance value $X_g + X_1$. Then, the switch 18 is turned on and the reactance section $X_p$ 21 is adjusted to make the voltage applied to the transmission/reception electrode 8 become peaked, thereby obtaining a larger amplitude as described with reference to FIG. 11.

The above configuration and adjustment method realize a transceiver that is capable of efficiently applying voltage to the living body so as to maintain an excellent communication condition even when the transceiver is downsized. By the way, a transmission device, which only carries out transmission, is composed by omitting the reception section 23 and the switch 17.

In addition, even in the above embodiment, there may be an alternative configuration in which the input of the reception section 23 is connected to the switch 17 by which the transmission section 16 and the reception section 23 are isolated, as is the case with the modified example of the first embodiment shown in FIG. 10.

A Third Embodiment

Figure 16:
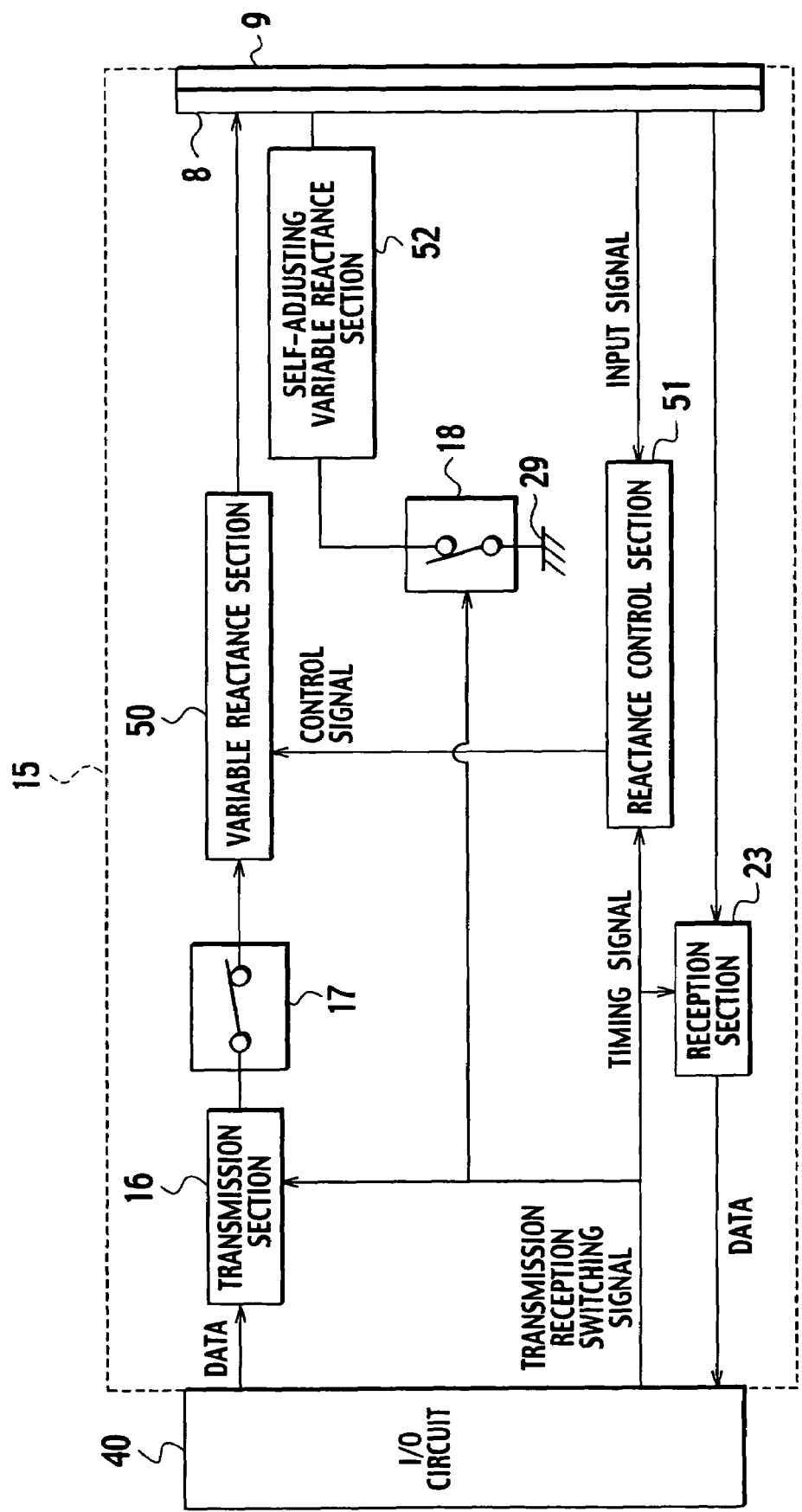
FIG. 16 is a block diagram for explaining an electric field communication transceiver according to a third embodiment of the present invention.

FIG. 16 is a block diagram of a transceiver 15 according to a third embodiment of the present invention.

In the transceiver 15 shown in FIG. 16, a self-adjusting variable reactance section 52 that is capable of adjusting a reactance value without requiring a control section, instead of the variable reactance section $X_p$ 21 in the first and the second embodiment.

Figure 17:
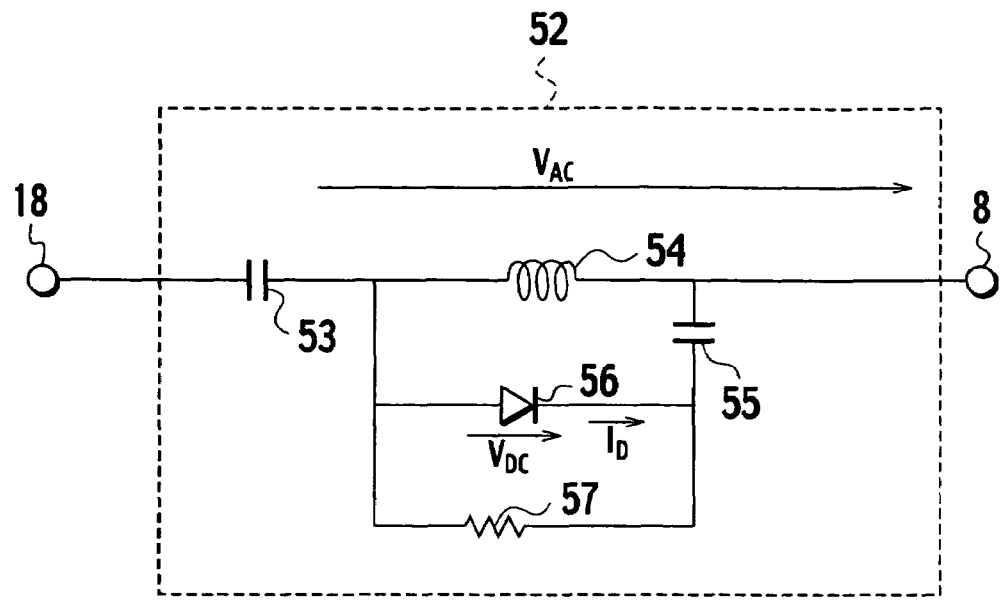
FIG. 17 is a schematic diagram for explaining a self-adjusting variable reactance section of the electric field communication transceiver according to a third embodiment of the present invention.
Figure 18:
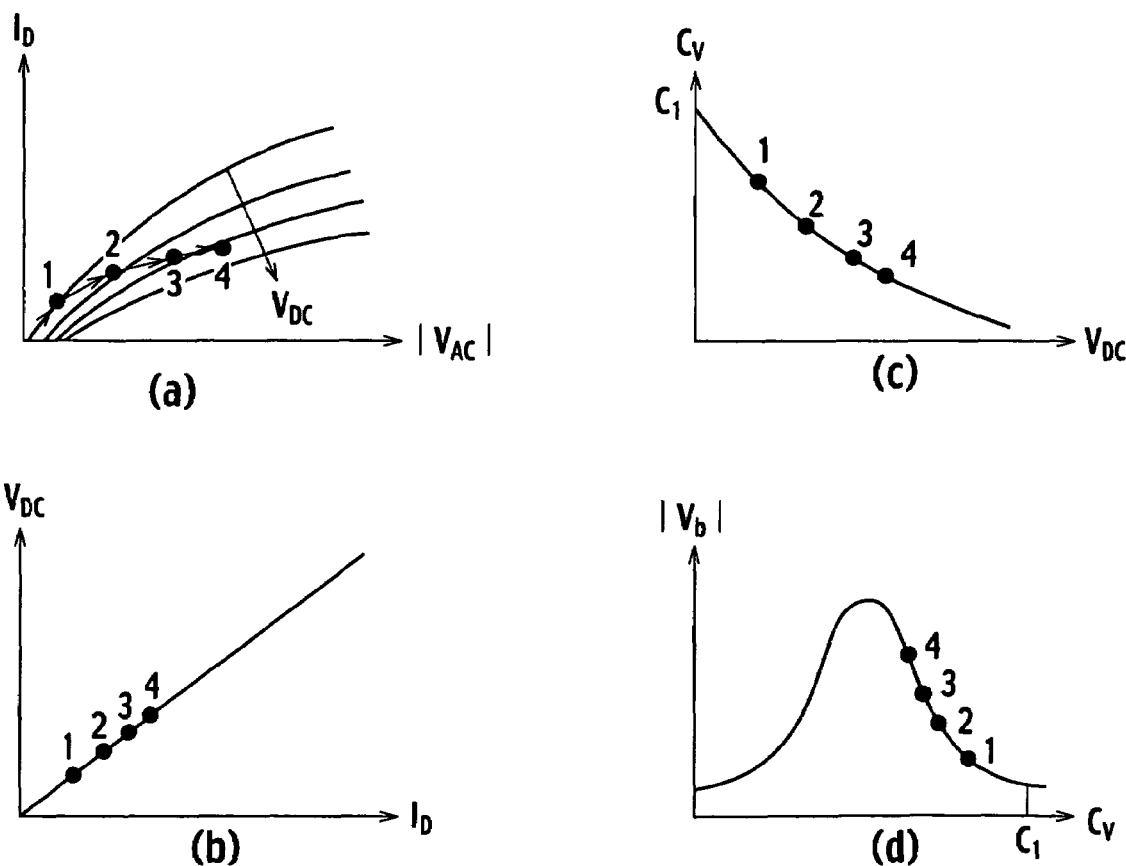
FIGS. 18A to 18D are a graph for explaining operation of the self-adjusting variable reactance section of the electric field communication transceiver according to a third embodiment of the present invention.

FIG. 17 illustrates a specific configuration of the self-adjusting variable reactance section 52. Capacitors 53, 55 serve to block a direct current component and are considered as short-circuited for an alternating signal. FIG. 18A illustrates a relation between a direct current component ID and alternating voltage applied therebetween when the alternating voltage having an altitude of |VAC| is applied to a variable capacitance diode 56. When reverse-biased voltage VDC is generated across the variable capacitance diode 56, the variable capacitance diode 56 becomes short-circuited for shorter time and therefore ID becomes lower with respect to the same VAC.

FIG. 18B illustrates voltage (equivalent to VDC) caused by the current ID flowing through a resistor 57. FIG. 18C illustrates a dependence of capacitance $C_v$ of the variable capacitance diode 56 on the voltage VDC. In addition, FIG. 18D illustrates a dependence of $C_v$ on the amplitude $|V_b|$ of $V_b$. Points in the graphs show a change in each current and voltage after an alternating signal starts to be inputted to the variable reactance. The initial value of the capacitance $C_v$ is set as C1, which is a value at the time of VDC=0. In addition, |VAC| is proportional to $|V_b|$.

When an alternating signal is inputted, the signal is rectified by the variable capacitance diode 56 and thus a direct current ID (a point 1 in FIG. 18A) is generated. This current flows the resistor 57 to generate a direct voltage VDC and the same voltage is applied to the variable capacitance diode. As a result, the capacitance $C_v$ reduces (a point 1 in FIG. 18C) closer to a capacitance value that causes resonance and thus $|V_b|$ becomes larger.

While |VAC| becomes larger since it is proportional to $|V_b|$, |VDC| also becomes larger and then the relation between |VDC| and ID comes to be shown by a point 2 in FIG. 18A. Subsequently, while $C_v$ reduces in the same way and |VAC| increases, VDC becomes larger and therefore a rate of change in ID dwindles and converges to zero. When a rate of change in ID becomes zero, |VAC| becomes constant and its amplitude has become closer to the amplitude at the time of resonance, when compared with one at the time of beginning. By using the self-adjusting variable reactance 52 like this, only one variable reactance section 50 to be controlled is required in the reactance control section 51, thereby alleviating complexity in reactance adjustment.

Figure 19:
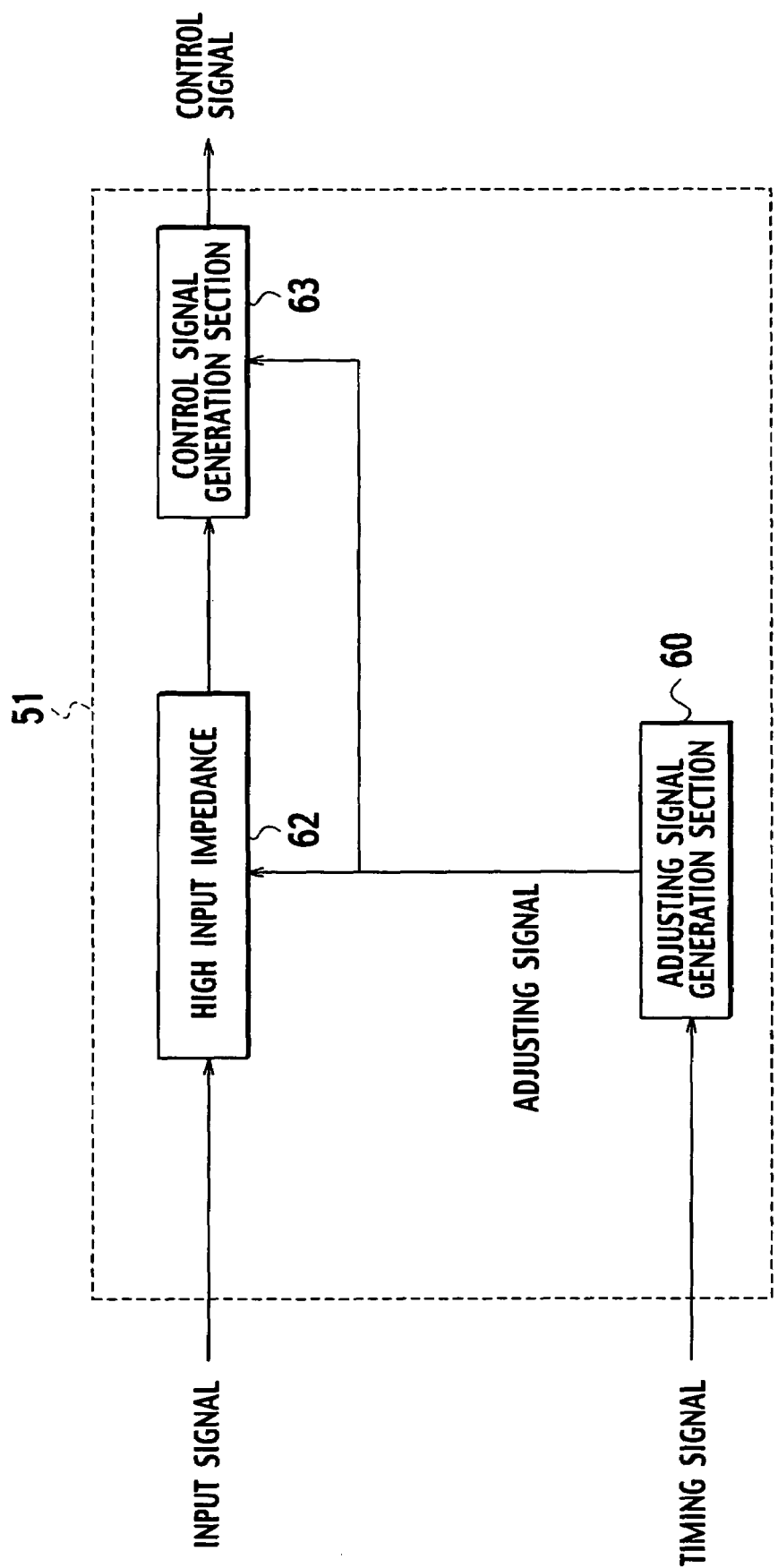
FIG. 19 is a block diagram of a reactance control section of the electric field communication transceiver according to a third embodiment of the present invention.

FIG. 19 is a block diagram of the reactance control section 51. This configuration shown in FIG. 19 has basically the same as that of the reactance control section shown in FIG. 9. Namely, the reactance control section 51 is provided with a high input impedance amplitude monitor section 62 to monitor the input signal and generates a control signal in a control signal generation section 63 thereof. Additionally, since there is required only one variable reactance section 50 to be controlled in the reactance control section 51, only one unit may be required as the control signal generation section 63. With this configuration, there is realized a transceiver that is capable of efficiently applying voltage to the living body so as to maintain an excellent communication condition even when the transceiver is downsized.

By the way, although the self-adjusting variable reactance section 52 is connected between the transmission/reception electrode 8 and the circuit ground 29 in FIG. 16, the same effect is exhibited even when the self-adjusting variable reactance section 52 is connected between the transmission circuit output from the transmission section 16 and the circuit ground 29.

Figure 44:
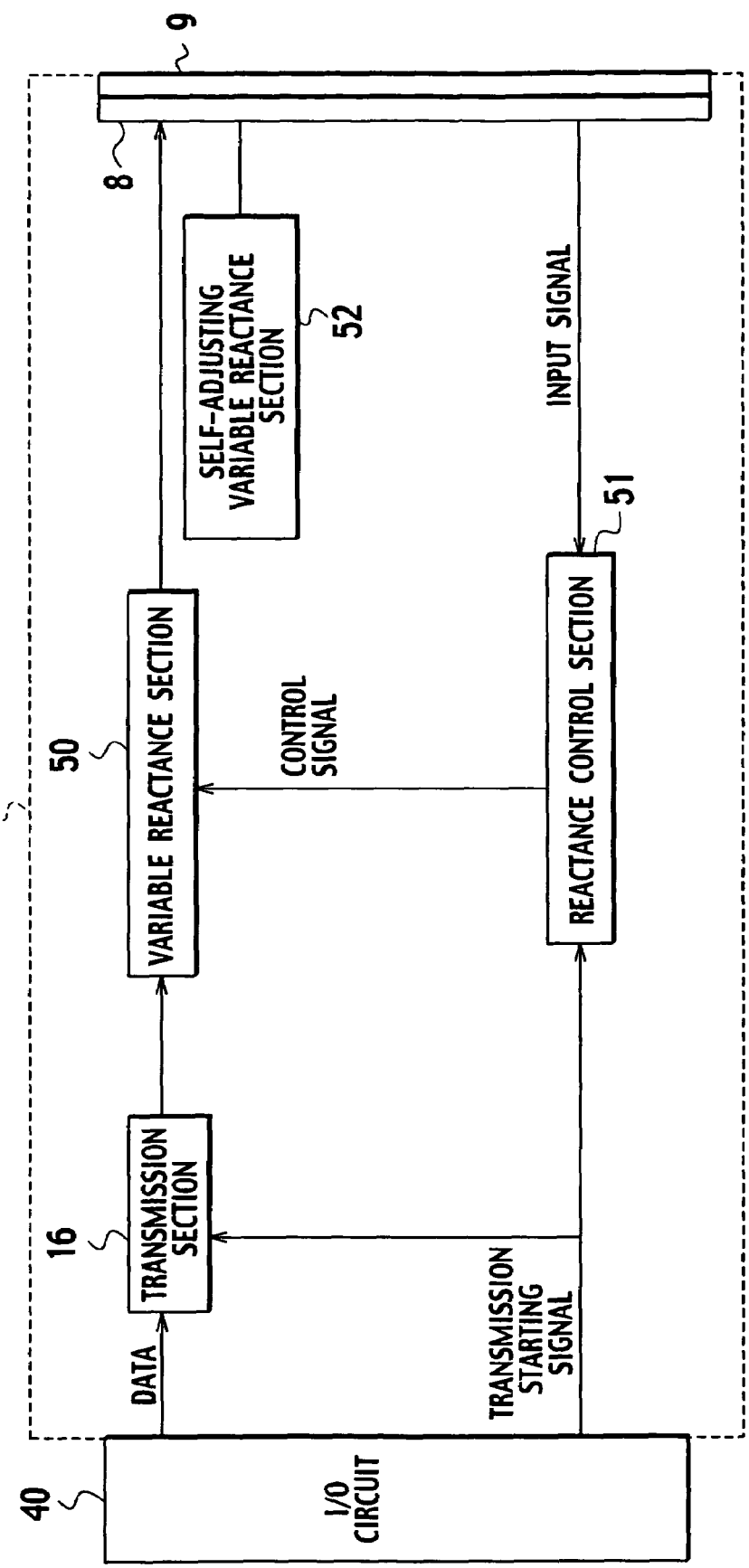
FIG. 44 is a block diagram illustrating a transmission device according to a third embodiment of the present invention.

Additionally, even in this embodiment, there may be an alternative configuration in which the input of the reception section 23 is connected to the switch 31 shown in FIG. 10 to isolate the transmission section from the reception section thereby, as is the case with the modified example of the first embodiment shown in FIG. 10. By the way, a transmission device (transmission device 152), which only carries out transmission, has a configuration realized by omitting the reception section 23, the switch 17, and the switch 18 from the transceiver 15 according to the third embodiment shown in FIG. 16, as shown in FIG. 44.

According to the first through the third embodiment of the present invention, the amplitude of the transmission voltage is prevented from reducing, even when parasitic capacitance between the transmission electrode and the living body is increased by down-sizing the transceiver or the transmission device, thereby preventing a reduction in voltage to be applied to the electric field transmission medium. Therefore, there is provided a transceiver or a transmission device that is capable of improving quality of electric field communication.

<Self-Adjusting Variable Reactance Section I>

Referring to FIGS. 20 through 23, the self-adjusting variable reactance section will be detailed hereinafter.

Figure 20:
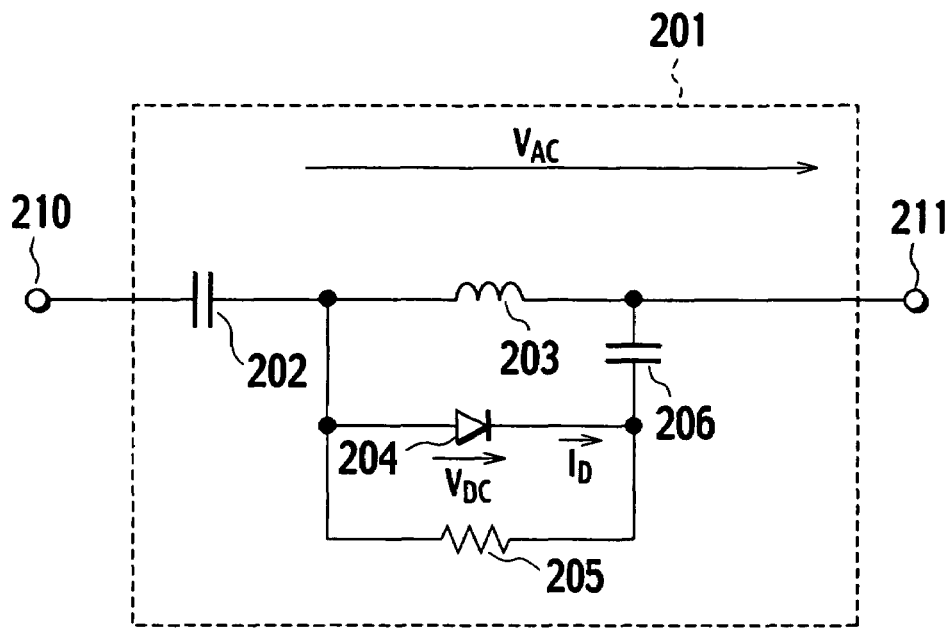
FIG. 20 is a schematic diagram for explaining one example of a self-adjusting variable reactance section that is applied to an electric field communication transceiver according to one embodiment of the present invention.

FIG. 20 is a schematic diagram of the self-adjusting variable reactance section. While a self-adjusting variable reactance section 201 is used instead of the self-adjusting variable reactance section 52 in the transceiver 15 according to the above-described third embodiment, the self-adjusting variable reactance section 201 is applicable not only to the transceiver 15 but also to other electric field communication transceivers.

Referring to FIG. 20, the self-adjusting variable reactance section 201 is composed of alternating signal terminals 210, 211 to which a high frequency alternating signal is applied, capacitors 202, 206 for providing electrostatic capacitance, such as a condenser, a resistance 205, and a variable capacitance diode 204.

The self-adjusting variable reactance section 201 having such a configuration has a resonance circuit composed of an inductor 203 and the variable capacitance diode 204, which serves to cause resonance. In addition, the two capacitors 202, 206 are disposed to block an incoming direct current component and, on the other hand, are considered as short-circuited for an incoming alternating signal.

Additionally, a voltage applied to the variable capacitance diode 204 and a direct current component of the current flowing therethrough are referred to as VDC and ID, respectively. The voltage VDC of the variable capacitance diode 204 is positive when reversely biased.

Figure 21:
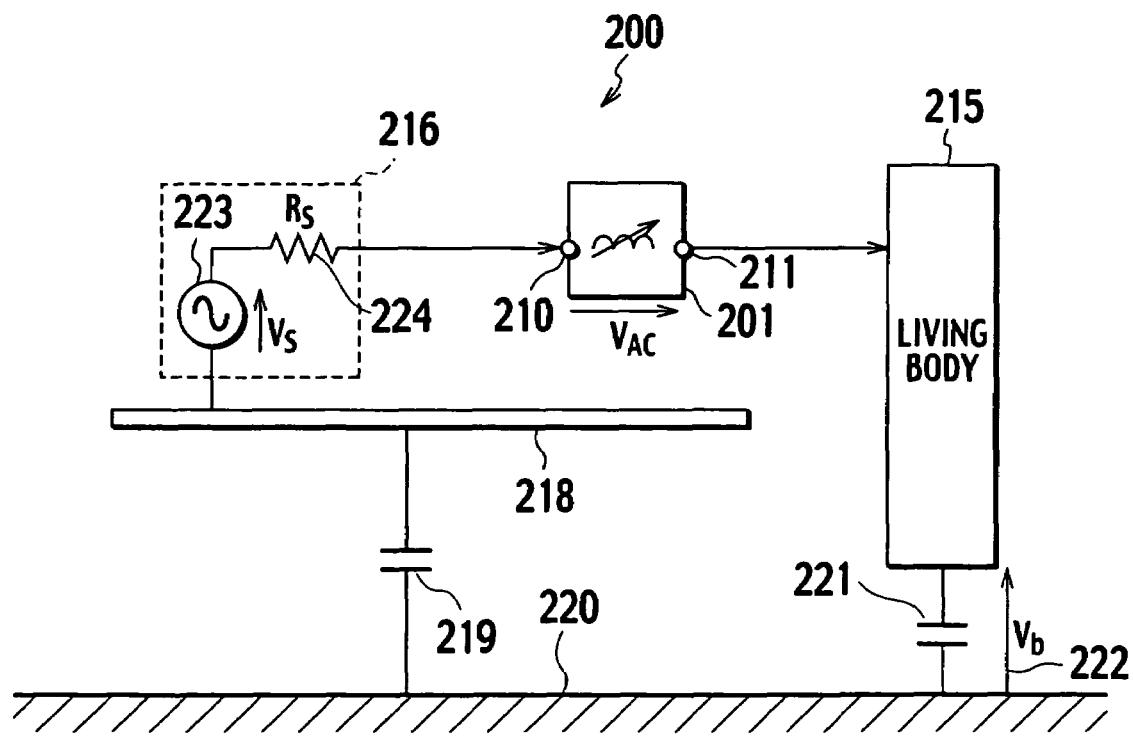
FIG. 21 is an explanatory view for explaining a self-adjusting variable reactance section that is applied to an electric field communication transceiver according to one embodiment of the present invention at the time of transmission.
Figure 22:
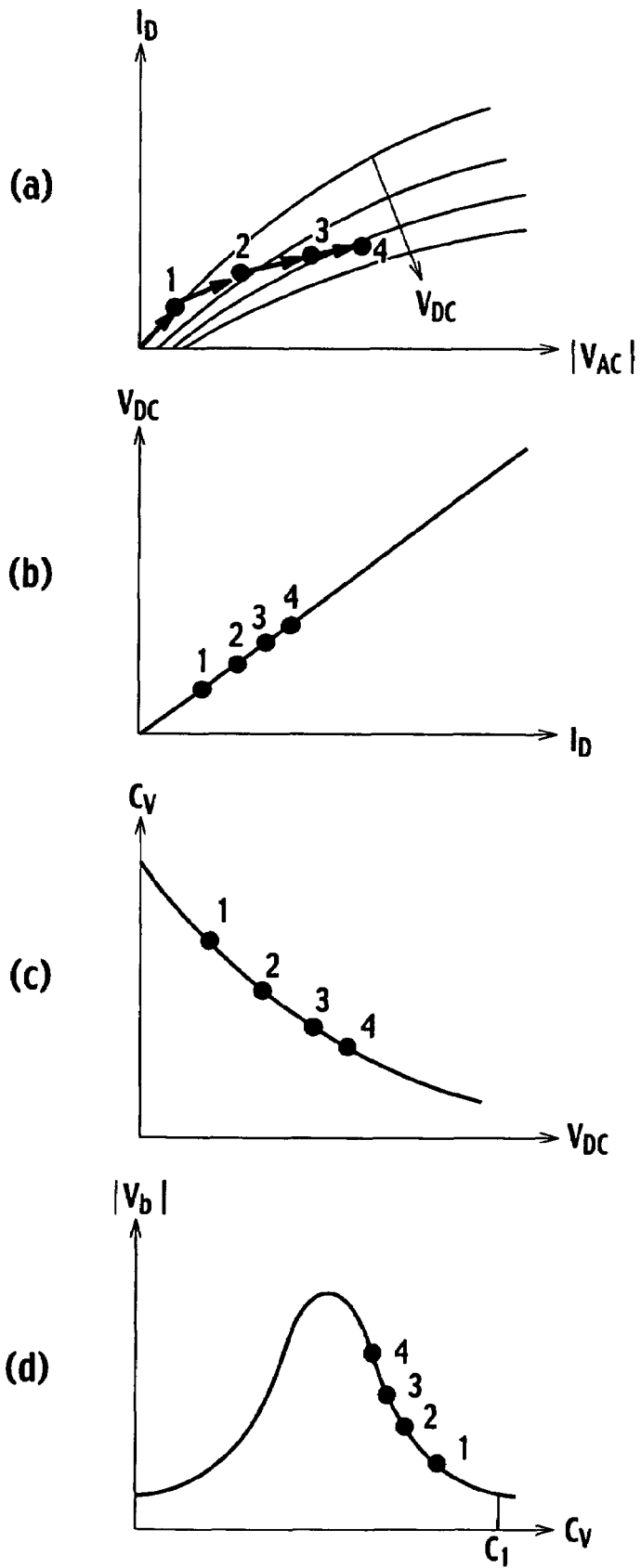
FIGS. 22A to 22D are a graph for explaining a self-adjusting variable reactance section that is applied to an electric field communication transceiver according to one embodiment of the present invention.

FIG. 21 is an explanatory view of an electric field communication transceiver 200 in which the self-adjusting variable reactance section 201 shown in FIG. 20 is employed, the transceiver having a configuration different from the transceiver 15 according to the third embodiment, and of its transmission operation.

The reactance section 201 is disposed between a transmission circuit output 216 and a living body 215 as an electric field transmission medium in which an electric field has to be induced. Hereinafter, an alternating voltage component of the voltage between the living body 215 and the earth ground is designated as Vb222; and an alternating voltage component of the voltage of the self-adjusting variable reactance section 201 is designated as VAC.

The transmission circuit output 216 has an oscillator 223 thereinside and a voltage caused by the generator 23 is designated as VS. By the way, an internal resistance of the transmission circuit 216 is referred to as $R_s$ 24. The transmission circuit output 216 is connected to a transmission device ground 218 and a voltage VS with respect to the transmission device ground 218 is outputted in the oscillator 223. The transmission device ground 218 is coupled to the earth ground 220 via parasitic capacitance $C_g$ 219 between the transmission device ground and the earth ground, while the living body 215 is coupled to the earth ground via parasitic capacitance $C_b$ between the living body and the earth ground.

In such a configuration, at the time of transmission as shown in FIG. 21, a variable reactance 1 changes its reactance value with respect to the "parasitic capacitance $C_g$ 219 between the transmission device ground and the earth ground" and the "parasitic capacitance $C_b$ 221 between the living body and the earth ground" to control resonance, thereby making the reactance value converge closer to the optimum value.

Next, referring to graphs shown in FIGS. 22A through 22D, there will be briefly described how each voltage and current signal changes when the reactance value is converging.

FIG. 22A illustrates a relation of a direct current component ID in relation to an alternating voltage having an amplitude |VAC| when the voltage is applied to the variable capacitance diode 204. When a reverse bias voltage VDC is generated across the diode, duration for the diode to become short-circuited shortens, thereby reducing ID with respect to the same VAC.

FIG. 22B is a graph of voltage (equivalent to VDC) caused by ID flowing through the resistor 205. FIG. 22C illustrates a dependence of the capacitance $C_v$ of the variable capacitance diode on the voltage VDC. FIG. 22D is a dependence of the amplitude $|V_b|$ on $C_v$. Points in the graphs show a change in each current and voltage after an alternating signal starts to be inputted to the variable reactance. The initial value of the capacitance $C_v$ is set as C1, which is a value at the time of VDC=0. In addition, |VAC| is proportional to $|V_b|$.

When an alternating signal is inputted, the signal is rectified by the diode and thus a direct current ID is generated (a point "1" in FIG. 22A). This current flows the resistor 57 to generate a direct voltage VDC and the same voltage is applied to the variable capacitance diode 204. As a result, the capacitance C, reduces closer to a capacitance value that causes resonance (a point 1 in FIG. 22C) and thus $|V_b|$ becomes larger.

While |VAC| becomes larger since it is proportional to $|V_b|$, |VDC| also becomes larger and then the relation between |VDC| and ID comes to be shown by a point "2" in FIG. 22A. Subsequently, while Cv reduces in the same way and |VAC| increases, VDC becomes larger and therefore a rate of change in ID dwindles and converges to zero. When the rate of change in ID becomes zero, |VAC| becomes constant and its amplitude has become closer to the amplitude at the time of resonance when compared with one at the time of beginning.

By leveraging the above phenomenon, when the self-adjusting variable reactance section 201 is composed as shown in FIG. 20, the reactance value might not be equal to but is as close as possible to a value that fully causes resonance. Therefore, there is provided an electric field communication transceiver that is capable of self-adjusting a reactance value, without employing a compensation means that has once been used in conventional electric field transceivers, such as an amplitude monitor, a control signal generator, or the like.

<Self-Adjusting Variable Reactance Section II>

Figure 23:
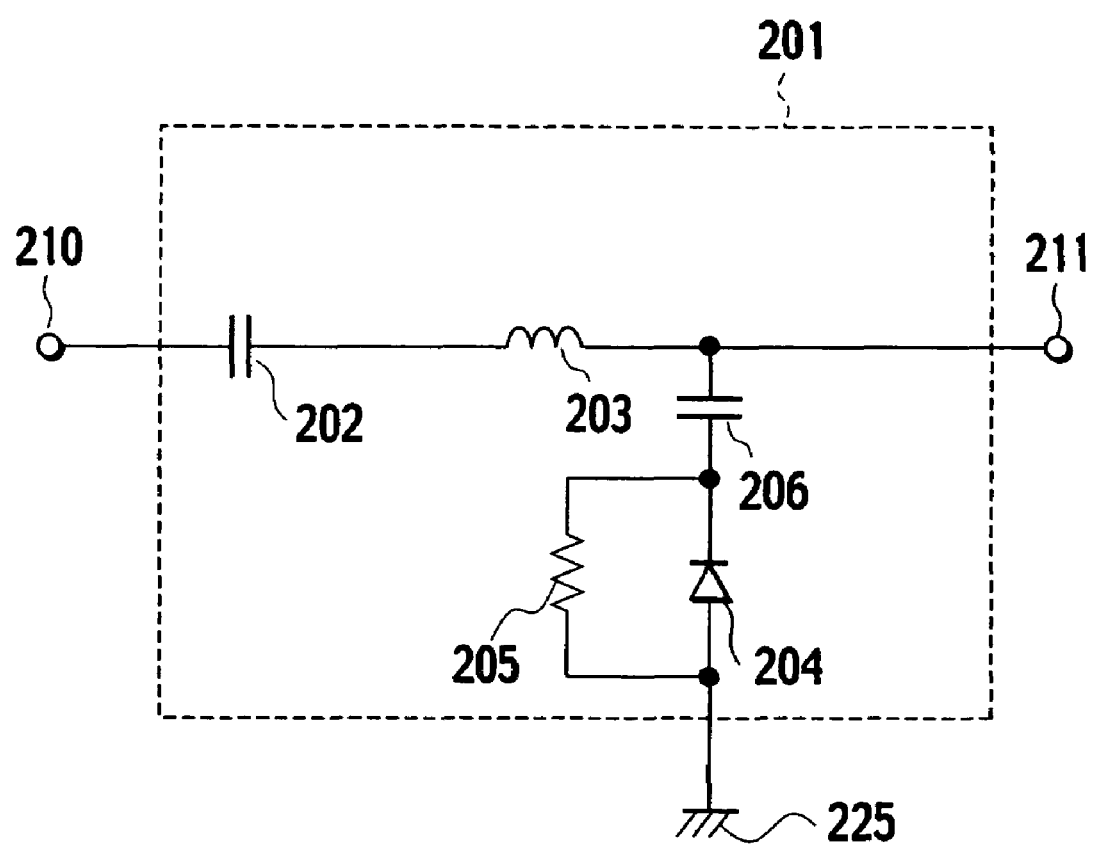
FIG. 23 is a schematic diagram for explaining another example of a self-adjusting variable reactance section that is applied to an electric field communication transceiver according to one embodiment of the present invention.

FIG. 23 illustrates anther configuration of a self-adjusting variable reactance section 201. In this example, an inductor 203 and a variable capacitance diode 204 that cause resonance in the self-adjusting variable reactance section 201 are connected in series. Capacitors 202, 206 are disposed to block an incoming direct current component and, on the other hand, are considered as short-circuited for an incoming alternating signal.

Even in this configuration, when an alternating signal is inputted from an alternating signal terminal 210, the variable capacitance diode 204 generates a direct current component, which in turn flows through a resistor 205 to generate a reverse bias voltage across the variable capacitance diode. This enables the reactance value to become closer to the value at the time of resonance. Therefore, a reactance value is self-adjusted without employing a compensation means that has once been required in conventional electric field transceivers, such as an amplitude monitor, a control signal generator, or the like.

According to the first and the second configuration described above, such an electric field communication transceiver that induces electric field in an electric field transmission medium and carries out communications via the induced electric field is comprised of a resonance circuit including an inductor that causes resonance with a transmission signal for communications and a variable capacitance diode in which an electrostatic capacitance changes in accordance with voltage applied thereacross, and a resistor that generates voltage in accordance with a direct current obtained by rectifying the transmission signal inputted to the resonance circuit by the variable capacitance diode and applies the generated voltage across the anode and the cathode of the variable capacitance diode.

The resonance circuit resonates with parasitic capacitance between the ground of the electric field communication transceiver and the earth ground and parasitic capacitance between the electric field transmission medium and the earth ground. In addition, the resonance circuit has the inductor, the variable capacitance diode, and the resistor connected in parallel. Moreover in the resonance circuit, the inductor is connected in series with the circuit in which the variable capacitance diode and the resistor are connected in series.

The inductor has the capacitor to block direct current incoming to one and/or both of the terminals thereof.

In addition, according to the self-adjusting variable reactance section according to the present invention described above, there is realized a variable reactance means that enables self-adjustment by omitting a compensation circuit of the reactance value, thereby providing the electric field communication transceiver that has a smaller scale of circuitry and enables well-established communications with low consumption electric power.

<Variable Reactance Section I>

Figure 24:
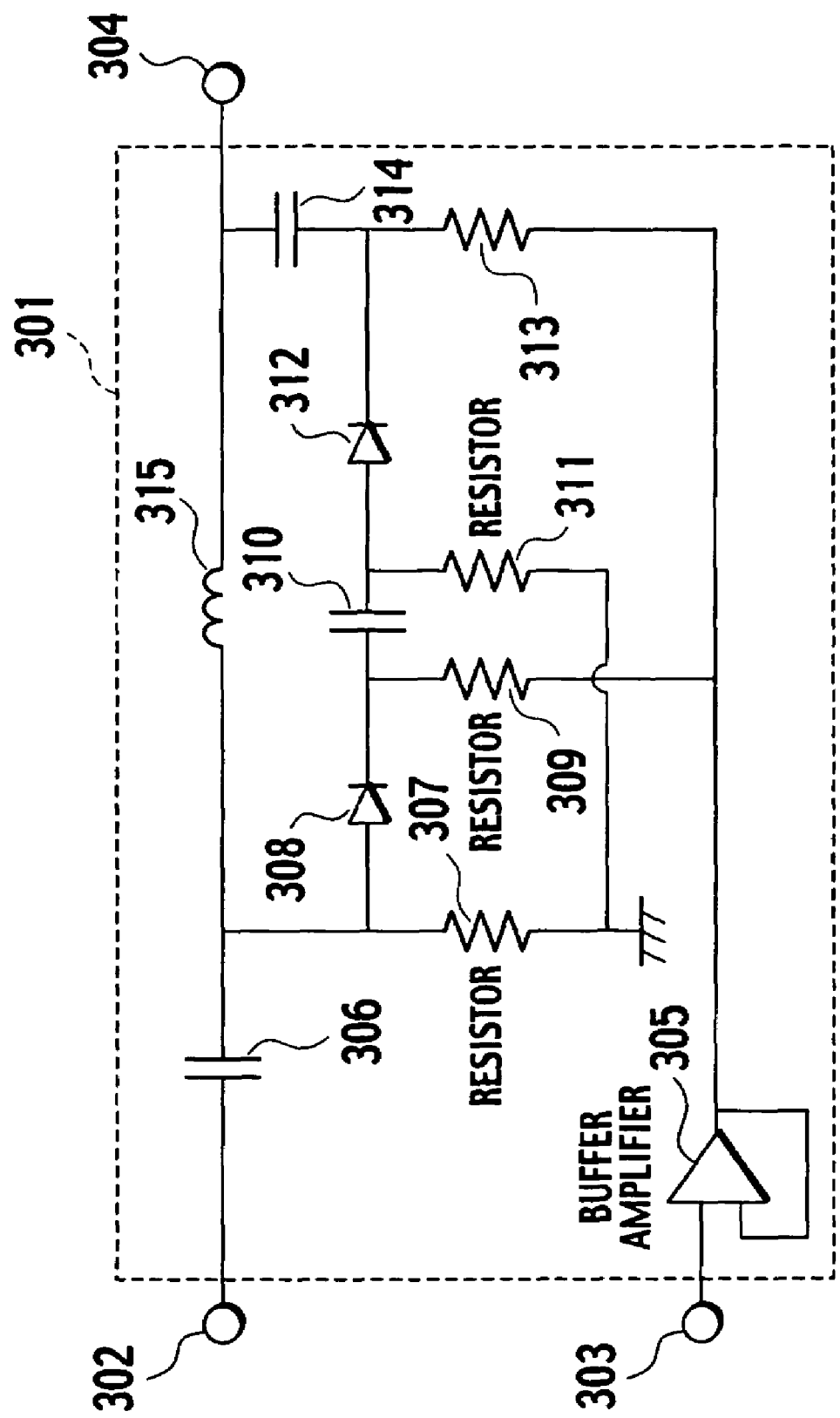
FIG. 24 is a schematic diagram for explaining a variable reactance section of an electric field communication transceiver according to the first embodiment of the present invention.

FIG. 24 is a schematic diagram for explaining a configuration of a variable reactance of an electric field communication transceiver according to the first embodiment of the present invention.

FIG. 24 illustrates a variable reactance section 301, alternating signal terminals 302, 304 through which the variable reactance section 301 is connected to an external circuit, and a control signal input 303. In addition, the variable reactance section 301 has capacitors 306, 310, 314, an inductor 315, resistors 7, 9, 11, 13, a buffer amplifier 305, and variable capacitance diodes 308, 312.

Figure 25:
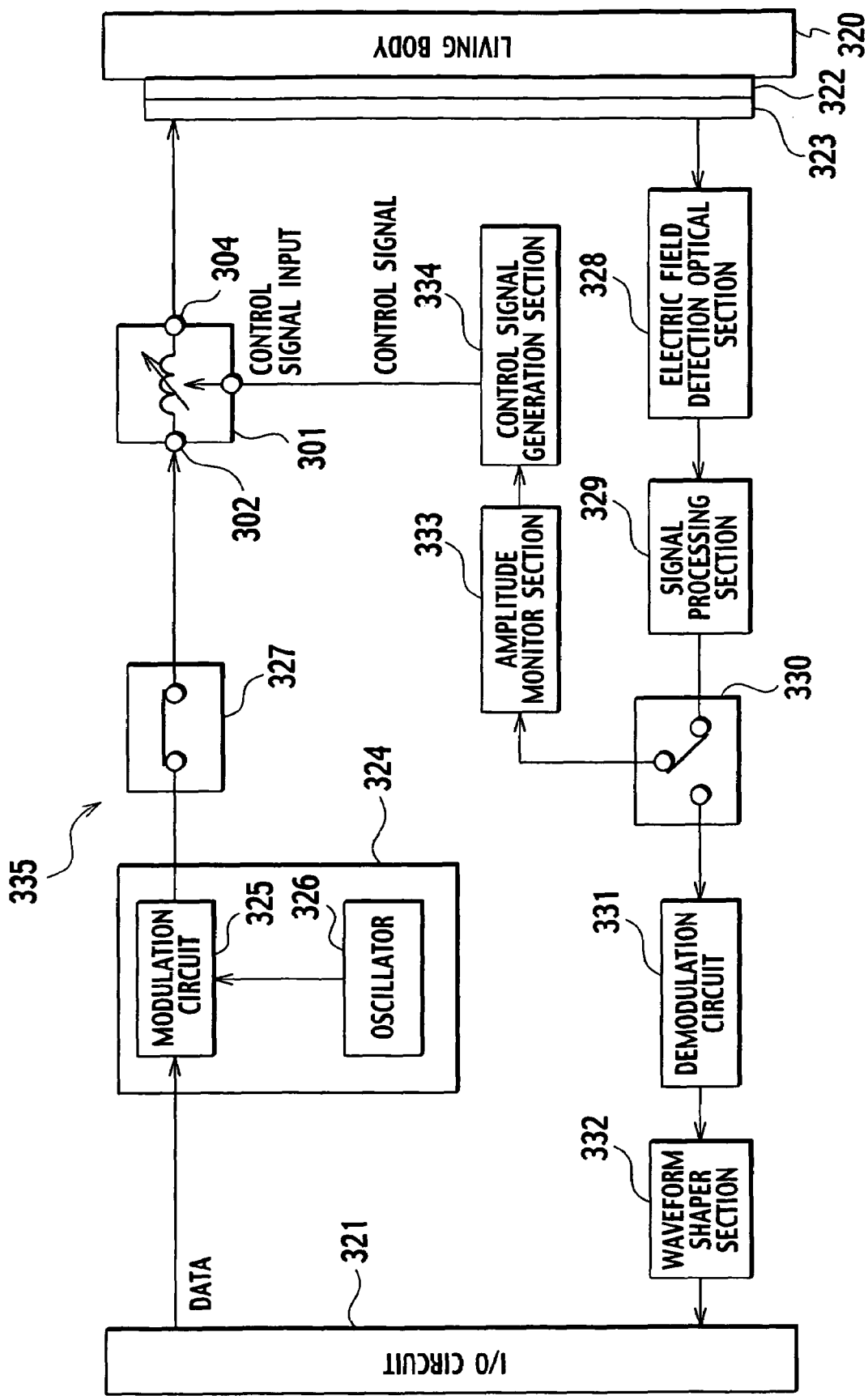
FIG. 25 is a schematic diagram of an electric field communication transceiver according to one embodiment of the present invention, which includes a variable reactance.

By the way, the variable reactance section 301 is employed in an electric field communication transceiver 335 shown in FIG. 25. The electric field communication transceiver 335 includes an insulator 322 to be contacted to a living body 320 such as a human body, a transmission/reception electrode 323 to be mated with the insulator 322, and an I/O circuit 21 that enables data communication with an external information processing apparatus or the like.

Furthermore, the electric field communication transceiver 335 is provided with a transmission circuit 324, an oscillator 326 and a modulation circuit 325 that compose the transmission circuit 324, a switch 327, the variable reactance section 301 as shown in FIG. 24, an electric field detection optical section 328, a signal processing section 329, a switch 330, a decoding circuit section 331, a wave forming section 332, an amplitude monitor section 333, and a control signal generation section 334.

When the electric field communication transceiver 335 having such a configuration employs the variable reactance section 301, an alternating signal having a frequency that causes resonance is inputted to the alternating signal terminals 302, 304; a control signal for controlling a reactance value is inputted to the control signal input 303 from the control signal generation section 334; a transmission signal from the transmission circuit 324 is inputted to the alternating signal terminal 302 via the switch 327; and the output signal of the alternating signal terminal 4 is connected to the transmission/reception electrode 323.

In addition, the capacitors 306, 310, 314 inside the variable reactance section 301 are connected to block a control signal having a frequency at least lower than that of an alternating signal. Moreover, the resistors 7, 9, 11, 13 are connected to prevent an alternating signal having a high frequency from leaking to a control signal circuit. The buffer amplifier 305 of the control signal input 303 is connected to prevent the variable reactance section 301 from being influenced to change the characteristic thereof by circuit elements included in the control signal generation section 334 connected at the pre-stage thereof. The variable reactance is realized by a resonance circuit by a combination of the inductance 315 and the variable capacitance diodes 308, 312.

Figure 26:
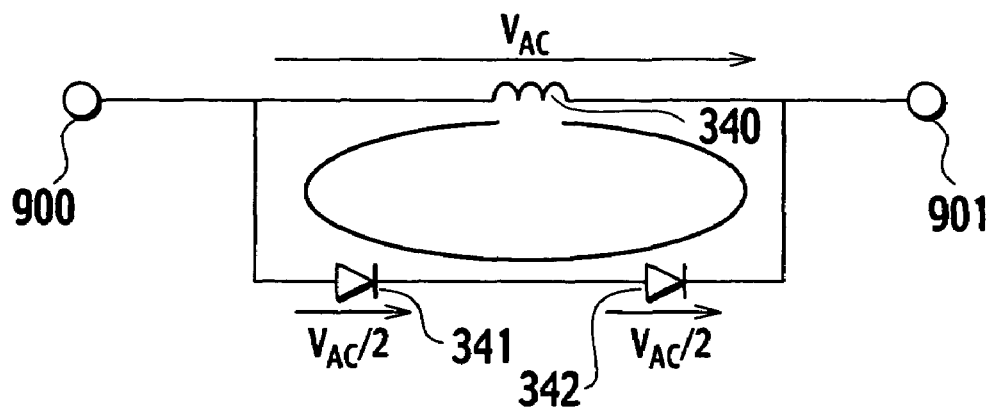
FIG. 26 is an equivalent circuit of the variable reactance section illustrated in FIG. 24 with respect to high frequency alternating signal.
Figure 27:
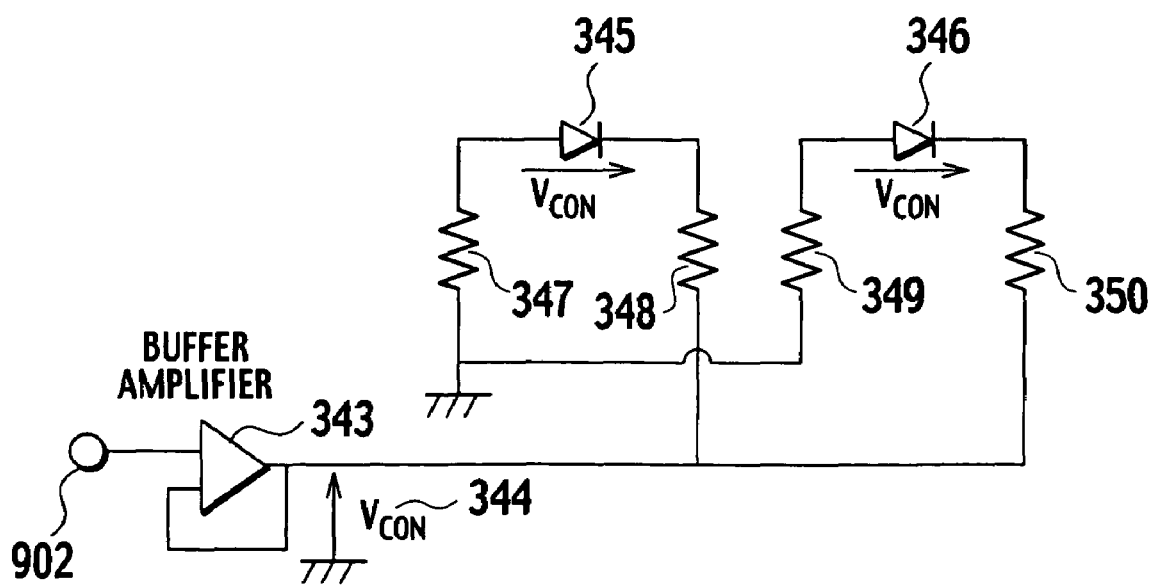
FIG. 27 is an equivalent circuit of the variable reactance section illustrated in FIG. 24 with respect to low frequency alternating signal.

FIGS. 26 and 27 illustrate an equivalent circuit of the variable reactance section 301 shown in FIG. 24. Among them, it is an equivalent circuit for a high frequency signal that is shown in FIG. 26; and it is an equivalent circuit for a low frequency signal that is shown in FIG. 27.

Firstly, in the equivalent circuit for an alternating signal shown in FIG. 26, the capacitors 306, 310, 314 that the variable reactance section 301 possesses are consider as short-circuited. In addition, the variable capacitance diodes 308, 312 are equivalently connected in series since the capacitor 10 is considered as short-circuited. Therefore, a voltage of the alternating signal is equally applied to each variable capacitance diode 308, 312, respectively.

Accordingly, even when the voltage of the alternating signal becomes larger due to resonance, a voltage applied to each variable capacitance diode 308, 312 is halved and thus resonance will not be readily suppressed when compared with a configuration in which only one variable capacitance diode is employed.

In the equivalent circuit in FIG. 26, the inductor 340 is equivalent to the inductor 315 in FIG. 24; a variable capacitance diode 341 is equivalent to the variable capacitance diode 308 in FIG. 24; and a variable capacitance diode 342 is equivalent to the variable capacitance diode 312 in FIG. 24. Alternating signal terminals 900, 901 are equivalent to the alternating signal terminals 302, 304, respectively.

When the voltage VAC is applied to the inductor 340, the voltage VAC is also applied to the two variable capacitance diodes 341, 342 connected in series with the inductor 340. Since the two variable capacitance diodes 341, 32 are connected in series, the voltage applied to each variable capacitance diode becomes VAC/2, provided that the variable capacitance diodes 341, 342 have electrically the same characteristic.

Although two variable capacitance diodes are used in this embodiment, two or more variable capacitance diodes can be used. When N variable capacitance diodes are used, the voltage VAC of the alternating signal applied to each variable capacitance diode becomes VAC/N. Therefore, suppression of resonance will be avoided to further degree when compared with where two variable capacitance diodes are used.

Next, the equivalent circuit shown in FIG. 27 is an equivalent circuit of the variable reactance section 301 for a low frequency control signal. When observed from a viewpoint of the low frequency control signal, each capacitance 306, 310, 314 provided in the variable reactance section 301 is considered as open. Therefore, it is equivalent that the variable capacitance diodes 308, 312 are connected in series when seen from the buffer amplifier 305.

Therefore, as shown in FIG. 27, a buffer amplifier 343 is equivalent to the buffer amplifier 305; variable capacitance diodes 345, 346 are equivalent to the variable capacitance diodes 308, 312, respectively; resistors 347, 348, 349, 350 are equivalent to the resistors 7, 9, 11, 13, respectively; and a control signal input 902 is equivalent to the control signal input 303. Since a voltage $V_{CON}$ (344) of the control signal outputted from the buffer amplifier 343 is applied to the variable capacitance diodes 345, 346, respectively, the voltages across the variable capacitance diodes 345, 346 are both $V_{CON}$.

Figure 28:
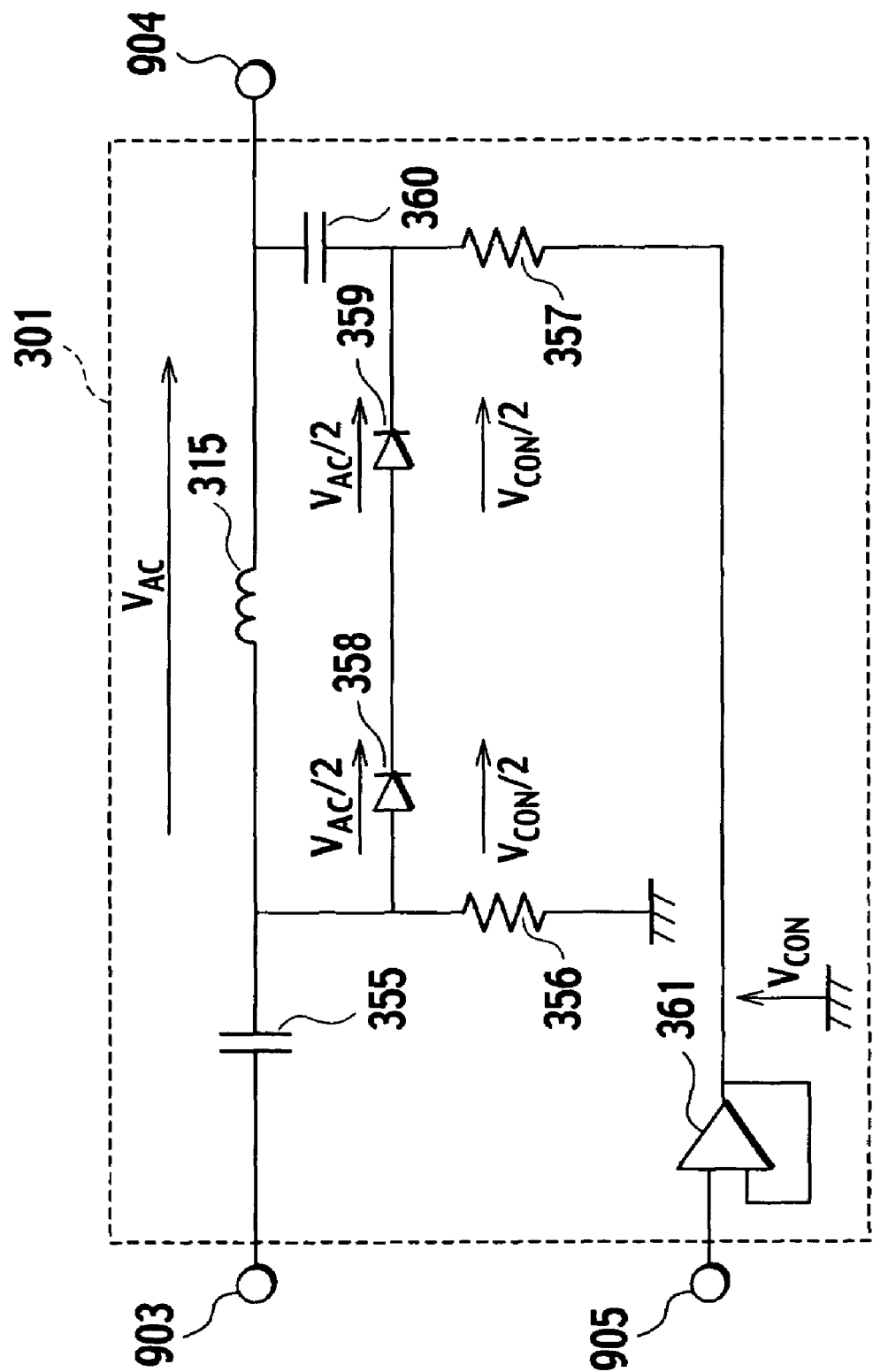
FIG. 28 is an explanatory view for explaining a variable reactance section that is applied to an electric field communication transceiver according to one embodiment of the present invention.

When the variable reactance section is composed for example as shown in FIG. 28, not only the alternating signal but the control signal is equally divided and applied, in contrast to the variable reactance section 301 in the first embodiment of the present invention. Therefore, when two variable capacitance diodes are used, the control signal applied to each variable capacitance diode is halved, thereby halving a variable range of the capacitance when compared to that by the variable reactance section 301.

Namely, the high frequency signal applied to alternating signal terminals 903, 905 is short-circuited to flow through capacitors 355, 360 and the voltage VAC is applied to the inductor 315, for example. Since the variable capacitance diodes 358, 359 are merely connected in series, the voltage VAC applied to the inductor 315 is equally divided and the voltage VAC/2 is applied to each variable capacitance diode.

The control signal $V_{CON}$ that is inputted from the control signal input 905 so as to control the capacitance of the variable capacitance diodes 358, 359 is applied to the variable capacitance diodes 358, 359 via the buffer amplifier 361 and then via the resistors 356, 357. Each control signal applied to the variable capacitance diodes 358, 359 is both $V_{CON}/2$.

On the other hand, the variable reactance section 301 according to this embodiment has a circuit configuration that prevents resonance suppression caused by an applied voltage higher than the withstand voltage and reduction of a range of the variable capacitance in the variable capacitance diode.

<Variable Reactance Section II>

Figure 29:
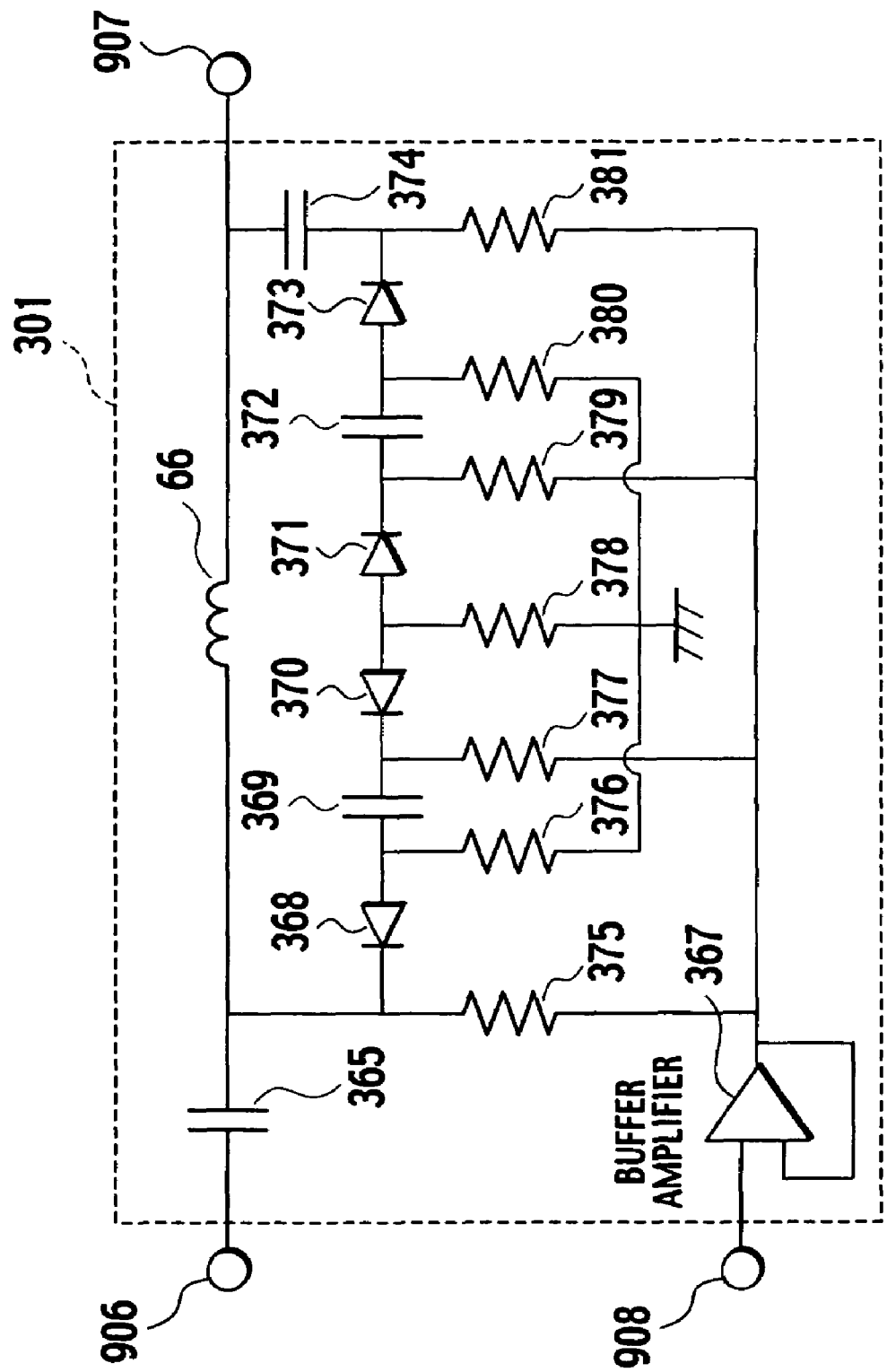
FIG. 29 is a schematic view for explaining a variable reactance section that is applied to an electric field communication transceiver according to one embodiment of the present invention.

FIG. 29 is a schematic diagram for explaining a configuration of a variable reactance section according to a second embodiment of the electric field communication transceiver of the present invention.

A variable reactance section 301 shown in FIG. 29 has the same configuration as the variable reactance section 301 shown in FIG. 24 according to the first embodiment of the present invention, in that alternating signal terminals 906, 907 and a control signal input 908 are provided.

However, it is characterized in that capacitors 365, 369, 372, 374, resistors 375, 376, 377, 378, 379, 380, 381, a reactance 266, a buffer amplifier 367, and variable capacitance diodes 368, 370, 371, 383 are provided as its inner configuration.

Since a voltage-current characteristic of a variable capacitance diode is generally asymmetric and a variable capacitance diode is short-circuited when an anode voltage is higher than a predetermined value determined by semiconductor properties, amplitude of an alternating signal is reduced. In order to prevent this, the variable capacitance diodes are connected in series and reversely, too, with respect to a high frequency alternating signal. With this configuration, even when the voltage exceeding the withstand voltage is applied to one variable capacitance diode thereby to short-circuit, the other variable capacitance diode connected reversely is not short-circuited. Therefore, amplitude of the alternating signal is not suppressed.

Namely, since the variable capacitance diodes 368, 370 and the variable capacitance diodes 371, 373 are connected reversely in series with each other, even when a voltage exceeding the withstand voltage is applied, a reduction in amplitude of the alternating signal due to short-circuit is not caused.

<Variable Reactance Section III>

Figure 30:
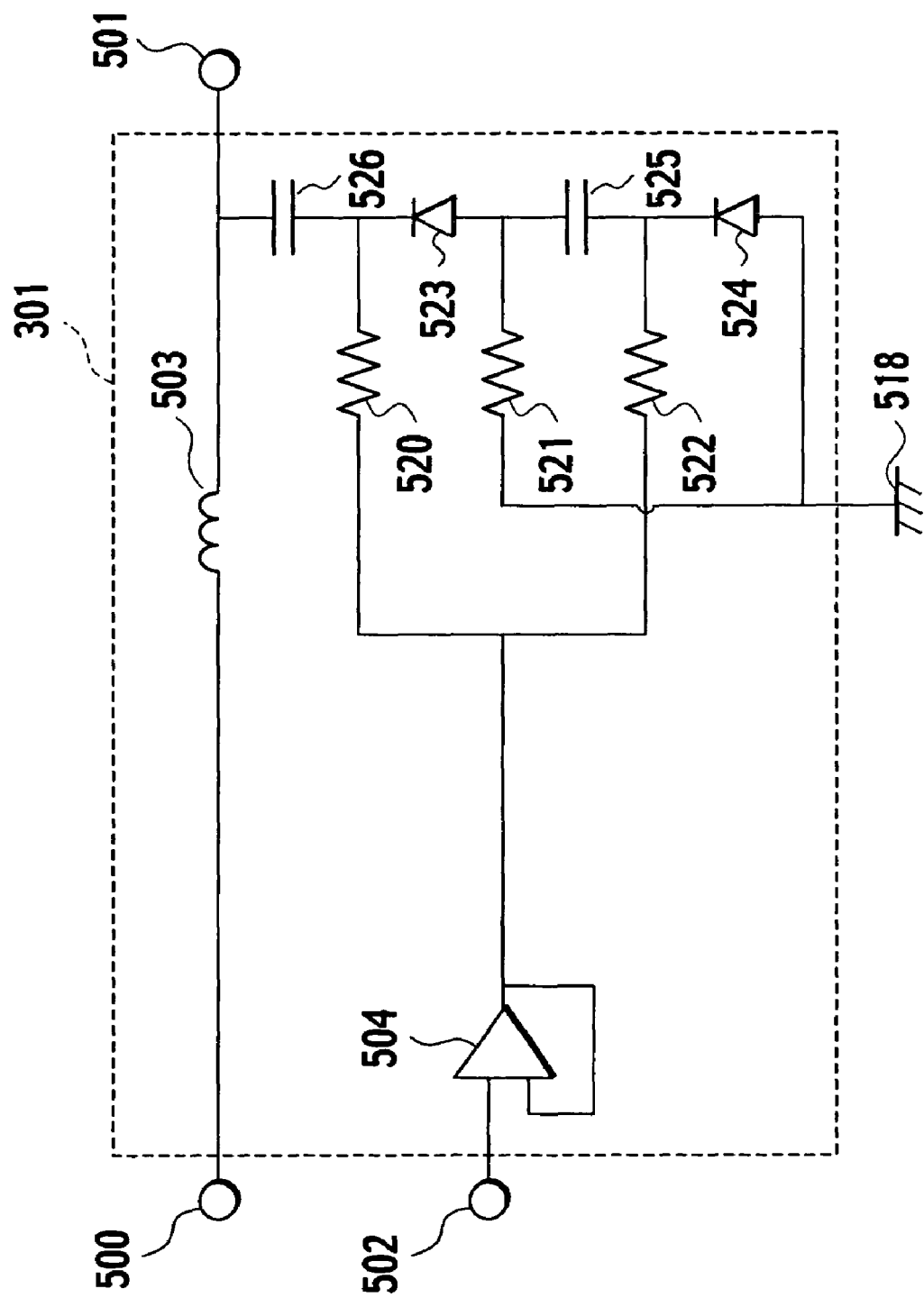
FIG. 30 is a schematic view for explaining a variable reactance section that is applied to an electric field communication transceiver according to one embodiment of the present invention.

FIG. 30 is a schematic diagram for explaining a variable reactance section according to a third embodiment of the present invention. In this configuration, an inductor 203 and variable capacitance diodes 523, 524 are connected in series to compose a variable reactance section 301. A capacitor 226 is connected in order to prevent a control signal from leaking to an alternating signal terminal. In addition, in order to prevent a high frequency signal from leaking to a control signal section, resistors 220, 222 are connected.

Moreover, in order to prevent an electric potential of the cathode of the variable capacitance diode 523 from becoming zero for a low frequency signal and to prevent the anode of the variable capacitance diode 524 and a circuit ground 218 from being short-circuited for a low frequency signal, a resistor 221 is connected between the variable capacitance diode 523 and the capacitor 225. Even when connected in this manner, a voltage of the alternating signal is divided and applied to each of the variable capacitance diodes 523, 524 and a voltage of the control signal is applied to each of the variable capacitance diodes 523, 524 without being divided.

Therefore, the circuit is configured so that a suppression of resonance, which is caused when the alternating signal comes to have a higher voltage than the withstand voltage, is prevented and a variable range in capacitance of the variable capacitance diodes 523, 524 is not reduced.

<Variable Reactance Section IV>

Figure 31:
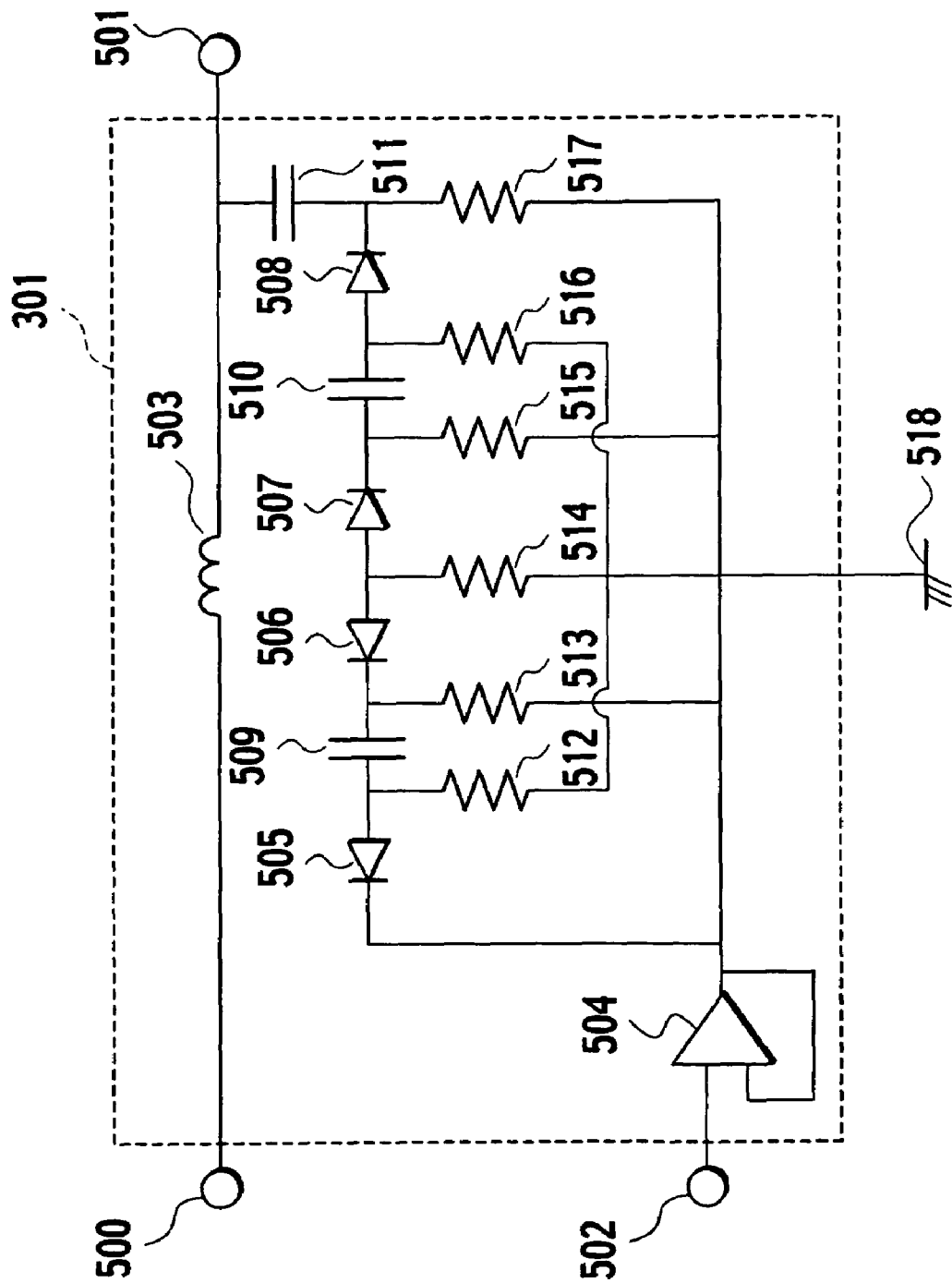
FIG. 31 is a schematic view for explaining a variable reactance section that is applied to an electric field communication transceiver according to one embodiment of the present invention.

FIG. 31 is a schematic diagram for explaining a variable reactance section according to a fourth embodiment of the present invention. This configuration of the fourth embodiment is a combination of the second and the third embodiment described above.

Namely, an inductor 203 and variable capacitance diodes 505 to 508 are connected in series to form variable reactance and the variable capacitance diodes 505 to 508 are also connected in series and reversely, too, for a high frequency alternating signal as shown in FIG. 31. Therefore, amplitude of the alternating signal will not be readily suppressed.

The aforementioned configuration of the above embodiments according to the present invention is an electric field communication transceiver that induces electric field based on data to be transmitted in an electric field transmission medium so as to carry out data transmission by using the induced electric field and that receives an electric field that is based on data to be received and induced in the electric field transmission medium so as to carry out data reception, comprising a variable reactance means that changes a reactance value so that a voltage of the electric field induced in the electric field transmission medium becomes peaked in order to control resonance with parasitic capacitance between a ground of a transmission device that conducts transmission and the earth ground and parasitic capacitance between the electric field transmission medium and the earth ground; an inductor that composes parallel resonance circuit serving to cause resonance in the variable reactance means; and plural variable capacitance means that are connected in series with one another and in parallel with the inductor in order to control resonance in the parallel resonance circuit.

The variable capacitance means comprises two variable capacitance diodes each having an anode and a cathode, wherein the anode of one variable capacitance diode and the cathode of the other variable capacitance diode are connected in series via a capacitor. The variable capacitance means serves to operate as the parallel resonance circuit composed of the inductor and the variable capacitance diode with respect to high frequency signal relating to data transmission since the capacitance is short-circuited. In the variable capacitance means, the variable capacitance diodes are insulated to be in parallel with respect to a low frequency signal relating to resonance control by means of the capacitor and therefore the capacitance of the variable capacitance diodes is controlled.

In addition, the variable capacitance means are connected in series with another variable capacitance means having the same configuration by connecting respective anode without a capacitor.

Moreover, there are connected in series at least three variable capacitance diodes.

According to the aforementioned embodiments of the present invention, withstand voltage characteristics can be improved and suppression of resonance due to an electrical characteristic of the variable capacitance diode can be improved, thereby providing an electric field communication transceiver that is able to realize electric field communication with high enough intensity.

Figure 32:
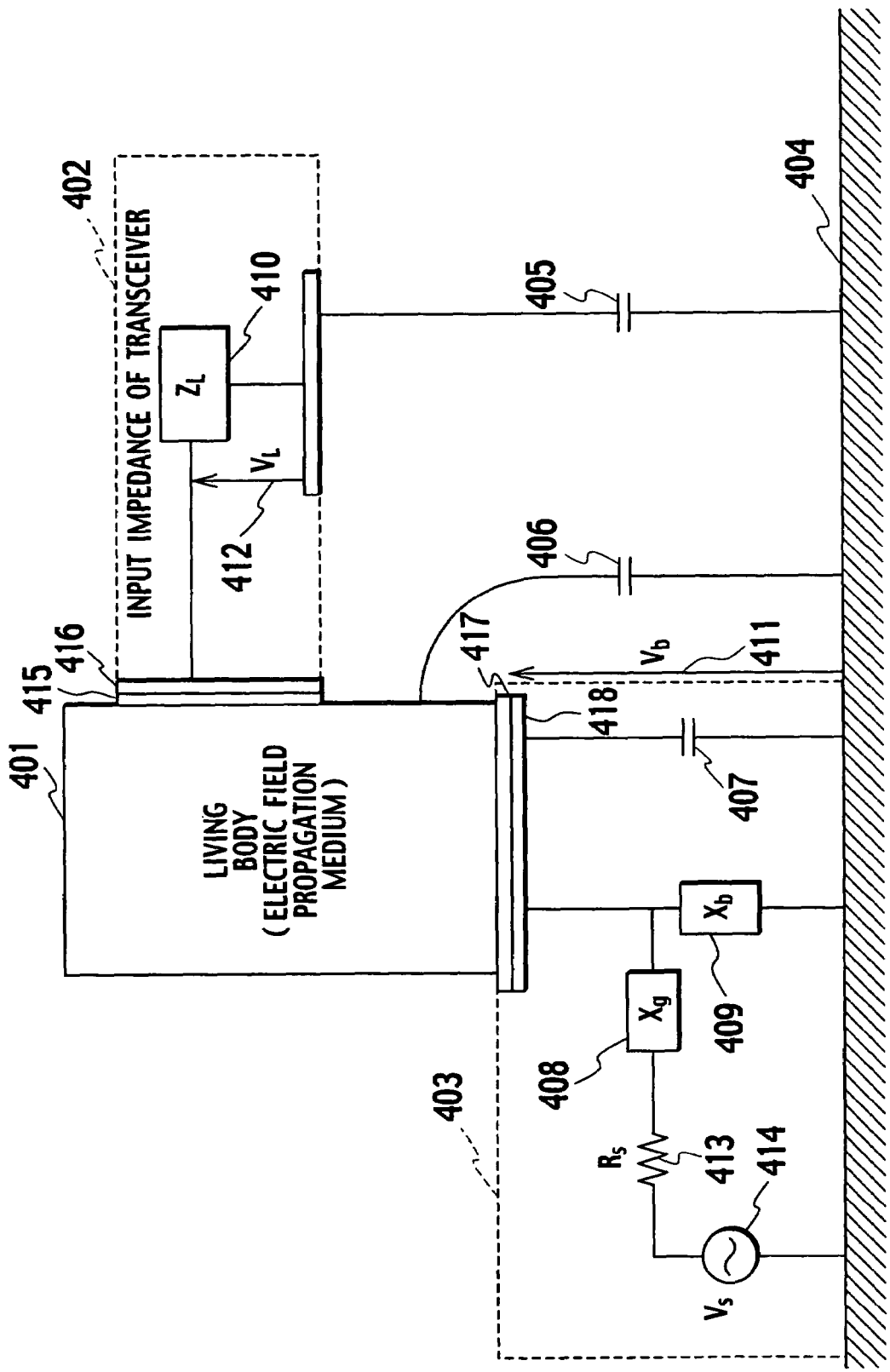
FIG. 32 is an explanatory view illustrating a basic configuration of an electric field communication transceiver and an electric field communication system according to one embodiment of the present invention.

FIG. 32 illustrates a principle of an electric power transmission system employing electric field communication.

An alternating signal is applied to a living body (electric field transmission medium) 401 from an installed terminal side transceiver 403 installed at an earth ground 404; the alternating signal is converted to direct electric power by a mobile terminal side transceiver 402 contacted to the living body 401; and the electric power is transmitted to a circuit (not shown) of the mobile terminal side transceiver 402. In FIG. 32, a rectifier that converts the alternating signal to direct current electric power and transmission/reception sections are collectively represented by an input impedance $Z_L$ 410. In addition, capacitance between a transmission/reception electrode 416 and the living body 401 is so large to be neglected.

Although a higher voltage needs to be applied to the $Z_L$ 410 in order to transmit the electric power efficiently to the mobile terminal side transceiver 402, the voltage to be applied to the $Z_L$ 410 would be reduced by parasitic capacitance $C_g$ 405 existing between the mobile terminal side transceiver 402 and the earth ground 404 if applied direct from a signal source $V_s$ 414 to the living body 401. In the system, the reactance $X_g$ 408 and $X_b$ 409 are provided in the installed terminal side transceiver 403 so as to cause resonance with the parasitic capacitance $C_g$ 405, parasitic capacitance $C_{sg}$ 407 between the transmission/reception electrode 416 and the earth ground 404, and parasitic capacitance $C_b$ 406 between the living body 401 and the earth ground 404, thereby increasing the signal intensity.

A Fourth Embodiment

Figure 33:
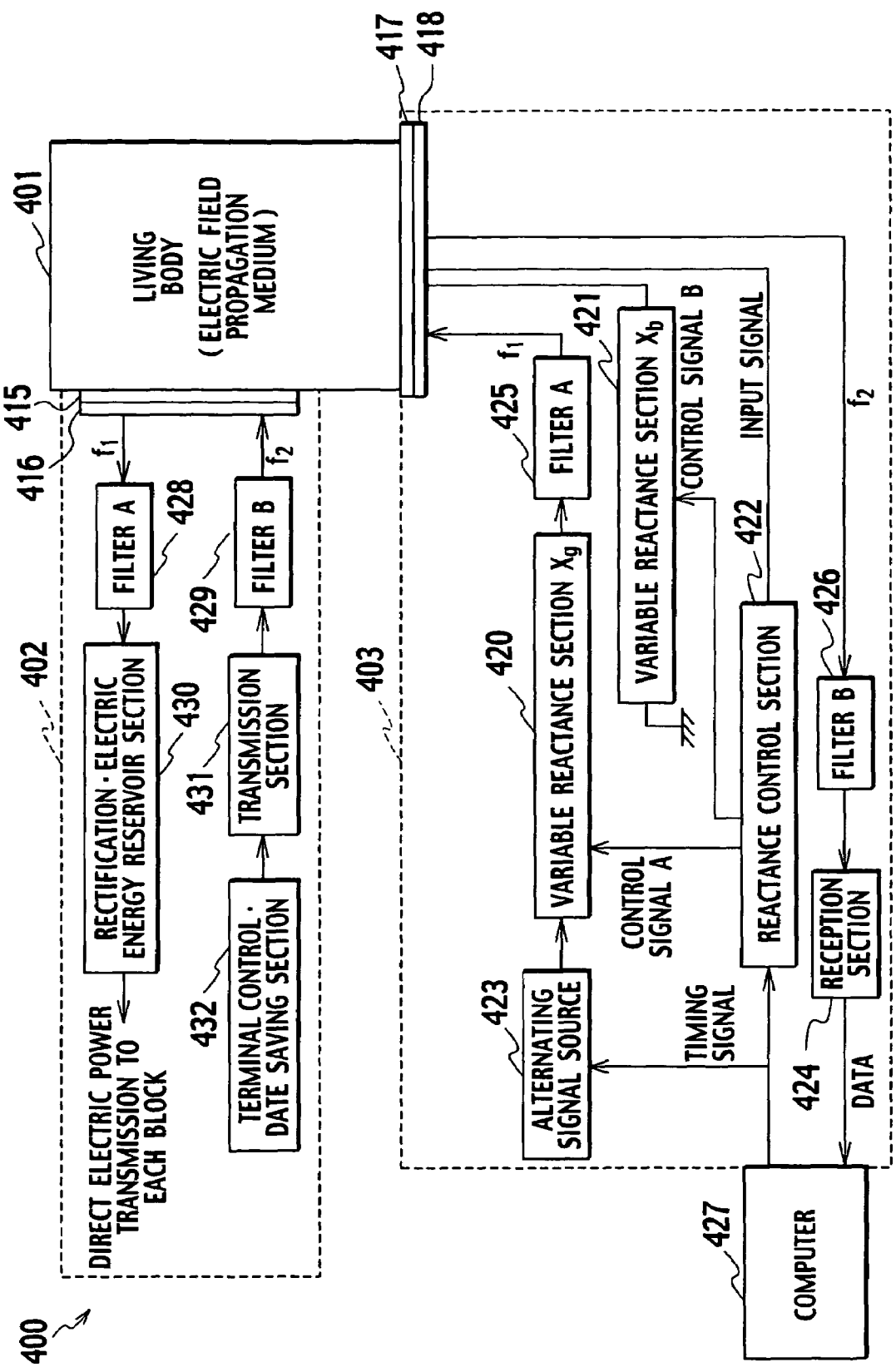
FIG. 33 is a block diagram illustrating an electric field communication transceiver and an electric field communication system according to one embodiment of the present invention.

FIG. 33 illustrates a fourth embodiment of the present invention.

In FIG. 33, there are illustrated a mobile terminal side transceiver 402, a living body 401 as an electric field transmission medium, an installed terminal side transceiver 403, and a computer 427. The installed terminal side transceiver 403 is provided with a variable reactance section $X_g$ 420 for maintaining resonance with varying parasitic capacitance and a reactance control section 422 for controlling a variable reactance section $X_b$ 421.

Additionally, a transmission signal from the installed terminal side transceiver 403 has a different frequency from a transmission signal from the mobile terminal side transceiver 402 in order to constantly transmit electric power to the mobile terminal side transceiver 402. In each transceiver, filters A 425, B 426 are provided in order to discriminate these frequencies. The filter A 425 has a lower impedance at a frequency f1 and a higher impedance at a frequency f2 so as to allow a passage of a signal having the frequency f1 therethrough and block a signal having the frequency f2. On the other hand, the filter A 426 has a higher impedance at a frequency f1 and a lower impedance at a frequency f2 so as to block a signal having the frequency f1 and allow a passage of a signal having the frequency f2 therethrough.

A signal applied to the living body 401 from the installed terminal side transceiver 403 is inputted to the rectifier/electric power reservoir 430 through a filter A 428 in the mobile terminal side transceiver 402. In the rectifier/electric power reservoir 430, the inputted alternating voltage is converted to a direct voltage that is then stored therein. The direct voltage is in turn distributed to each block (not shown) in the mobile terminal side transceiver 402. After this distribution, data is transmitted from a terminal control/date storage section 432 to a transmission section.

The transmission section 431 modulates the inputted data with the frequency f2 and applies the modulated data to the living body 401 through a filter B 429. After having passed through the filter B 426 in the installed terminal side transceiver 402, the signal is demodulated by a reception section 424 and inputted to the computer 427. This is a data flow in the entire system.

Next, a method of controlling reactance will be described.

Figure 34:
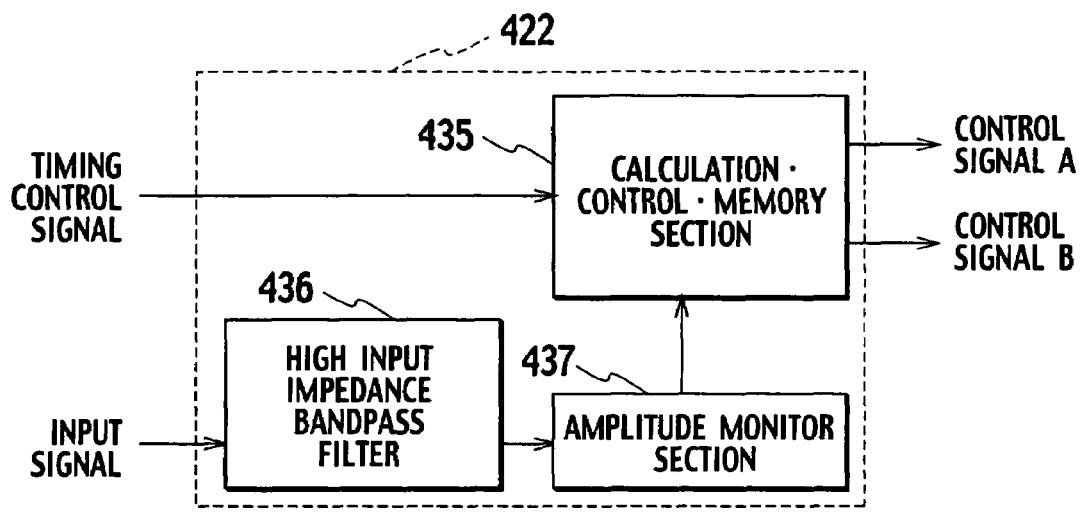
FIG. 34 is a block diagram for explaining a reactance control operation in an electric field communication transceiver and an electric field communication system according to one embodiment of the present invention.
Figure 35:
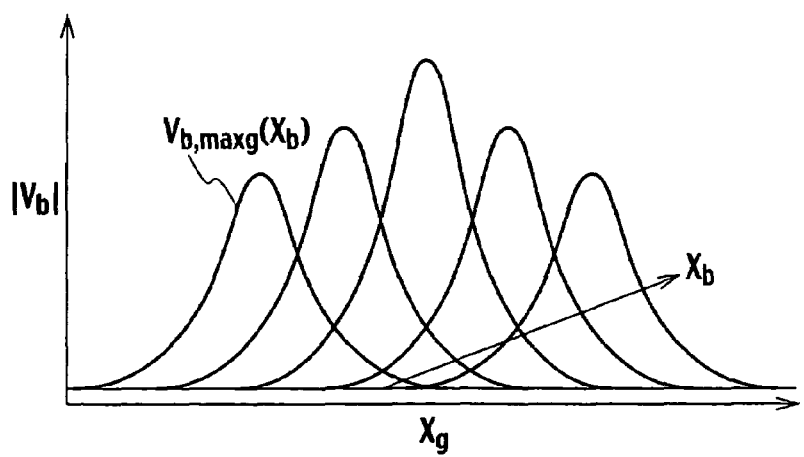
FIG. 35 is a graph for explaining a reactance control operation in an electric field communication transceiver and an electric field communication system according to one embodiment of the present invention.

FIG. 34 is a block diagram of the reactance control portion 422; and FIG. 35 illustrates a dependence of an amplitude $|V_b|$ of an applied voltage on reactance $X_g$, $X_b$.

As shown in FIG. 35, $|V_b|$ becomes peaked at a reactance value of $X_{g.max}$ ($X_b$) when $X_g$ is varied while keeping the reactance $X_b$ constant. The peak value $V_{b.max}$ ($X_b$) is dependent on the reactance $X_b$ and becomes peaked at a certain reactance value.

The reactance control section 422 operates to find a peak value. While $X_g$ is varied using $X_b$ as a parameter, the voltage amplitude $V_b$ is detected by an amplitude monitor and stored in a calculation/control/memory section. In this case, a high input impedance band-pass filter 436 having high input impedance is used at an input stage of the reactance control section 422 in order to prevent characteristic in a signal line for monitoring the amplitude from varying and to detect only a signal having the frequency f1. Next, after having passed through an amplitude monitor section 437, the peak value of $V_b$ is searched out at the calculation/control/memory section 435, thereby setting the reactance value as $X_b$, $X_g$.

Figure 45:
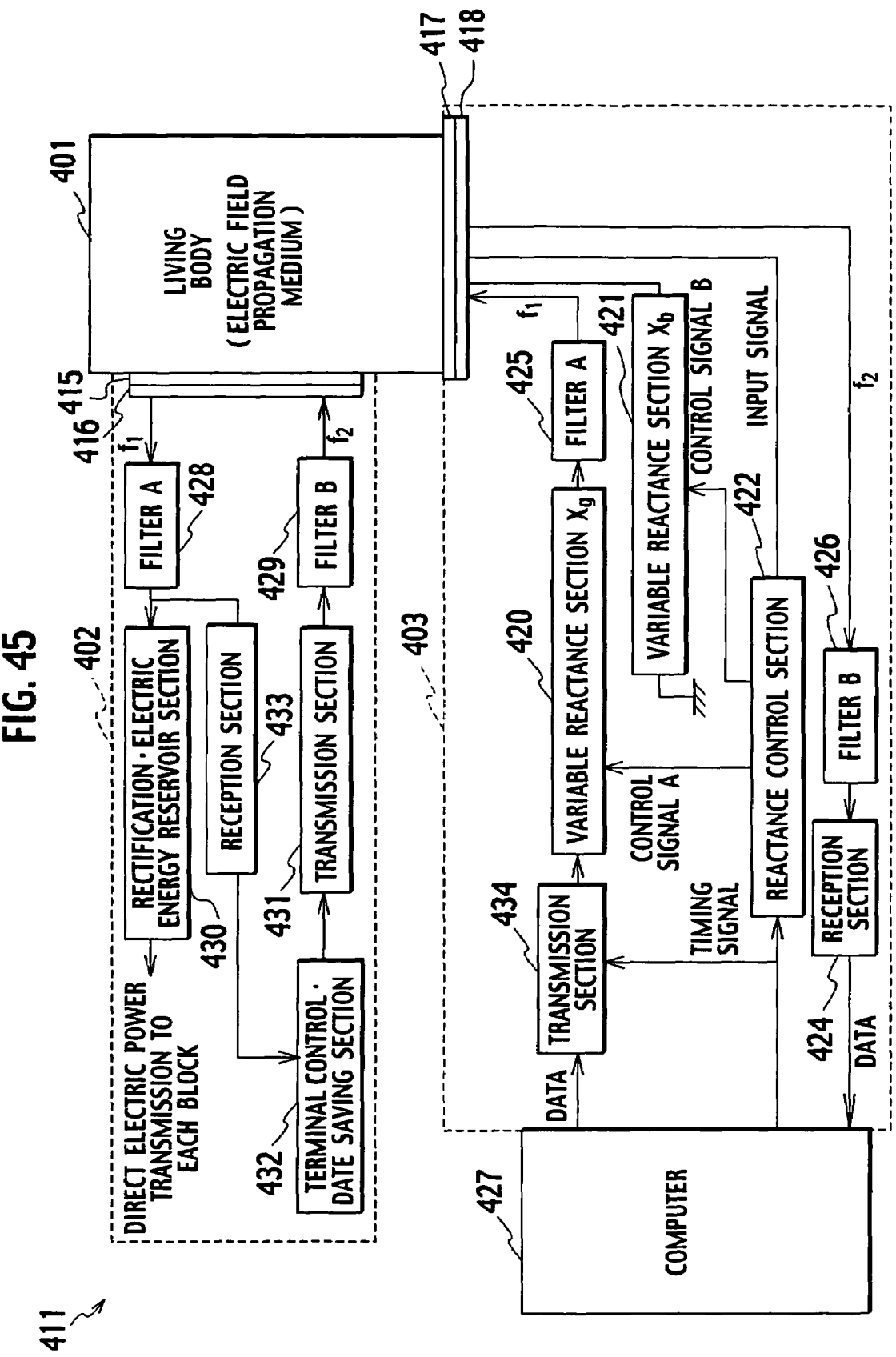
FIG. 45 is a block diagram illustrating an electric field communication system according to one embodiment of the present invention.

By the way, as shown in FIG. 45, when the mobile terminal side transceiver 402 is provided with a transmission section 433 and the installed terminal side transceiver 403 is provided with a transmission section 434 that carries out data modulation, instead of an alternating signal source 423, there is obtained an electric field communication system 411 that enables duplex two-directional communication between the transceivers 402, 403. In addition, a variable reactance (not shown) is inserted into the output of the transmission section 431 in the mobile terminal side transceiver 402 to cause resonance with parasitic capacitance, thereby increasing a signal to be applied to the living body 401 form the mobile terminal side transceiver 402.

Figure 36:
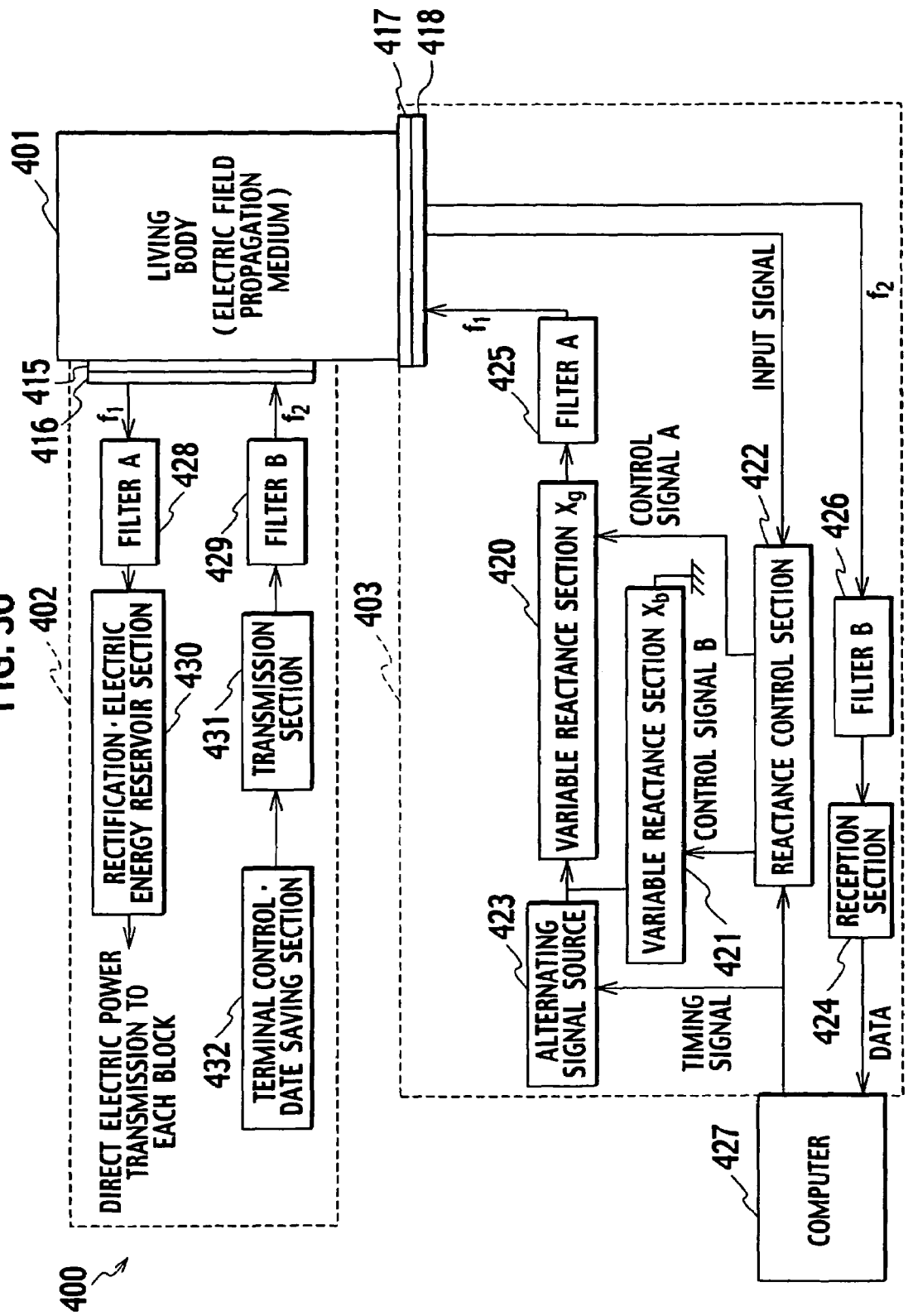
FIG. 36 is a block diagram illustrating an electric field communication transceiver and an electric field communication system according to another embodiment of the present invention.

FIG. 36 illustrates a modified example of the fourth embodiment of the present invention.

Although the variable reactance section $X_b$ 421 is interposed between the transmission/reception electrode 418 and the earth ground in FIG. 33, the variable reactance section Xb 421 is interposed between the alternating signal source 423 and an earth ground in this modified example. The same effect can be obtained with even such a configuration.

According to the above configuration, the voltage applied to the living body 401 can be increased and as a result electric power can be transmitted to the mobile terminal side transceiver 402 carried along by the living body 401. When an electric field communication system obtained by combining the installed terminal side transceiver 403 and the mobile terminal side transceiver 402 is employed, which has the above-mentioned configuration, highly convenient communication system can be realized.

A Fifth Embodiment

Figure 37:
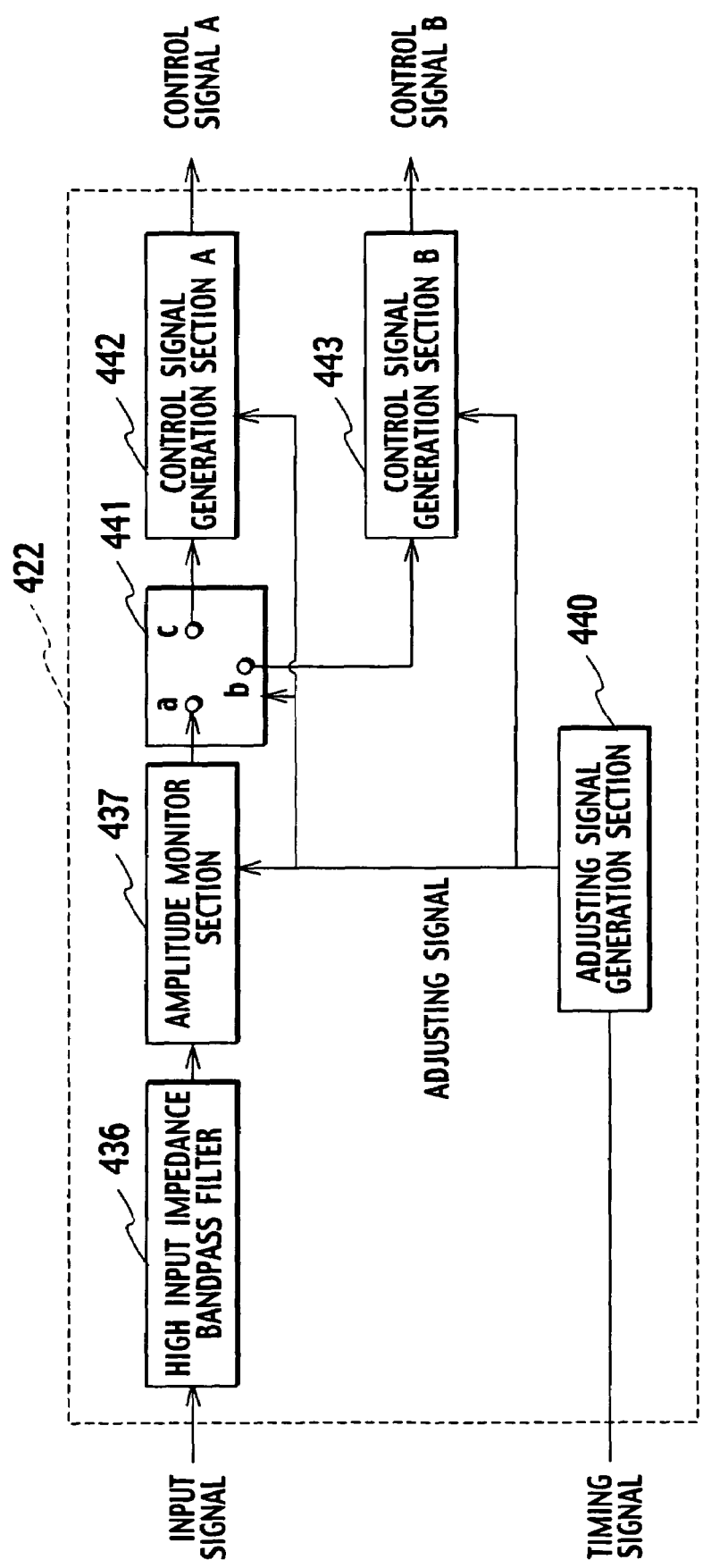
FIG. 37 is a block diagram of a second configuration of a reactance control section that is applied to an electric field communication transceiver and an electric field communication system according to one embodiment of the present invention.

FIG. 37 illustrates a configuration of a reactance control section 422 according to a fifth embodiment of the present invention.

In the configuration of the fifth embodiment, there is adopted an adjustment method in which the reactance control section 422 alternately varies each reactance value of a variable reactance control section $X_b$ 421 and a variable reactance control section $X_g$ 420.

First, a reactance value of the variable reactance section $X_g$ 420 is adjusted so that $|V_b|$ shown in FIG. 35 becomes peaked, while a reactance value of the variable reactance section $X_b$ 421 is kept constant. In this adjustment, a contact a of a switch 441 is connected to a contact c and thus an input signal is inputted to a control signal generation section A 442 via an amplitude monitor section 437. A control signal generated in the control signal generation section A 442 is inputted to the variable reactance section $X_g$ 420 and the reactance value adjustment is carried out.

After the reactance value of the variable reactance section $X_g$ 420 has been adjusted, the switch 441 is switched over so that the contact a is connected to a contact b so as to maintain the reactance value of the variable reactance control section $X_g$ 420. Then, a reactance value of the variable reactance section $X_b$ 421 is adjusted so that $|V_b|$ shown in FIG. 35 becomes peaked. By repeating the above procedures, the reactance values come to reach the optimized reactance. The reactance control section 422 having such a configuration makes it possible to obtain the same effect as exhibited by the fourth embodiment as described above. By the way, the control signal generation section A 442 and the control signal generation section B 443 transmit a control signal for maintaining the reactance value toward the variable reactance control section $X_g$ 420 and the variable reactance section $X_b$ 421, respectively, when an adjustment signal is not inputted thereto from an adjustment signal generation section 440.

A Sixth Embodiment

Figure 38:
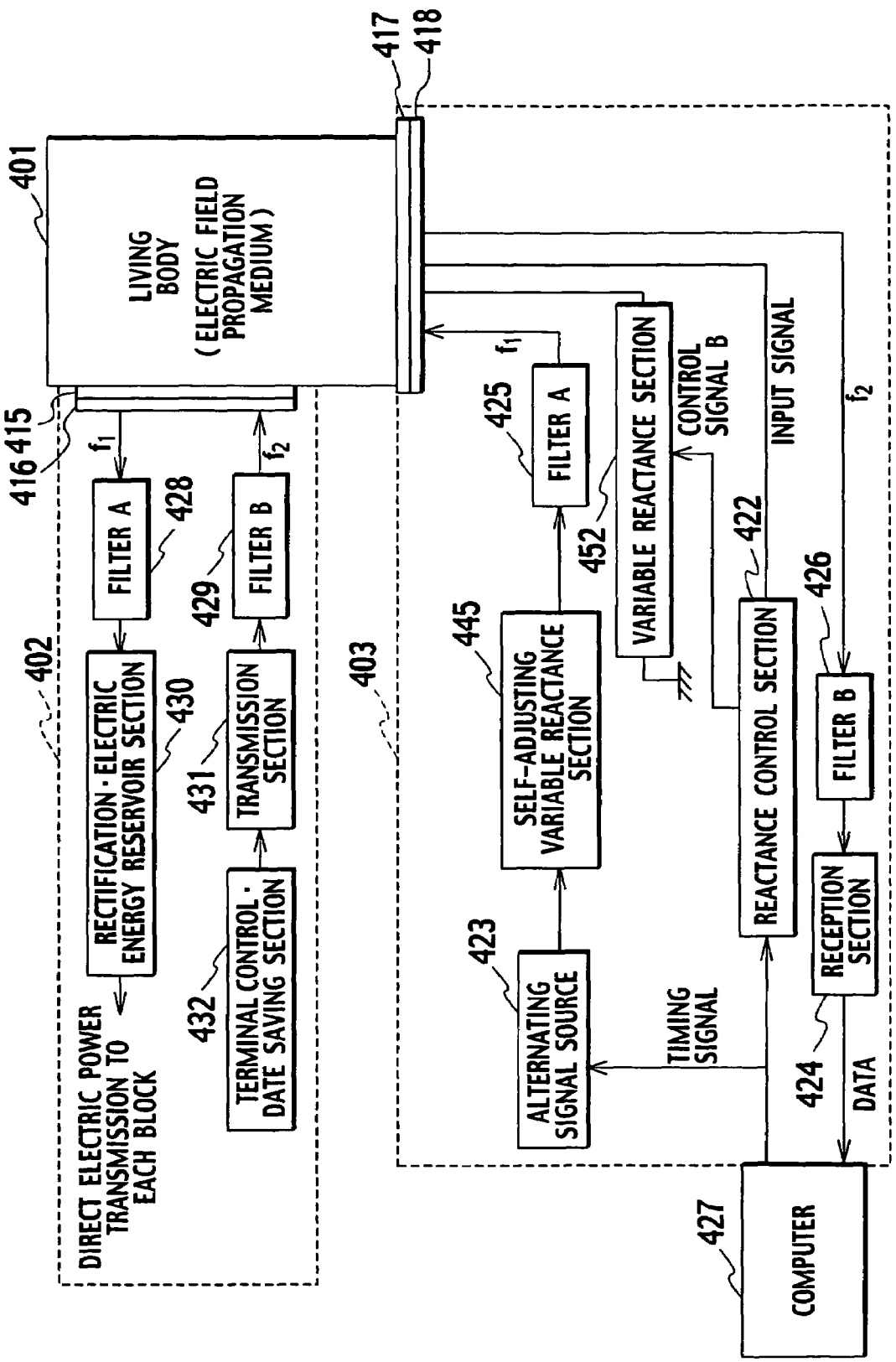
FIG. 38 is a block diagram illustrating an electric field communication transceiver and an electric field communication system according to yet another embodiment of the present invention.

FIG. 38 illustrates a schematic diagram for explaining a sixth embodiment of the present invention.

Figure 39:
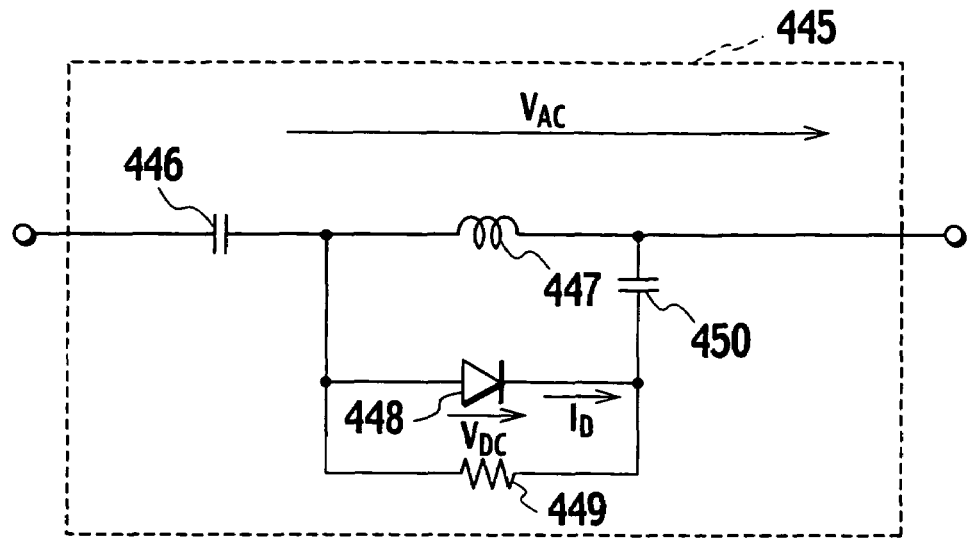
FIG. 39 is a block diagram for explaining a variable reactance of the electric field communication transceiver and the electric field communication system illustrated in FIG. 38.

In the sixth embodiment, a self-adjustment variable reactance section 445 that is capable of adjusting its own reactance value is employed without necessitating the reactance control section 422. FIG. 39 illustrates a specific configuration of the self-adjustment variable reactance section 445, in which capacitors 446, 450 are to block a direct component and considered as short-circuited for an alternating signal.

Figure 40:
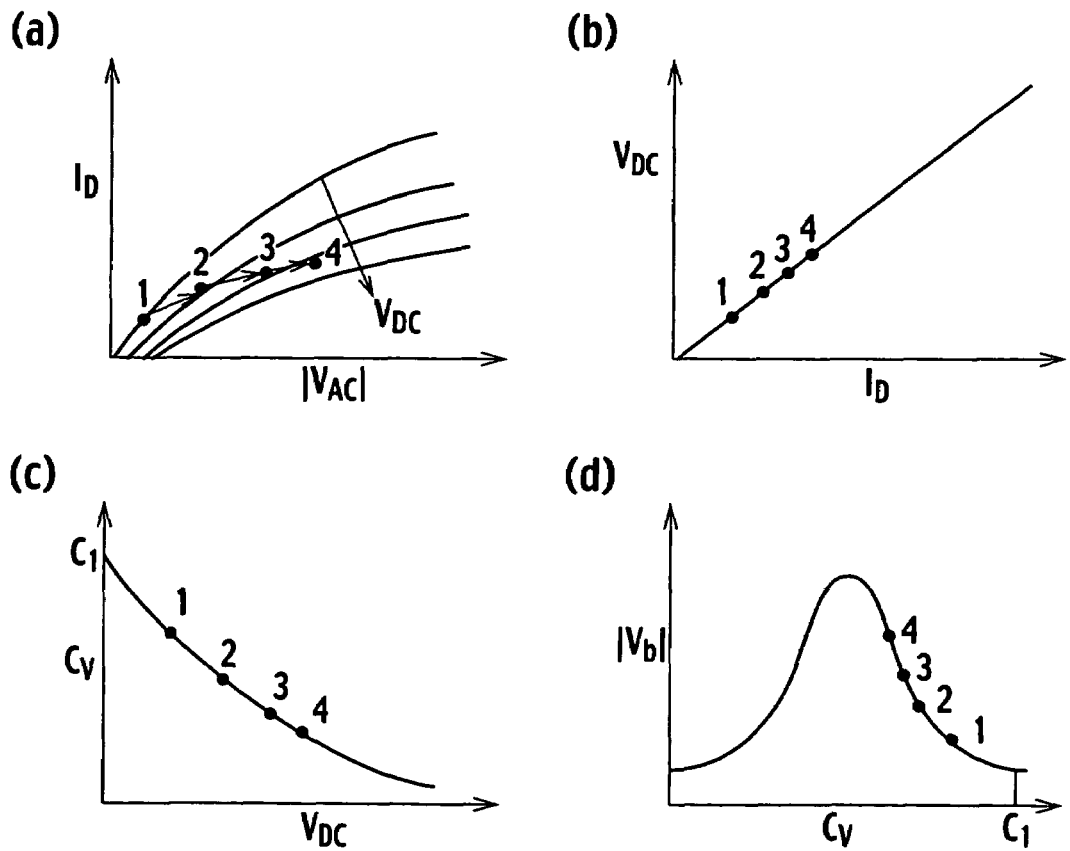
FIGS. 40A to 40D are a graph for explaining operation of the self-adjusting variable reactance section illustrated in FIG. 39.

FIGS. 40A to 40D are a view for explaining operation of the configuration shown in FIG. 39. FIG. 40A illustrates a direct current component ID that is generated when an alternating voltage having an amplitude |VAC| is applied to the variable capacitance diode 448 in relation to |VAC|. When a reverse bias voltage VDC is generated across the diode, a duration of time when the diode is short-circuited shortens, thereby reducing ID with respect to the same VAC.

FIG. 40B is a graph of an electric potential (equivalent to VDC) caused by ID flowing through a resistor; and FIG. 40C illustrates a dependence of capacitance $C_v$ of the variable capacitance diode on voltage VDC. In addition, FIG. 40D illustrates a dependence of an amplitude $|V_b|$ of $V_b$ on $C_v$. Points in the graphs show a change in each current and voltage after an alternating signal starts to be inputted to the variable reactance. An initial value of the capacitance $C_v$ is set as C1, which is a value at the time of VDC=0. In addition, |VAC| is proportional to $|V_b|$.

When an alternating signal is inputted, the signal is rectified by the diode and thus a direct current ID is generated (a point "1" in FIG. 40A). This current flows the resistor, thereby to generate a direct voltage VDC and the same voltage is applied to the variable capacitance diode. As a result, the capacitance $C_v$ reduces down to a capacitance value that causes resonance (a point "1" in FIG. 40C) and thus $|V_b|$ becomes larger.

While |VAC| becomes larger since |VAC| is proportional to $|V_b|$, VDC also becomes larger and then the relation between |VDC| and ID comes to be shown by a point "2" in FIG. 22A. Subsequently, while |VAC| increases along with reduction of $C_v$, VDC becomes larger and therefore a rate of change in ID dwindles and converges to zero. When the rate of change in ID becomes zero, |VAC| becomes constant and its amplitude has become closer to the amplitude at the time of resonance, when compared with one at the time of beginning.

Use of the self-adjusting variable reactance section 445 allows for one variable reactance to be controlled by the reactance control section, thereby alleviating complexity in adjustment.

Figure 41:
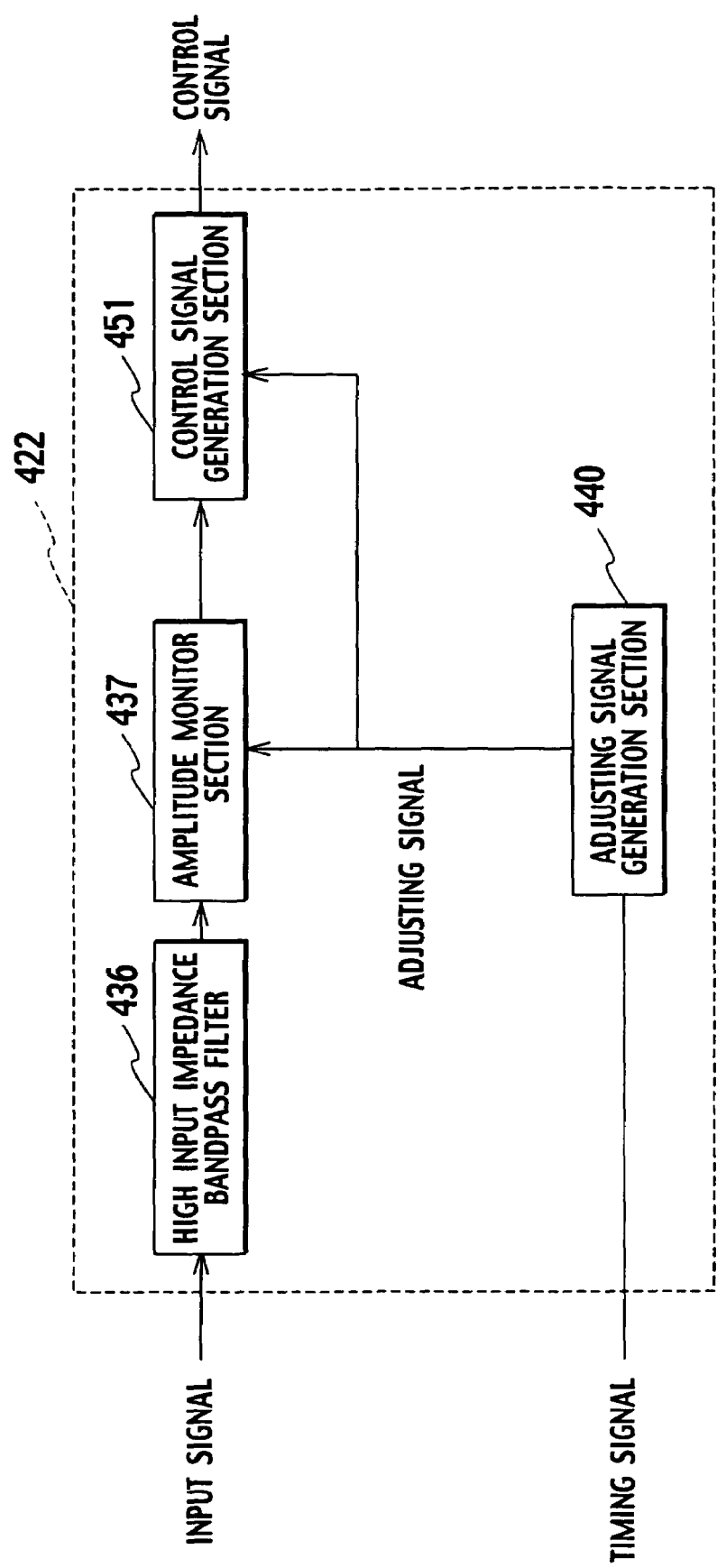
FIG. 41 is a block diagram of another reactance control section that is applied to an electric field communication transceiver and an electric field communication system according to one embodiment of the present invention.

FIG. 41 is a block diagram of the reactance 422 applied to the sixth embodiment. Since only one reactance, which is the variable reactance section 452, is required to be controlled by the reactance control section 422, there is accordingly only one control signal generation section 451.

By the way, although the self-adjusting variable reactance section 445 is located at a next stage of the alternating signal source 423 in the sixth embodiment, the same effect is obtained when the self-adjusting variable reactance section 445 and the variable reactance section 452 are replaced with each other.

The electric field communication transceiver and the electric field communication system according to the embodiments of the present invention as described above can apply a larger voltage to the mobile terminal side transceiver from the installed terminal side transceiver, thereby transmitting electric power to the mobile terminal side transceiver.

INDUSTRIAL APPLICABILITY

The transmission device, electric field communication transceiver, and electric field communication system according to the present invention are composed integrally with a computer and applicable for example in a wearable computer system that can be worn on a human body.

The invention claimed is:

1. A transmission device that induces an electric field based on data to be transmitted and transmits the data to be transmitted via the induced electric field, the transmission device comprising:
    a transmission means configured to transmit a modulated signal obtained by modulating the data to be transmitted with an alternating signal having a predetermined frequency,
    a transmission electrode configured to induce an electric field based on the modulated signal in the electric field transmission medium,
    a first reactance means provided between an output of the transmission means and the transmission electrode so as to cause resonance with each of parasitic capacitance produced between a ground of the transmission means and an earth ground, parasitic capacitance produced between the electric field transmission medium and the ground of the transmission means, and parasitic capacitance produced between the electric field transmission medium and the earth ground, and
    a second reactance means provided between the output of the transmission means and the ground of the transmission means or between the transmission electrode and the ground of the transmission means so as to cause resonance with each of the parasitic capacitances.

2. A transmission device as recited in claim 1, wherein either one of the first reactance means and the second reactance means is a variable reactance means of which reactance value is adjustable, and wherein there is provided a reactance control means configured to control the reactance value of the variable reactance means so that a voltage which the transmission means applies to the electric field transmission medium becomes peaked.

3. A transmission device as recited in claim 1, wherein the first reactance means and the second reactance means are both a variable reactance means of which reactance value is adjustable, and wherein there is provided a reactance control means configured to control each reactance value of the first reactance means and the second reactance means so that a voltage which the transmission means applies to the electric field transmission medium becomes peaked.

4. A transmission device as recited in claim 3, wherein the reactance control means includes
    an adjustment signal generation means configured to generate an adjustment signal for use in adjustment of the reactance value,
    an amplitude detection means configured to use the adjustment signal outputted from the adjustment signal generation means so as to detect an amplitude of the voltage,
    a first control signal generation means configured to output a control signal that controls a reactance value of the first variable reactance means in accordance with the amplitude detected by the amplitude detection means,
    a second control signal generation means configured to output a control signal that controls a reactance value of the second variable reactance means in accordance with the amplitude detected by the amplitude detection means, and
    a connection means configured to connect the amplitude detection means with the first control signal generation means in controlling of the reactance value of the first variable reactance means and to connect the amplitude detection means with the second control signal generation means in controlling of the reactance value of the second variable reactance means.

5. A transmission device as recited in claim 3, wherein the second variable reactance means is provided between the transmission electrode and the ground of the transmission means,
    wherein the reactance control means controls to adjust each reactance value of the first variable reactance means and the second variable reactance means so that a voltage of the transmission applied to the electric field transmission medium becomes peaked and, after the reactance value of the second reactance means has been adjusted, the reactance control means varies minutely the reactance value,
    wherein there is provided a resistor to be connected in series with the second variable reactance means and the transmission means at the time of adjusting a reactance value of the second variable reactance means, and
    wherein there is provided a connection means configured to connect the resistor with the transmission means at the time of adjusting a reactance value of the second variable reactance means, and to connect the transmission means with the first variable reactance means and the resistor with the ground of the transmission means at the time of adjusting a reactance value of the first variable reactance means.

6. A transmission device as recited in claim 3, wherein the second variable reactance means is provided between the output of the transmission means and the ground of the transmission means,
    wherein the reactance control means controls to adjust each reactance value of the first variable reactance means and the second variable reactance means so that a voltage of the transmission applied to the electric field transmission medium becomes peaked and, after the reactance value of the first reactance means has been adjusted, the reactance control means varies minutely the reactance value, and wherein there is provided a connection means configured to disconnect the second variable reactance means from the ground of the transmission means at the time of adjusting a reactance value of the first variable reactance means and to connect the second variable reactance means with the ground of the transmission means at the time of adjusting a reactance value of the second variable reactance means.

7. A transmission device as recited in claim 3, wherein there is provided a self-adjusting variable reactance means in either the first variable reactance means or the second variable reactance means, the self-adjusting variable reactance means including a resonance circuit for causing resonance with the parasitic capacitances, the resonance circuit being provided with an inductor and a variable capacitance diode of which electrostatic capacitance varies in accordance with a voltage applied thereto, and a resistor for applying a voltage across the anode and the cathode of the variable capacitance diode, the voltage being in accordance with a direct current obtained by rectifying with the variable capacitance diode a transmission signal inputted to the resonance circuit, and wherein a reactance value of either one of the first variable reactance means and the second variable reactance means is controlled by the reactance control means so that a voltage of the transmission applied to the electric field transmission medium becomes peaked, the either one of the variable reactance means being except for the self-adjusting variable reactance means.

8. An electric field communication transceiver that induces an electric field based on data to be transmitted in an electric field transmission medium to transmit the data to be transmitted via the induced electric field and receives data to be received via an electric field based on the data to be received that is induced in the electric field transmission medium, the transceiver comprising:

a transmission means configured to transmit a modulated signal obtained by modulating the data to be transmitted with an alternating signal having a predetermined frequency, a transmission reception electrode configured to induce an electric field based on the modulated signal in the electric field transmission medium and receive electric field based on data to be received, a first reactance means provided between the output of an transmission means and the transmission reception electrode so as to cause resonance with each of parasitic capacitance produced between a ground of the transmission means and an earth ground, parasitic capacitance produced between the electric field transmission medium and the ground of the transmission means, and parasitic capacitance produced between the electric field transmission medium and the earth ground, a second reactance means provided between the output of the transmission means and the ground of the transmission means or between the transmission reception electrode and the ground of the transmission means so as to cause resonance with each of the parasitic capacitances, a reception means configured to detect an electric field based on the data to be received, to convert the electric field into an electric signal, and to demodulate the signal so as to receive the data, a first connection means configured to disconnect a signal path from the output of the transmission means through the transmission reception electrode so as to prevent leakage of a reception signal to the transmission means at the time of receiving and to connect the signal path from the output of the transmission means through the transmission reception electrode so as to output a transmission signal to the transmission reception electrode at the time of transmitting, and a second connection means configured to disconnect the second reactance means from the ground of the transmission means so as to prevent leakage of the reception signal to the ground of the transmission means at the time of receiving, and to connect the second reactance means with the ground of the transmission means so as to allow the second reactance means to cause resonance at the time of transmitting.

9. An electric field communication transceiver as recited in claim 8, wherein either one of the first reactance means and the second reactance means is a variable reactance means of which capacitance value is variable, and wherein there is provided a reactance means configured to control a reactance value of the variable reactance means so that a voltage of the transmission which the transmission means applies to the electric field transmission medium becomes peaked.

10. An electric field communication transceiver as recited in claim 8, wherein the first reactance means and the second reactance means are a variable reactance means of which capacitance value are both a variable reactance means of which capacitance value is variable, and wherein there is provided a reactance control means configured to control each reactance value of the first reactance means and the second reactance means so that a voltage of the transmission that the transmission means applies to the electric field transmission medium becomes peaked.

11. An electric field communication transceiver as recited in claim 10, wherein the reactance control means includes:

an adjustment signal generation means configured to generate an adjustment signal for use in adjusting the reactance value, an amplitude detection means configured to use the adjustment signal outputted from the adjustment signal generation means so as to detect an amplitude of a voltage of the transmission, a first control signal generation means configured to output based on the amplitude detected by the amplitude detection means a control signal to control a reactance value of the first variable reactance means, a second control signal generation means configured to output based on the amplitude detected by the amplitude detection means a control signal to control a reactance value of the second variable reactance means, and a connection means configured to connect the amplitude detection means with the first control signal generation means in controlling of the reactance value of the first variable reactance means and to connect the amplitude detection means with the second control signal generation means in controlling of the reactance value of the second variable reactance means.

12. An electric field communication transceiver as recited in claim 10, wherein the second variable reactance means is provided between the transmission electrode and the ground of the transmission means, wherein the reactance control means controls to adjust each reactance value of the first variable reactance means and the second variable reactance means so that a voltage of the transmission applied to the electric field transmission medium becomes peaked and, after the reactance value of the second reactance means has been adjusted, the reactance control means varies minutely the reactance value, and wherein there are provided a resistor to be connected in series with the second reactance means and the transmission means at the time of adjusting a reactance value of the second variable reactance means, and a connection means configured to connect the resistor with the transmission means at the time of adjusting a reactance value of the second variable reactance means and to connect the transmission means with the first variable reactance means and the resistor with the ground of the transmission means at the time of adjusting a reactance value of the first variable reactance means.

13. An electric field communication transceiver as recited in claim 10, wherein the second variable reactance means is provided between the output of the transmission means and the ground of the transmission means, wherein the reactance control means controls to adjust each reactance value of the first variable reactance means and the second variable reactance means so that a voltage of the transmission applied to the electric field transmission medium becomes peaked and, after the reactance value of the first reactance means has been adjusted, the reactance control means varies minutely the reactance value, and wherein there is provided a connection means configured to disconnect the second variable reactance means from the ground of the transmission means at the time of adjusting a reactance value of the first variable reactance means and to connect the second variable reactance means and the ground of the transmission means at the time of adjusting a reactance value of the second variable reactance means.

14. An electric field communication transceiver as recited in claim 10, wherein there is provided a self-reactance means in either the first variable reactance means or the second variable reactance means, the self-reactance means including a resonance circuit for causing resonance with the parasitic capacitances, the resonance circuit being provided with an inductor and a variable capacitance diode of which electrostatic capacitance varies in accordance with a voltage applied thereto, and a resistor for applying a voltage across the anode and the cathode of the variable capacitance diode, the voltage being in accordance with a direct current obtained by rectifying with the variable capacitance diode a transmission signal inputted to the resonance circuit, and wherein a reactance value of either one of the first variable reactance means and the second variable reactance means is controlled by the reactance control means so that a voltage of the transmission applied to the electric field transmission medium becomes peaked, the either one of the variable reactance means being except for the self-adjusting variable reactance means.

15. An electric field communication transceiver as recited in claim 10, wherein the second variable reactance means is provided between the transmission reception electrode and the ground of the transmission means, wherein the reactance control means controls to adjust each reactance value of the first variable reactance means and the second variable reactance means so that a voltage of the transmission applied to the electric field transmission medium becomes peaked, and, after the reactance value of the second reactance means has been adjusted, the reactance control means varies minutely the reactance value, and wherein the first connect means connects the resistor with the transmission means at the time of adjusting a reactance value of the second variable reactance means; connects the transmission means with the first variable reactance means and the resistor with the ground of the transmission means at the time of adjusting a reactance value of the first variable reactance means; and disconnects the first variable reactance means from the transmission means at the time of reception.

16. An electric field communication transceiver as recited in claim 10, wherein the second reactance means is provided between the output of the transmission means and the ground of the transmission means, wherein the reactance control means controls to adjust each reactance value of the first variable reactance means and the second variable reactance means so that a voltage of the transmission applied to the electric field transmission medium becomes peaked, and, after the reactance value of the first reactance means has been adjusted, the reactance control means varies minutely the reactance value, and wherein the second connection means disconnects the second variable reactance means from the ground of the transmission means at the time of adjusting a reactance value of the first variable reactance means, and connects the second variable reactance means with the ground of the transmission means at the time of adjusting a reactance value of the second variable reactance means.

17. An electric field communication transceiver as recited in claim 8, wherein an input to the reception means is connected to the first connection means, and wherein the first connection means disconnects a signal path from the transmission reception electrode to the input of the reception means at the time of transmission, and connects the signal path from the transmission reception electrode to the input of the reception means.

18. An electric field communication transceiver that carries out data communication via an electric field induced in an electric field transmission medium, the transceiver comprising:

a resonance circuit that is provided with an inductor for causing resonance in a transmission signal for the communication and a variable capacitance diode of which electrostatic capacitance varies in accordance with a voltage applied thereto, and a resistor that generates a voltage in accordance with a direct current obtained by rectifying with the variable capacitance diode the transmission signal inputted to the resonance circuit and that is connected with the variable capacitance diode in parallel to apply the voltage across the anode and the cathode of the variable capacitance diode.

19. An electric field communication transceiver as recited in claim 18, wherein the resonance circuit causes resonance with parasitic capacitance between a ground of the electric field communication transceiver and an earth ground and parasitic capacitance between the electric field transmission medium and the earth ground.

20. An electric field communication transceiver as recited in claim 18, wherein the inductor, the variable capacitance diode, and the resistor are connected in series in the resonance circuit.

21. An electric field communication transceiver as recited in claim 18, wherein in the resonance circuit, the inductor is connected in series with a circuit in which the variable capacitance diode and the resistor are connected.

22. An electric field communication transceiver as recited in claim 18, wherein the inductor arranges at one terminal or both terminals thereof a capacitor for blocking an input of a direct current thereto.

23. An electric field communication transceiver that induces an electric field based on data to be transmitted in a electric field transmission medium so as to carry out data transmission by using the induced electric field and carries out data reception by receiving an electric field based on data to be received that is induced in the electric field transmission medium, the transceiver comprising:
  a variable reactance means configured to vary a reactance value so that a voltage of the transmission applied to the electric field transmission medium so as to control resonance with parasitic capacitance between a ground of a transmission device relating to the transmission and an earth ground and parasitic capacitance between the electric field transmission medium and the earth ground,
  an inductor that composes a parallel resonance circuit in the variable reactance means in order to obtain resonance, and
  a plurality of variable capacitance means of which capacitance is variable and which are connected in parallel with the inductor and in series with one another so as to control the resonance in the parallel resonance circuit.

24. An electric field communication transceiver as recited in claim 23, wherein the variable capacitance means comprise two variable capacitance diodes having two nodes of the anode and cathode, wherein the anode of one of the two variable capacitance diodes is connected in series with the cathode of the other one of the two variable capacitance diodes via a capacitor,
  wherein the capacitor is short-circuited for a high frequency signal relating to data transmission, and thereby the inductor and the variable capacitance diodes serve to operate as the parallel resonance circuit, and
  wherein the variable capacitance diodes are insulated by the capacitor for a low frequency signal thereby to be connected in series with a signal source of the low frequency signal.

25. An electric field communication transceiver as recited in claim 24, wherein in the variable capacitance means variable capacitance means having substantially the same configuration are connected at the anode thereof in series with each other with no capacitor intervened therebetween.

26. An electric field communication transceiver as recited in claim 24, wherein at least three or more of the variable capacitance diodes are connected in series with one another.

27. An electric field communication transceiver that induces an electric field based on data to be transmitted in an electric field transmission medium to carry out data communication by use of the electric field and carries out data reception via an electric field based on data to be received that is induced in the electric field transmission medium,
  an alternating signal output means configured to output an alternating signal having a first frequency,
  a transmission reception electrode configured to induce an electric field based on data to be transmitted so as to transmit the data, and to detect an electric field based on data to be received so as to receive the data,
  a first reactance means provided between an output of the alternating signal output means and the transmission reception electrode, the first reactance means causing resonance between parasitic capacitance between the transmission reception electrode and an earth ground and impedance that the electric field transmission medium close to the transmission reception electrode shares with the earth ground,
  a second reactance means provided between the output of the alternating signal output means and the earth ground or between the transmission reception electrode and the earth ground, the second reactance means causing resonance between parasitic capacitance between the transmission reception electrode and the earth ground and impedance that the electric field transmission medium close to the transmission reception electrode shares with the earth ground,
  a reception means configured to detect an electric field of an alternating signal having a second frequency different from the first frequency,
  a first filter means configured to allow passage of the alternating signal having the first frequency and to block the alternating signal having the second frequency, and
  a second filter means configured to allow passage of the alternating signal having the second frequency and to block the alternating signal having the first frequency.

28. An electric communication transceiver as recited in claim 27, wherein either the first reactance means or the second reactance means is a variable reactance means of which reactance value is variable, and
  wherein there is provided a reactance control means configured to control a reactance value of the variable reactance means so that a voltage of the transmission applied to the electric field transmission medium becomes peaked.

29. An electric field communication transceiver as recited in claim 28, wherein the reactance control means includes
  a calculation control memory section configured to store an amplitude of a transmission voltage applied to the electric field transmission medium for each reactance value of the first variable reactance means and the second variable reactance means and to extract a peak value of the amplitude, thereby to set each reactance value of the first variable reactance means and the second variable reactance means, and
  an amplitude detection means configured to detect amplitude of the transmission voltage.

30. An electric field communication transceiver as recited in claim 28, wherein the reactance control means includes
  an adjustment signal generation means configured to adjust each reactance value of the first variable reactance means and the second variable reactance means,
  an amplitude detection means configured to detect an amplitude of a transmission voltage by use of the adjustment signal outputted from the adjustment signal generation means,
  a first control signal generation means configured to output a signal to control a reactance value of the first variable reactance means in accordance with the amplitude detected by the amplitude detection means,
  a second control signal generation means configured to output a signal to control a reactance value of the second variable reactance means in accordance with the amplitude detected by the amplitude detection means, and
  a third connection means configured to connect at least the amplitude detection means with the first control signal generation means when a reactance value of the first variable reactance means is controlled, and to connect at least the amplitude detection means with the second control signal generation means when a reactance value of the second variable reactance means is controlled.

31. An electric field communication transceiver as recited in claim 27, wherein the first reactance means and the second reactance means are a first variable reactance means and a second variable reactance means so that both of the reactance values thereof are variable, and wherein there is provided a reactance control means configured to control each reactance value of the first variable reactance means and the second variable reactance means so that a voltage of the transmission applied to the electric field transmission medium becomes peaked.

32. An electric field communication transceiver as recited in claim 31, wherein both the first reactance means and the second reactance means employ a self-adjusting variable reactance means including a resonance circuit that is provided with an inductor and a variable capacitance diode of which electrostatic capacitance varies in accordance with a voltage applied thereto and configured to cause resonance with the parasitic capacitances, and a resistor applying a voltage across the anode and the cathode of the variable capacitance diode, the voltage being generated in accordance with a direct current obtained by rectifying the transmission signal inputted to the resonance circuit, and wherein the reactance control means controls one of the variable reactance means so that a voltage of the transmission applied to the electric field transmission medium becomes peaked, the one of the variable reactance means being not the self-adjusting variable reactance means.

33. An electric field communication transceiver as recited in claim 31, wherein the reactance control means includes a calculation control memory section configured to store an amplitude of a transmission voltage applied to the electric field transmission medium for each reactance value of the first variable reactance means and the second variable reactance means and to extract a peak value of the amplitude, thereby to set each reactance value of the first variable reactance means and the second variable reactance means, and an amplitude detection means configured to detect amplitude of the transmission voltage.

34. An electric field communication transceiver as recited in claim 31, wherein the reactance control means includes an adjustment signal generation means configured to adjust each reactance value of the first variable reactance means and the second variable reactance means, an amplitude detection means configured to detect an amplitude of a transmission voltage by use of the adjustment signal outputted from the adjustment signal generation means, a first control signal generation means configured to output a signal to control a reactance value of the first variable reactance means in accordance with the amplitude detected by the amplitude detection means, a second control signal generation means configured to output a signal to control a reactance value of the second variable reactance means in accordance with the amplitude detected by the amplitude detection means, and a third connection means configured to connect at least the amplitude detection means with the first control signal generation means when a reactance value of the first variable reactance means is controlled, and to connect at least the amplitude detection means with the second control signal generation means when a reactance value of the second variable reactance means is controlled.

35. An electric field communication transceiver as recited in claim 27, wherein there are employed a self-adjusting variable reactance means in either the first reactance means or the second reactance means, the self-adjusting variable reactance means including a resonance circuit that is provided with an inductor and a variable capacitance diode of which electrostatic capacitance varies in accordance with a voltage applied thereto and configured to cause resonance with the parasitic capacitances, and a resistor configured to apply a voltage across the anode and the cathode of the variable capacitance diode, the voltage being generated by rectifying with the variable capacitance diode a transmission signal inputted to the resonance circuit, wherein the reactance control means controls one of the variable reactance means so that a voltage of the transmission applied to the electric field transmission medium becomes peaked, the one of the variable reactance means being not the self-adjusting variable reactance means.

36. An electric field communication system composed by combining the electric field communication transceiver as recited in claim 27 with a second electric field communication transceiver, the second electric field communication transceiver comprising:

a transmission reception electrode configured to carry out induction of electric field based on data to be transmitted and reception of electric field based on data to be received, a rectifying electric power storage means configured to rectify an alternating signal having a first frequency, the signal being transmitted from the electric field communication transceiver, so as to generate a direct electric power and to output the electric power, a transmission means configured to modulate data to be transmitted with an alternating signal having a second frequency different from the first frequency so as to generate and transmit the modulated signal, a control data storage means configured to carry out storage of the data to be transmitted, output of the data to be transmitted to the transmission means, and control of the electric field communication transceiver, a first filter means configured to allow passage of an alternating signal having the first frequency and to block an alternating signal having the second frequency, and a second filter means configured to allow passage of an alternating signal having the second frequency and to block an alternating signal having the first frequency.

37. An electric field communication system as recited in claim 36, wherein an alternating signal output means of the electric field communication transceiver is comprised of a transmission means configured to modulate the data to be transmitted with an alternating signal having the first frequency so as to generate and transmit the modulated signal, and wherein the second electric field communication transceiver is provided with a reception means configured to detect an alternating field having the second frequency in accordance with the data to be received so as to convert the detected electric field into an electric signal and demodulate the electric signal.

* * * * *